(12) United States Patent
Gupta et al.

(10) Patent No.: US 7,643,895 B2
(45) Date of Patent: Jan. 5, 2010

(54) PORTABLE MEDIA DEVICE WITH WORKOUT SUPPORT

(75) Inventors: Sandeep Gupta, Fremont, CA (US); Greg Marriott, Honolulu, HI (US); Max Sprauer, San Jose, CA (US); David A. Shayer, Palo Alto, CA (US); John Wesley Archibald, Sunnyvale, CA (US); Shannon E. Wells, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 557 days.

(21) Appl. No.: 11/439,523

(22) Filed: May 22, 2006

(65) Prior Publication Data

US 2007/0271065 A1   Nov. 22, 2007

Related U.S. Application Data

(60) Provisional application No. 60/802,889, filed on May 22, 2006.

(51) Int. Cl.
*G06F 17/00* (2006.01)

(52) U.S. Cl. .......................... 700/94; 482/1
(58) Field of Classification Search ............. 482/1, 482/3, 4, 8, 9; 700/94
See application file for complete search history.

(56) References Cited

U.S. PATENT DOCUMENTS

| | | | |
|---|---|---|---|
| 3,612,265 A | 10/1971 | Dickerson | |
| 3,807,388 A | 4/1974 | Orr et al. | |
| 3,918,058 A | 11/1975 | Noyori et al. | |
| 3,958,459 A | 5/1976 | Shimomura | |
| 3,978,725 A | 9/1976 | Haditke | |
| 4,089,057 A | 5/1978 | Eriksson | |
| 4,090,216 A | 5/1978 | Constable | |
| 4,101,873 A | 7/1978 | Anderson et al. | |
| 4,114,450 A | 9/1978 | Shulman et al. | |
| 4,195,642 A | 4/1980 | Price et al. | |
| 4,210,024 A | 7/1980 | Ishiwatari et al. | |
| 4,223,211 A | 9/1980 | Allsen et al. | |
| 4,248,244 A | 2/1981 | Charnitski et al. | |
| 4,317,126 A | 2/1982 | Gragg, Jr. | |
| 4,371,188 A | 2/1983 | Hull | |

(Continued)

FOREIGN PATENT DOCUMENTS

DE      43 34 773 A1    4/1994

(Continued)

OTHER PUBLICATIONS

Apple iTunes Smart Playlists, downloaded Apr. 5, 2005 from http://web.archive.org/web/20031002011316/www.apple.com/itunes/smartplaylists . . . pp. 1-2.

(Continued)

*Primary Examiner*—Walter F Briney, III
(74) *Attorney, Agent, or Firm*—Beyer Law Group LLP

(57) ABSTRACT

Improved techniques and systems for utilizing a portable electronic device to monitor, process, present and manage data captured by a remote sensor are disclosed. The portable electronic device offers a convenient user interface that can be visual and/or audio based customized to a particular application, user-friendly and/or dynamic. The portable electronic device can pertain to a portable media player and thus also provide media playback.

33 Claims, 39 Drawing Sheets

U.S. PATENT DOCUMENTS

| | | |
|---|---|---|
| 4,371,945 A | 2/1983 | Karr et al. |
| 4,375,674 A | 3/1983 | Thornton |
| 4,386,345 A | 5/1983 | Narveson et al. |
| 4,423,630 A | 1/1984 | Morrison |
| 4,434,801 A | 3/1984 | Jiminez et al. |
| 4,451,849 A | 5/1984 | Fuhrer |
| 4,516,110 A | 5/1985 | Overmyer |
| 4,516,865 A | 5/1985 | Hideo |
| 4,578,769 A | 3/1986 | Frederick |
| 4,589,022 A | 5/1986 | Prince et al. |
| 4,625,733 A | 12/1986 | Saynajakangas |
| 4,694,694 A | 9/1987 | Vlakancic et al. |
| 4,699,379 A | 10/1987 | Chateau et al. |
| 4,703,445 A | 10/1987 | Dassler |
| 4,720,093 A | 1/1988 | Del Mar |
| 4,722,222 A | 2/1988 | Purdy et al. |
| 4,736,312 A | 4/1988 | Dassler et al. |
| 4,745,564 A | 5/1988 | Tennes et al. |
| 4,757,453 A | 7/1988 | Nasiff |
| 4,757,714 A | 7/1988 | Purdy et al. |
| 4,759,219 A | 7/1988 | Cobb et al. |
| 4,763,275 A | 8/1988 | Carlin |
| 4,763,284 A | 8/1988 | Carlin |
| 4,763,287 A | 8/1988 | Gerhaeuser et al. |
| 4,771,394 A | 9/1988 | Cavanagh |
| 4,774,679 A | 9/1988 | Carlin |
| 4,775,948 A | 10/1988 | Dial et al. |
| 4,780,837 A | 10/1988 | Namekawa |
| 4,821,218 A | 4/1989 | Potsch |
| 4,822,042 A | 4/1989 | Landsman |
| 4,824,107 A | 4/1989 | French |
| 4,829,812 A | 5/1989 | Parks et al. |
| 4,830,021 A | 5/1989 | Thornton |
| 4,862,394 A | 8/1989 | Thompson et al. |
| 4,862,395 A | 8/1989 | Fey et al. |
| 4,873,867 A | 10/1989 | McPherson et al. |
| 4,876,500 A | 10/1989 | Wu |
| 4,883,271 A | 11/1989 | French |
| 4,903,212 A | 2/1990 | Yokouchi et al. |
| 4,908,523 A | 3/1990 | Snowden et al. |
| 4,928,307 A | 5/1990 | Lynn |
| 4,935,887 A | 6/1990 | Abdalah et al. |
| 4,951,171 A | 8/1990 | Tran et al. |
| 4,955,980 A | 9/1990 | Masuo |
| 5,033,013 A | 7/1991 | Kato et al. |
| 5,036,467 A | 7/1991 | Blackburn et al. |
| 5,056,783 A | 10/1991 | Matcovich et al. |
| 5,067,081 A | 11/1991 | Person |
| 5,088,836 A | 2/1992 | Yamada et al. |
| 5,117,444 A | 5/1992 | Sutton et al. |
| 5,144,226 A | 9/1992 | Rapp |
| 5,148,002 A | 9/1992 | Kuo et al. |
| 5,150,310 A | 9/1992 | Greenspun et al. |
| 5,162,828 A | 11/1992 | Furness et al. |
| 5,181,181 A | 1/1993 | Glynn |
| 5,200,827 A | 4/1993 | Hanson et al. |
| 5,243,993 A | 9/1993 | Alexander et al. |
| 5,258,927 A | 11/1993 | Havriluk et al. |
| 5,295,085 A | 3/1994 | Hoffacker |
| 5,316,249 A | 5/1994 | Anderson |
| 5,324,038 A | 6/1994 | Sasser |
| 5,335,664 A | 8/1994 | Nagashima |
| 5,339,699 A | 8/1994 | Carignan |
| 5,343,445 A | 8/1994 | Cherdak |
| 5,348,519 A | 9/1994 | Prince et al. |
| 5,382,972 A | 1/1995 | Kannes |
| 5,396,429 A | 3/1995 | Hanchett |
| 5,406,305 A | 4/1995 | Shimomura et al. |
| 5,420,828 A | 5/1995 | Geiger |
| 5,426,595 A | 6/1995 | Picard |
| 5,436,838 A | 7/1995 | Miyamori |
| 5,446,775 A | 8/1995 | Wright et al. |
| 5,450,329 A | 9/1995 | Tanner |
| 5,452,269 A | 9/1995 | Cherdak |
| 5,471,405 A | 11/1995 | Marsh |
| 5,475,725 A | 12/1995 | Nakamura |
| 5,476,427 A | 12/1995 | Fujima |
| 5,478,006 A | 12/1995 | Taguchi |
| 5,485,402 A | 1/1996 | Smith et al. |
| 5,486,815 A | 1/1996 | Wagner |
| 5,509,082 A | 4/1996 | Toyama et al. |
| 5,513,854 A | 5/1996 | Daver |
| 5,524,637 A | 6/1996 | Erickson |
| 5,526,326 A | 6/1996 | Fekete et al. |
| 5,528,228 A | 6/1996 | Wilk |
| 5,539,336 A | 7/1996 | Nguyen et al. |
| 5,541,604 A | 7/1996 | Meier |
| 5,546,307 A | 8/1996 | Mazur et al. |
| 5,546,974 A | 8/1996 | Bireley |
| 5,559,945 A | 9/1996 | Beaudet et al. |
| 5,564,698 A | 10/1996 | Honey et al. |
| 5,574,669 A | 11/1996 | Marshall |
| 5,583,776 A | 12/1996 | Levi et al. |
| 5,583,993 A | 12/1996 | Foster et al. |
| 5,590,908 A | 1/1997 | Carr |
| 5,592,401 A | 1/1997 | Kramer |
| 5,605,336 A | 2/1997 | Gaoiran et al. |
| 5,608,698 A | 3/1997 | Yamanoi et al. |
| 5,615,132 A | 3/1997 | Horton et al. |
| 5,616,876 A | 4/1997 | Cluts |
| 5,617,084 A | 4/1997 | Sears |
| 5,617,386 A | 4/1997 | Choi |
| 5,618,995 A | 4/1997 | Otto et al. |
| 5,627,548 A | 5/1997 | Woo et al. |
| 5,629,131 A | 5/1997 | De Keyzer et al. |
| 5,633,070 A | 5/1997 | Murayama et al. |
| 5,636,146 A | 6/1997 | Flentov et al. |
| 5,646,857 A | 7/1997 | McBurney et al. |
| 5,670,985 A | 9/1997 | Cappels, Sr. et al. |
| 5,671,010 A | 9/1997 | Shimbo et al. |
| 5,671,162 A | 9/1997 | Werbin |
| 5,673,691 A | 10/1997 | Abrams et al. |
| 5,680,102 A | 10/1997 | Xydis |
| 5,684,513 A | 11/1997 | Decker |
| 5,688,183 A | 11/1997 | Sabatino et al. |
| 5,690,119 A | 11/1997 | Rytky et al. |
| 5,690,591 A | 11/1997 | Kenmochi et al. |
| 5,690,773 A | 11/1997 | Fidalgo et al. |
| 5,694,340 A | 12/1997 | Kim |
| 5,701,257 A | 12/1997 | Miura et al. |
| 5,710,922 A | 1/1998 | Alley et al. |
| 5,712,638 A | 1/1998 | Issa |
| 5,712,949 A | 1/1998 | Kato et al. |
| 5,720,200 A | 2/1998 | Anderson et al. |
| 5,721,539 A | 2/1998 | Goetzl |
| 5,721,949 A | 2/1998 | Smith et al. |
| 5,723,786 A | 3/1998 | Klapman |
| 5,724,265 A | 3/1998 | Hutchings |
| 5,726,672 A | 3/1998 | Hernandez et al. |
| 5,734,337 A | 3/1998 | Kupersmit |
| 5,738,104 A | 4/1998 | Lo et al. |
| 5,739,451 A | 4/1998 | Winksy et al. |
| 5,740,143 A | 4/1998 | Suetomi |
| 5,743,269 A | 4/1998 | Okigami et al. |
| 5,745,037 A | 4/1998 | Guthrie et al. |
| 5,749,615 A | 5/1998 | Iston |
| 5,761,096 A | 6/1998 | Zakutin |
| 5,771,485 A | 6/1998 | Echigo |
| 5,779,576 A | 7/1998 | Smith, III et al. |
| 5,781,155 A | 7/1998 | Woo et al. |
| 5,790,477 A | 8/1998 | Hauke |
| 5,807,284 A | 9/1998 | Foxlin |
| 5,812,056 A | 9/1998 | Law |
| 5,815,225 A | 9/1998 | Nelson |

| Patent | Kind | Date | Inventor |
|---|---|---|---|
| 5,822,288 | A | 10/1998 | Shinada |
| 5,835,721 | A | 11/1998 | Donahue et al. |
| 5,835,732 | A | 11/1998 | Kikinis et al. |
| 5,862,803 | A | 1/1999 | Besson et al. |
| 5,864,868 | A | 1/1999 | Contois |
| 5,870,710 | A | 2/1999 | Ozawa et al. |
| 5,886,739 | A | 3/1999 | Winningstad |
| 5,891,042 | A | 4/1999 | Sham et al. |
| 5,895,073 | A | 4/1999 | Moore |
| 5,897,457 | A | 4/1999 | Mackovjak |
| 5,899,963 | A | 5/1999 | Hutchings |
| 5,901,303 | A | 5/1999 | Chew |
| 5,905,460 | A | 5/1999 | Odagiri et al. |
| 5,918,281 | A | 6/1999 | Nabulsi |
| 5,918,303 | A | 6/1999 | Yamaura et al. |
| 5,920,728 | A | 7/1999 | Hallowell et al. |
| 5,923,757 | A | 7/1999 | Hocker et al. |
| 5,925,001 | A | 7/1999 | Hoyt et al. |
| 5,929,335 | A | 7/1999 | Carter |
| 5,930,741 | A | 7/1999 | Kramer |
| 5,936,523 | A | 8/1999 | West |
| 5,946,643 | A | 8/1999 | Zakutin |
| 5,947,917 | A | 9/1999 | Carte et al. |
| 5,952,992 | A | 9/1999 | Helms |
| 5,955,667 | A | 9/1999 | Fyfe |
| 5,959,568 | A | 9/1999 | Wooley |
| 5,960,380 | A | 9/1999 | Flentov et al. |
| 5,963,523 | A | 10/1999 | Kayama et al. |
| 5,963,891 | A | 10/1999 | Walker et al. |
| 5,976,083 | A | 11/1999 | Richardson et al. |
| 5,977,877 | A | 11/1999 | McCulloch et al. |
| 5,978,972 | A | 11/1999 | Stewart et al. |
| 5,984,842 | A | 11/1999 | Chu |
| 6,002,982 | A | 12/1999 | Fry |
| 6,006,274 | A | 12/1999 | Hawkins et al. |
| 6,009,237 | A | 12/1999 | Hirabayashi et al. |
| 6,009,629 | A | 1/2000 | Gnepf et al. |
| 6,011,491 | A | 1/2000 | Goetzi |
| 6,011,585 | A | 1/2000 | Anderson |
| 6,013,007 | A | 1/2000 | Root et al. |
| 6,018,677 | A | 1/2000 | Vidrine et al. |
| 6,018,705 | A | 1/2000 | Gaudet et al. |
| 6,020,851 | A | 2/2000 | Busack |
| 6,028,617 | A | 2/2000 | Sawano et al. |
| 6,028,625 | A | 2/2000 | Cannon |
| 6,028,627 | A | 2/2000 | Helmsderfer |
| 6,032,084 | A | 2/2000 | Anderson et al. |
| 6,032,108 | A | 2/2000 | Seiple et al. |
| 6,032,530 | A | 3/2000 | Hock |
| 6,041,023 | A | 3/2000 | Lakhansingh |
| 6,043,747 | A | 3/2000 | Altenhofen |
| 6,045,364 | A | 4/2000 | Dugan et al. |
| 6,052,654 | A | 4/2000 | Gaudet et al. |
| 6,057,756 | A | 5/2000 | Engellener |
| 6,059,576 | A | 5/2000 | Brann |
| 6,073,086 | A | 6/2000 | Marinelli |
| 6,074,271 | A | 6/2000 | Derrah |
| 6,075,443 | A | 6/2000 | Schepps et al. |
| 6,091,342 | A | 7/2000 | Janesch et al. |
| 6,108,426 | A | 8/2000 | Stortz |
| 6,111,541 | A | 8/2000 | Karmel |
| 6,111,571 | A | 8/2000 | Summers |
| 6,122,340 | A | 9/2000 | Darley et al. |
| 6,122,959 | A | 9/2000 | Hoshal et al. |
| 6,122,960 | A | 9/2000 | Hutchings |
| 6,125,686 | A | 10/2000 | Haan et al. |
| 6,127,931 | A | 10/2000 | Mohr |
| 6,145,389 | A | 11/2000 | Ebeling et al. |
| 6,148,271 | A | 11/2000 | Marinelli |
| 6,151,647 | A | 11/2000 | Sarat |
| 6,157,898 | A | 12/2000 | Marinelli |
| 6,160,254 | A | 12/2000 | Zimmerman et al. |
| 6,161,944 | A | 12/2000 | Leman |
| 6,163,021 | A | 12/2000 | Mickelson |
| 6,167,356 | A | 12/2000 | Squadron et al. |
| 6,172,948 | B1 | 1/2001 | Keller et al. |
| 6,179,432 | B1 | 1/2001 | Zhang et al. |
| 6,183,425 | B1 | 2/2001 | Whalen et al. |
| 6,191,939 | B1 | 2/2001 | Burnett |
| 6,196,932 | B1 | 3/2001 | Marsh et al. |
| 6,204,813 | B1 | 3/2001 | Wadell et al. |
| 6,208,044 | B1 | 3/2001 | Viswanadham et al. |
| 6,216,131 | B1 | 4/2001 | Liu et al. |
| 6,217,183 | B1 | 4/2001 | Shipman |
| 6,226,622 | B1 | 5/2001 | Dabbiere |
| 6,238,338 | B1 | 5/2001 | DeLuca et al. |
| 6,245,002 | B1 | 6/2001 | Belikov |
| 6,248,946 | B1 | 6/2001 | Dwek |
| 6,249,487 | B1 | 6/2001 | Yano et al. |
| 6,254,513 | B1 | 7/2001 | Takenaka et al. |
| 6,263,279 | B1 | 7/2001 | Bianco et al. |
| 6,266,623 | B1 | 7/2001 | Vock et al. |
| 6,295,541 | B1 | 9/2001 | Bodnar et al. |
| 6,298,314 | B1 | 10/2001 | Blackadar et al. |
| 6,305,221 | B1 | 10/2001 | Hutchings |
| 6,332,175 | B1 | 12/2001 | Birrell et al. |
| 6,336,365 | B1 | 1/2002 | Blackadar et al. |
| 6,336,727 | B1 | 1/2002 | Kim |
| 6,341,316 | B1 | 1/2002 | Kloba et al. |
| 6,356,856 | B1 | 3/2002 | Damen et al. |
| 6,357,147 | B1 | 3/2002 | Darley et al. |
| 6,360,597 | B1 | 3/2002 | Hubbard, Jr. |
| 6,377,530 | B1 | 4/2002 | Burrows |
| 6,380,597 | B1 | 4/2002 | Gudesen et al. |
| 6,385,473 | B1 | 5/2002 | Haines et al. |
| 6,436,052 | B1 | 8/2002 | Nikolic et al. |
| 6,441,747 | B1 | 8/2002 | Khair et al. |
| 6,452,610 | B1 | 9/2002 | Reinhardt et al. |
| 6,456,261 | B1 | 9/2002 | Zhang |
| 6,459,881 | B1 | 10/2002 | Hoder et al. |
| 6,467,924 | B2 | 10/2002 | Shipman |
| 6,493,652 | B1 | 12/2002 | Ohlenbusch et al. |
| 6,498,994 | B2 | 12/2002 | Vock et al. |
| 6,501,393 | B1 | 12/2002 | Richards et al. |
| 6,504,483 | B1 | 1/2003 | Richards et al. |
| 6,516,284 | B2 | 2/2003 | Flentov et al. |
| 6,527,711 | B1 | 3/2003 | Stivoric |
| 6,529,131 | B2 | 3/2003 | Wentworth |
| 6,531,982 | B1 | 3/2003 | White et al. |
| 6,536,139 | B2 | 3/2003 | Darley et al. |
| 6,539,336 | B1 | 3/2003 | Vock et al. |
| 6,549,497 | B2 | 4/2003 | Miyamoto et al. |
| 6,560,903 | B1 | 5/2003 | Darley |
| 6,563,417 | B1 | 5/2003 | Shaw |
| 6,570,526 | B1 | 5/2003 | Noller et al. |
| 6,587,403 | B1 | 7/2003 | Keller et al. |
| 6,587,404 | B1 | 7/2003 | Keller et al. |
| 6,595,929 | B2 | 7/2003 | Stivoric |
| 6,600,418 | B2 | 7/2003 | Francis et al. |
| 6,605,038 | B1 | 8/2003 | Teller et al. |
| 6,611,782 | B1 | 8/2003 | Wooster |
| 6,611,789 | B1 | 8/2003 | Darley |
| 6,617,962 | B1 | 9/2003 | Horwitz et al. |
| 6,619,835 | B2 | 9/2003 | Kita |
| 6,621,768 | B1 | 9/2003 | Keller et al. |
| 6,623,427 | B2 | 9/2003 | Mandigo |
| 6,633,743 | B1 | 10/2003 | Berlinsky |
| 6,643,608 | B1 | 11/2003 | Hershey et al. |
| 6,714,121 | B1 | 3/2004 | Moore |
| 6,731,312 | B2 | 5/2004 | Robbin |
| 6,735,630 | B1 | 5/2004 | Gelvin et al. |
| 6,748,902 | B1 | 6/2004 | Boesch et al. |
| 6,760,536 | B1 | 7/2004 | Amir et al. |
| 6,762,741 | B2 | 7/2004 | Weindorf |
| 6,772,331 | B1 | 8/2004 | Hind et al. |
| 6,794,566 | B2 | 9/2004 | Pachet |

| | | |
|---|---|---|
| 6,799,226 B1 | 9/2004 | Robbin et al. |
| 6,801,964 B1 | 10/2004 | Mahdavi |
| 6,813,586 B1 | 11/2004 | Vock et al. |
| 6,825,777 B2 | 11/2004 | Vock et al. |
| 6,837,827 B1 * | 1/2005 | Lee et al. .................. 482/8 |
| 6,856,934 B2 | 2/2005 | Vock et al. |
| 6,870,529 B1 | 3/2005 | Davis |
| 6,871,063 B1 | 3/2005 | Schiffer |
| 6,876,947 B1 | 4/2005 | Darley et al. |
| 6,882,955 B1 | 4/2005 | Ohlenbusch et al. |
| 6,883,694 B2 | 4/2005 | Abelow |
| 6,885,971 B2 | 4/2005 | Vock et al. |
| 6,898,550 B1 | 5/2005 | Blackadar et al. |
| 6,900,732 B2 | 5/2005 | Richards |
| 6,911,971 B2 | 6/2005 | Suzuki et al. |
| 6,914,551 B2 | 7/2005 | Vidal |
| 6,918,677 B2 | 7/2005 | Shipman |
| 6,934,812 B1 | 8/2005 | Robbin et al. |
| 6,950,087 B2 | 9/2005 | Knox et al. |
| 6,959,259 B2 | 10/2005 | Vock et al. |
| 7,009,517 B2 | 3/2006 | Wood |
| 7,042,360 B2 | 5/2006 | Light et al. |
| 7,046,230 B2 | 5/2006 | Zadesky |
| 7,054,784 B2 | 5/2006 | Flentov et al. |
| 7,062,225 B2 | 6/2006 | White |
| 7,064,669 B2 | 6/2006 | Light et al. |
| 7,072,789 B2 | 7/2006 | Vock et al. |
| 7,084,856 B2 | 8/2006 | Huppi |
| 7,084,921 B1 | 8/2006 | Ogawa |
| 7,092,846 B2 | 8/2006 | Vock et al. |
| 7,146,437 B2 | 12/2006 | Robbin et al. |
| 7,174,130 B2 | 2/2007 | Kurisko et al. |
| 7,174,277 B2 | 2/2007 | Vock et al. |
| 7,234,026 B2 | 6/2007 | Robbin et al. |
| 7,254,516 B2 | 8/2007 | Case et al. |
| 2001/0022828 A1 | 9/2001 | Pyles |
| 2001/0033244 A1 | 10/2001 | Harris et al. |
| 2001/0041021 A1 | 11/2001 | Boyle et al. |
| 2001/0042107 A1 | 11/2001 | Palm |
| 2001/0049890 A1 | 12/2001 | Hirsch et al. |
| 2002/0002413 A1 | 1/2002 | Tokue |
| 2002/0013784 A1 | 1/2002 | Swanson |
| 2002/0022551 A1 * | 2/2002 | Watterson et al. .......... 482/8 |
| 2002/0045961 A1 | 4/2002 | Gibbs et al. |
| 2002/0046315 A1 | 4/2002 | Miller et al. |
| 2002/0055934 A1 | 5/2002 | Lipscomb et al. |
| 2002/0090912 A1 | 7/2002 | Cannon et al. |
| 2002/0116082 A1 | 8/2002 | Gudorf |
| 2002/0152045 A1 | 10/2002 | Dowling et al. |
| 2002/0161865 A1 | 10/2002 | Nguyen |
| 2002/0173273 A1 | 11/2002 | Spurgat et al. |
| 2002/0189426 A1 | 12/2002 | Hirade et al. |
| 2003/0037254 A1 | 2/2003 | Fischer et al. |
| 2003/0046434 A1 | 3/2003 | Flanagin et al. |
| 2003/0065805 A1 | 4/2003 | Barnes |
| 2003/0074457 A1 | 4/2003 | Kluth |
| 2003/0076301 A1 | 4/2003 | Tsuk et al. |
| 2003/0079038 A1 | 4/2003 | Robbin et al. |
| 2003/0095096 A1 | 5/2003 | Robbin et al. |
| 2003/0097379 A1 | 5/2003 | Ireton |
| 2003/0133694 A1 | 7/2003 | Yeo |
| 2003/0163287 A1 | 8/2003 | Volk et al. |
| 2003/0167318 A1 | 9/2003 | Robbin et al. |
| 2003/0229490 A1 | 12/2003 | Etter |
| 2004/0001395 A1 | 1/2004 | Keller et al. |
| 2004/0001396 A1 | 1/2004 | Keller et al. |
| 2004/0012556 A1 | 1/2004 | Yong et al. |
| 2004/0055446 A1 | 3/2004 | Robbin et al. |
| 2004/0069122 A1 | 4/2004 | Wilson |
| 2004/0076086 A1 | 4/2004 | Keller et al. |
| 2004/0086120 A1 | 5/2004 | Akins, III et al. |
| 2004/0094018 A1 | 5/2004 | Ueshima et al. |
| 2004/0104845 A1 | 6/2004 | McCarthy |
| 2004/0198436 A1 | 10/2004 | Alden |
| 2004/0224638 A1 | 11/2004 | Fadell et al. |
| 2004/0267825 A1 | 12/2004 | Novak et al. |
| 2005/0015254 A1 | 1/2005 | Beaman |
| 2005/0027910 A1 | 2/2005 | Barrett, Jr. et al. |
| 2005/0080566 A1 | 4/2005 | Vock et al. |
| 2005/0088275 A1 | 4/2005 | Valoteau et al. |
| 2005/0152294 A1 | 7/2005 | Yu et al. |
| 2005/0166153 A1 | 7/2005 | Eytchison et al. |
| 2005/0177929 A1 | 8/2005 | Greenwald et al. |
| 2005/0245839 A1 | 11/2005 | Stivoric et al. |
| 2005/0266798 A1 | 12/2005 | Moloney et al. |
| 2005/0266961 A1 | 12/2005 | Shum et al. |
| 2006/0013414 A1 | 1/2006 | Shih |
| 2006/0068760 A1 | 3/2006 | Hameed et al. |
| 2006/0097847 A1 | 5/2006 | Bervoets et al. |
| 2006/0152377 A1 | 7/2006 | Beebe et al. |
| 2006/0190577 A1 | 8/2006 | Yamada |
| 2006/0221788 A1 | 10/2006 | Lindahl et al. |
| 2006/0265503 A1 | 11/2006 | Jones et al. |
| 2007/0011919 A1 | 1/2007 | Case |
| 2007/0021269 A1 * | 1/2007 | Shum .................... 482/8 |
| 2007/0028009 A1 | 2/2007 | Robbin et al. |
| 2007/0032195 A1 | 2/2007 | Kurisko et al. |
| 2007/0124679 A1 | 5/2007 | Jeong et al. |
| 2008/0125288 A1 | 5/2008 | Case |

FOREIGN PATENT DOCUMENTS

| | | |
|---|---|---|
| DE | 44 45 023 A1 | 6/1996 |
| DE | 10325805 | 1/2005 |
| EP | 0 127 139 | 5/1984 |
| EP | 0336782 A2 | 10/1989 |
| EP | 0578604 | 1/1994 |
| EP | 0 757 437 | 2/1997 |
| EP | 0 863 469 | 9/1998 |
| EP | 0 917 077 | 5/1999 |
| EP | 0917893 B1 | 5/1999 |
| EP | 0 982 732 | 3/2000 |
| EP | 1 028 425 | 8/2000 |
| EP | 1028426 A2 | 8/2000 |
| EP | 1 076 302 | 2/2001 |
| EP | 1 455 477 | 9/2004 |
| EP | 1536612 | 6/2005 |
| EP | 1566948 | 8/2005 |
| GB | 1567238 | 5/1980 |
| GB | 2137363 | 10/1984 |
| GB | 2384399 | 7/2003 |
| JP | 59-023610 | 2/1984 |
| JP | 03-152469 | 6/1991 |
| JP | 2000122044 | 4/2000 |
| JP | 2000-224099 | 8/2000 |
| JP | 2000-299834 | 10/2000 |
| JP | 2001-312338 | 11/2001 |
| JP | 2001321202 | 11/2001 |
| JP | 2002-076977 | 3/2002 |
| JP | 2002101908 | 4/2002 |
| JP | 1 289 197 | 3/2003 |
| WO | WO 95/16950 | 6/1995 |
| WO | 98/17032 | 4/1998 |
| WO | WO 98/06466 | 12/1998 |
| WO | WO 98/54581 | 12/1998 |
| WO | WO 00/22820 | 4/2000 |
| WO | WO 00/51259 | 8/2000 |
| WO | WO 00/78170 | 12/2000 |
| WO | WO 01/01706 A1 | 4/2001 |
| WO | WO 01/33569 | 5/2001 |
| WO | WO 01/65413 | 9/2001 |
| WO | WO 01/67753 | 9/2001 |
| WO | WO 02/25610 | 3/2002 |
| WO | WO 03/023786 | 3/2003 |
| WO | WO 03/067202 | 8/2003 |
| WO | 2004/061850 A1 | 7/2004 |

| | | |
|---|---|---|
| WO | WO 2004/055637 | 7/2004 |
| WO | WO 2004/084413 A2 | 9/2004 |
| WO | WO 2005/031737 | 4/2005 |
| WO | 2005/048644 | 5/2005 |
| WO | WO 2005/008505 | 7/2005 |
| WO | 2005/109781 | 11/2005 |
| WO | 2006/071364 | 6/2006 |
| WO | WO 2006/094380 | 9/2006 |
| WO | WO 2007/022421 | 2/2007 |

OTHER PUBLICATIONS

International Search Report dated Dec. 5, 2007 in PCT Application No. PCT/US2007/004810.
International Search Report in Patent Application No. PCT/US2006/048738 dated Jan. 29, 2008.
International Search Report in Patent Application No. PCT/US2007/077020 dated Jan. 28, 2008.
International Search Report in Patent Application No. PCT/US2007/076889 dated Jan. 28, 2008.
iTunes, Wikipedia: The Free Encyclopedia; downloaded on Oct. 5, 2005, pp. 1-6.
Nutzel et al., "Sharing Systems for Future HiFi Systems", The Computer Society, Jun. 2004.
Partial Search Report dated Sep. 6, 2007 in PCT Application No. PCT/US2007/004810.
Written Opinion dated Dec. 5, 2007 in PCT Application No. PCT/US2007/004810.
Written Opinion in Patent Application No. PCT/US2006/048738 dated Jan. 29, 2008.
Written Opinion in Patent Application No. PCT/US2007/076889 dated Jan. 28, 2008.
Written Opinion in Patent Application No. PCT/US2007/077020 dated Jan. 28, 2008.
Office Action dated Feb. 1, 2008 in U.S. Appl. No. 11/327,544.
Hart-Daves, Guy. "How To Do Everything With Your iPod and iPod Mini", 2004, McGraw-Hill Professional, p. 33.
Office Action dated Feb. 4, 2008 in U.S. Appl. No. 11/566,072.
International Search Report dated Dec. 6, 2007 in PCT Application No. PCT/US2007/010888.
Written Opinion dated Dec. 6, 2007 in PCT Application No. PCT/US2007/010888.
U.S. Appl. No. 10/125,893, filed Apr. 18, 2002 and titled "Power Adapters for Powering and/or Charging Peripheral Devices.".
International Search Report dated Nov. 24, 2006 in PCT Application No. PCT/US2005/046797.
Written Opinion of the International Searching Authority dated Nov. 24, 2006 in PCT Application No. PCT/US2005/046797.
Partial Search Report and Invitation to Pay Fees dated Apr. 8, 2008 in PCT Application No. PCT/US2007/012033.
EP98928854.3 Supplementary Search Report Feb. 18, 2002.
EP989288543 Supplementary European Search Report; Feb. 18, 2002.
PCT/US98/11268 International Search Report mailed Jan. 11, 1999.
PCT/US00/18237 International Search Report; Oct. 17, 2000.
PCT/US01/51620 International Search Report mailed Sep. 25, 2002.
PCT/US00/18237 International Preliminary Examination Report; Sep. 11, 2003.
Civil Action No. 05-CV-02323; Complaint, Nov. 16, 2005.
Civil Action No. 06-CV-01100-WDM-PAC, Complaint, Jun. 8, 2000.
Civil Action No. 06-CV-01100-WDM-PAC, Defendants Polar Electro Inc.'s And Polar Electro Oy's Answer And Affirmative Defenses: Polar Electro Inc. '5 Counterclaim and Demand For Jury Trial, Jun. 29, 2006.
Civil Action No. 06-CV-01447-MSK-BNB, Complaint, Jul. 26, 2006.
Civil Action No. 06-CV-01447 MSK-BNB, First Amended Complaint; Aug. 16, 2006.
Civil Action No. 06-CV-01447-MSK-BNB, Answer, Affirmative Defenses, Counterclaim, And Demand For Jury Trial, Garmin; Sep. 26, 2006.
Civil Action No. 06-CV-01447-MSK-BNB; Garmin Disclosure Statement; Sep. 26, 2006.
Civil Action No. 06-CV-01447 MSK-BNB, Answer, Affirmative Defenses, Counterclaims And Demand For Jury Trial, Timex; Sep. 26, 2006.
Civil Action No. 06-CV-01447-MSK-BNB; Timex Disclosure Statement; Sep. 26, 2006.
Civil Action No. 06-CV-01447-MSK-BNB: PhatRat Technology, Inc.'s Supplemental Answers and Objections to Defendant, Timex Corporation's Interrogatories Nos. 1, 2, 5, 7-11, 13 and 15; Feb. 12, 2007.
Civil Action No. 06-CV-02122-REB-MJW, Complaint, Oct. 24, 2006.
Civil Action No. 06-CV-02122-REB-MJW, Apple Computer, Inc.'s Answer To Complaint And Counterclaims, Jan. 22, 2007.
Civil Action No. 07-CV-00078-MSK-BNB, Complaint, Jan. 12, 2007.
Civil Action No. 07-CV-00078-MSK-BNB, Answer, Feb. 9, 2007.
Civil Action No. 07-CV-00238-REB-PAC, Complaint, Mar. 19, 2007.
Civil Action No. 07-CV-00238-REB, Apple Inc.'s Answer to Complaint, Counterclaims and Jury Demand, Mar. 19, 2007.
Civil Action No. 07-CV-00238; Nike Inc.'s Answer, Affirmative Defenses to First Complaint, Mar. 19, 2007.
U.S. Appl. No. 08/764,758, Office Action mailed Aug. 21, 1997.
U.S. Appl. No. 08/764,758, Response to Office Action mailed Aug. 21, 1997.
U.S. Appl. No. 08/764,758, Office Action mailed Dec. 15, 1998.
U.S. Appl. No. 08/764,758, Response to Office Action mailed Dec. 15, 1998.
U.S. Appl. No. 08/764,758, Office Action mailed May 8, 1998.
U.S. Appl. No. 08/764,758, Response to Office Action mailed May 8, 1998, filed Oct. 8, 1998.
U.S. Appl. No. 08/764,758, Notice of Allowance mailed Jun. 1, 1999.
U.S. Appl. No. 08/764,758, Advisory Action mailed Apr. 29, 1999.
U.S. Appl. No. 08/867,083, Office Action mailed Apr. 8, 1999.
U.S. Appl. No. 08/764,758, Rule 116 Amendment filed Apr. 8, 1999.
U.S. Appl. No. 08/764,758, Rule 116 Amendment filed May 13, 1999.
U.S. Appl. No. 08/867,083, Response to Office Action mailed Apr. 8, 1999.
U.S. Appl. No. 08/867,083, Supp. Response to Office Action mailed Apr. 8, 1999.
U.S. Appl. No. 08/867,083, Final Office Action mailed Jan. 3, 2000.
U.S. Appl. No. 08/867,083, Notice of Appeal mailed Jan. 3, 2000.
U.S. Appl. No. 08/867,083, Notice of Appeal Response to Office Action mailed Jan. 3, 2000.
U.S. Appl. No. 08/867,083, Advisory Action mailed Mar. 14, 2000.
U.S. Appl. No. 08/867,083 Office Action mailed Jun. 26, 2000.
U.S. Appl. No. 08/867,083 Amendment response to Office Action mailed Jun. 26, 2000.
U.S. Appl. No. 08/867,083 Notice of Allowance, mailed Feb. 6, 2001.
U.S. Appl. No. 09/089,232, Information Disclosure Statement mailed Oct. 23, 1998.
U.S. Appl. No. 09/089,232, Office Action mailed Nov. 27, 1998.
U.S. Appl. No. 09/089,232, Office Action mailed May 30, 2000.
U.S. Appl. No. 09/089,232, Preliminary Amendment response to Office Action mailed May 30, 2000.
U.S. Appl. No. 09/089,232, Office Action mailed Dec. 19, 2000.
U.S. Appl. No. 09/089,232, Response to Office Action mailed Dec. 19, 2000.
U.S. Appl. No. 09/089,232, Office Action mailed Aug. 8, 2001.
U.S. Appl. No. 09/089,232, Notice of Appeal mailed Nov. 5, 2001.
U.S. Appl. No. 09/089,232, Notice of Appeal mailed Nov. 7, 2001.
U.S. Appl. No. 09/089,232, Appeal Brief mailed Jan. 2, 2002.
U.S. Appl. No. 09/089,232, Office Action mailed Apr. 26, 2002.
U.S. Appl. No. 09/089,232, Appeal Brief mailed Jul. 26, 2002.
U.S. Appl. No. 09/089,232, Notice of Allowance mailed Oct. 2, 2002.
U.S. Appl. No. 09/089,232, Comments on Allowance mailed Oct. 16, 2002.
U.S. Appl. No. 09/089,232, Office Action mailed Jan. 27, 2003.
U.S. Appl. No. 09/698,659, Office Action mailed Mar. 19, 2002.

U.S. Appl. No. 09/698,659, Response to Office Action of Mar. 19, 2002.
U.S. Appl. No. 09/698,659, Office Action mailed Nov. 21, 2002.
U.S. Appl. No. 09/698,659, Response to Office Action of Nov. 21, 2002.
U.S. Appl. No. 09/698,659, Notice of Allowance mailed Apr. 9, 2003.
U.S. Appl. No. 09/848,445, Preliminary Amendment mailed Dec. 5, 2001.
U.S. Appl. No. 09/848,445, Office Action mailed Dec. 5, 2003.
U.S. Appl. No. 09/848,445, Response to Office Action mailed Dec. 5, 2003.
U.S. Appl. No. 09/848,445, Office Action mailed May 6, 2004.
U.S. Appl. No. 09/848,445, Response to Office Action (Rule 116) mailed Jun. 5, 2004.
U.S. Appl. No. 09/886,578, Preliminary Amendment mailed Jun. 21, 2001.
U.S. Appl. No. 09/886,578, Office Action mailed Nov. 8, 2001.
U.S. Appl. No. 09/886,578, Response to Office Action mailed Nov. 8, 2001.
U.S. Appl. No. 09/886,578, Office Action mailed Jun. 5, 2002.
U.S. Appl. No. 09/886,578, Response to Office Action mailed Jun. 5, 2002.
U.S. Appl. No. 09/886,578, Notice of Allowance mailed Sep. 9, 2002.
U.S. Appl. No. 09/992,966, Office Action mailed Feb. 3, 2003.
U.S. Appl. No. 09/992,966, Response to Office Action mailed Feb. 3, 2003.
U.S. Appl. No. 09/992,966, Office Action mailed Mar. 28, 2002.
U.S. Appl. No. 09/992,966, Response to Office Action mailed Mar. 28, 2002.
U.S. Appl. No. 09/992,966, Office Action mailed Jul. 18, 2003.
U.S. Appl. No. 09/992,966, Response to Office Action mailed Jul. 18, 2003.
U.S. Appl. No. 09/992,966, Examiner Summary mailed Oct. 27, 2003.
U.S. Appl. No. 09/992,966, Notice of Allowance mailed Apr. 15, 2004.
U.S. Appl. No. 09/992,966, Office Action mailed Jan. 6, 2004.
U.S. Appl. No. 09/992,966, Response to Office Action mailed Jan. 6, 2004.
U.S. Appl. No. 09/992,966, Notice of Allowance mailed Sep. 3, 2004.
U.S. Appl. No. 10/234,660, Office Action mailed Mar. 31, 2003.
U.S. Appl. No. 10/234,660, Response to Office Action mailed Mar. 31, 2003.
U.S. Appl. No. 10/234,660, Final Office Action mailed Oct. 31, 2003.
U.S. Appl. No. 10/234,660, Dec. 23, 2003 Response to Telephone Interview mailed Oct. 31, 2003.
U.S. Appl. No. 10/234,660; Advisory Action mailed Jan. 27, 2004.
U.S. Appl. No. 10/234,660; Appeal Brief filed Jun. 14, 2004.
U.S. Appl. No. 10/234,660; Amendment filed Jul. 20, 2004.
U.S. Appl. No. 10/234,660; Marked up Claims by USPTO dated Jul. 28, 2004.
U.S. Appl. No. 10/234,660; Notice of Allowance; Aug. 2, 2004.
U.S. Appl. No. 10/297,270 Office Action mailed Jul. 29, 2004.
U.S. Appl. No. 10/297,270 Response to Office Action mailed Jul. 29, 2004.
U.S. Appl. No. 10/297,270 Office Action mailed Dec. 13, 2004.
U.S. Appl. No. 10/297,270 Response to Office Action mailed Dec. 13, 2004.
U.S. Appl. No. 10/297,270 Request Deletion of Named Inventors Pursuant to 37 Cfr § 1.63 (d)(2) received by the Patent Office on Oct. 4, 2002.
U.S. Appl. No. 10/297,270 Office Action mailed Jul. 13, 2005.
U.S. Appl. No. 10/297,270 Response to Office Action mailed Jul. 13, 2005.
U.S. Appl. No. 10/297,270 Office Action mailed Feb. 9, 2006.
U.S. Appl. No. 10/297,270 Response to Office Action mailed Feb. 9, 2006.
U.S. Appl. No. 10/297,270 Office Action mailed Sep. 25, 2006.
U.S. Appl. No. 10/297,270 Response to Office Action mailed Sep. 25, 2006.
U.S. Appl. No. 10/297,270 Office Action mailed Jan. 11, 2007.
U.S. Appl. No. 10/297,270 Response to Office Action mailed Jan. 11, 2007.
U.S. Appl. No. 10/297,270 Office Action mailed Jul. 26, 2007.
U.S. Appl. No. 10/297,270 Response to Office Action mailed Jul. 26, 2007.
U.S. Appl. No. 10/601,208 Preliminary Amendment, mailed Jun. 20, 2003.
U.S. Appl. No. 10/601,208 Office Action mailed Jun. 15, 2004.
U.S. Appl. No. 10/601,208 Response to Office Action mailed Jun. 15, 2004.
U.S. Appl. No. 10/601,208 Office Action mailed Aug. 26, 2004.
U.S. Appl. No. 10/601,208 Response to Office Action mailed Aug. 26, 2004.
U.S. Appl. No. 10/601,208 Second Response to Office Action mailed Aug. 26, 2004.
U.S. Appl. No. 10/601,208 Office Action mailed May 11, 2005.
U.S. Appl. No. 10/601,208 Response to Office Action mailed May 11, 2005.
U.S. Appl. No. 10/601,208 Office Action mailed Feb. 15, 2006.
U.S. Appl. No. 10/601,208 Response to Office Action mailed Feb. 15, 2006.
U.S. Appl. No. 10/601,208 Office Action mailed Sep. 26, 2006.
U.S. Appl. No. 10/601,208 Response to Office Action mailed Sep. 26, 2006.
U.S. Appl. No. 10/601,208 Notice of Allowance mailed Dec. 8, 2006.
U.S. Appl. No. 10/842,947, Preliminary Amendment mailed May 11, 2004.
U.S. Appl. No. 10/842,947, Office Action mailed Nov. 30, 2004.
U.S. Appl. No. 10/842,947, Response to Office Action mailed Nov. 30, 2004.
U.S. Appl. No. 10/842,947, Office Action mailed Jun. 30, 2005.
U.S. Appl. No. 10/842,947, Response to Office Action mailed Jun. 30, 2005.
U.S. Appl. No. 10/842,947, Notice of Allowance mailed Feb. 9, 2006.
U.S. Appl. No. 10/921,743; Office Action mailed Mar. 4, 2005.
U.S. Appl. No. 10/921,743; Response to Office Action mailed Mar. 4, 2005.
U.S. Appl. No. 10/921,743; Office Action mailed May 26, 2005.
U.S. Appl. No. 10/921,743; Response to Office Action mailed May 26, 2005.
U.S. Appl. No. 10/921,743; Office Action mailed Sep. 13, 2005.
U.S. Appl. No. 10/921,743; Advisory mailed Nov. 25, 2005.
U.S. Appl. No. 10/921,743; Response to Office Action mailed Sep. 13, 2005 and Advisory mailed Nov. 25, 2005.
U.S. Appl. No. 10/921,743; Notice of Allowance; Feb. 16, 2006.
U.S. Appl. No. 10/950,897, Office Action mailed Mar. 7, 2005.
U.S. Appl. No. 10/950,897, Response to Office Action mailed Mar. 7, 2005.
U.S. Appl. No. 10/950,897, Office Action mailed Jun. 23, 2005.
U.S. Appl. No. 10/950,897, Response to Office Action mailed Jun. 23, 2005.
U.S. Appl. No. 10/950,897, Office Action mailed Sep. 9, 2005.
U.S. Appl. No. 10/950,897, Response to Office Action mailed Sep. 9, 2005.
U.S. Appl. No. 10/950,897, Office Action mailed Nov. 25, 2005.
U.S. Appl. No. 10/950,897, Response to Office Action mailed Nov. 25, 2005.
U.S. Appl. No. 10/950,897, Amendment to Notice of Allowance mailed Dec. 13, 2005.
U.S. Appl. No. 11/221,029; Preliminary Amendment dated Aug. 22, 2006.
U.S. Appl. No. 11/221,029; Office Action mailed Sep. 8, 2006.
U.S. Appl. No. 11/221,029; Response to Office Action mailed Sep. 8, 2006.
U.S. Appl. No. 11/221,029; Notice of Allowance; Oct. 3, 2006.
U.S. Appl. No. 11/252,576; Notice of Allowance; Dec. 11, 2007.
U.S. Appl. No. 11/358,508; Notice of Non Compliance mailed Sep. 12, 2006.
U.S. Appl. No. 11/358,508, Preliminary Amendment mailed Mar. 30, 2006.
U.S. Appl. No. 11/358,508, Preliminary Amendment mailed May 30, 2006.
U.S. Appl. No. 11/358,508, Preliminary Amendment mailed Jul. 26, 2006.
U.S. Appl. No. 11/358,508, Office Action mailed Aug. 14, 2006.

U.S. Appl. No. 11/358,508, Response to Office Action mailed Aug. 14, 2006.
U.S. Appl. No. 11/358,508, Response to Notice mailed Sep. 12, 2006.
U.S. Appl. No. 11/358,508, Notice of Allowability & Interview Summary mailed Oct. 18, 2006.
U.S. Appl. No. 11/358,508, Rule 312 Amendment mailed Oct. 24, 2006.
U.S. Appl. No. 11/434,588: Office Action mailed Jan. 31, 2007.
U.S. Appl. No. 11/434,588; Response to Office Action mailed Jan. 31, 2007.
U.S. Appl. No. 11/434,588; Notice of Allowance; Jul. 11, 2007.
U.S. Appl. No. 11,434,588; Notice of Allowance; Nov. 6, 2007.
U.S. Appl. No. 11/484,199 Preliminary Amendment; Sep. 7, 2006.
U.S. Appl. No. 11/484,199 Notice of Allowance and Examiner Interview Summary; Oct. 6, 2006.
U.S. Appl. No. 11/598,410, Office Action mailed Jun. 13, 2007.
U.S. Appl. No. 11/598,410, Response to Office Action mailed Jun. 13, 2007.
U.S. Appl. No. 11/598,410, Notice of Allowability Sep. 26, 2007.
U.S. Appl. No. 11/646,768, Office Action mailed May 7, 2007.
U.S. Appl. No. 11/646,768, Response to Office Action mailed May 7, 2007.
U.S. Appl. No. 11/646,768, Office Action mailed Oct. 29, 2007.
U.S. Appl. No. 11/646,768, Response to Office Action mailed Oct. 29, 2007.
U.S. Appl. No. 11/646,768; Notice of Allowance; Jan. 18, 2008.
U.S. Appl. No. 11/747,081; Office Action mailed Jan. 24, 2008.
Cole, George, "The Little Label with an Explosion of Applications", Financial Times, Ltd., 2002, pp. 1-3.
Deem, "Fast Forward Go For A Ride On The World's Fastest Sailboat", Popular Mechanics, www.popularmechanics.com, Feb. 2001, pp. 1-2.
Desmarais, "Solutions In Hand", BEI Technologies, Inc., www.sensormag.com, Jan. 2001, pp. 1-2.
Desmarais et al., "How to select and use the right temperature," www.sensorsmag.com, Jan. 2001, pp. 30-36.
GPS Locator for Children, Klass Kids Foundation Jul. 15, 2004.
Henkel, Research & Developments, *Sensors*, Nov. 2000. p. 18.
Janssens et al., "Columbus: A Novel Sensor System for Domestic Washing Machines", *Sensors Magazine* Online, Jun. 2002, pp. 1-9.
Licking, Special Report: E-Health, "This is the Future of Medicine", Business Week E.Biz, Dec. 11, 2000, pp. 77 and 78 US.
Li-Ron, Tomorrow's Cures, Health & Fitness Special Section Online, Newsweek, Dec. 10, 2001, pp. 3-10.
Mark of Fitness Flyer, "High Quality, Self-Taking Blood Pressure Monitors", four pages, Shrewsbury, NJ, US Aug. 19, 2008.
Martella, Product News, "Temperature Monitoring System", Nov. 2000, p. 77.
Nobbe, "Olympic Athletes Get a Boost from Technology", *Machine Design*, vol. 60, No. 19, Aug. 25, 1988.
Paradiso et al., Design and Implementation of Expressive Footwear, May 12, 2000, IBM Systems Journal, vol. 39, Nos. 3&4, pp. 511-529.
Paradiso, et al. "Instrumented Footwear for Interactive Dance" Version 1.1, Presented at the XII Colloquium on Musical Informatics, Gorizia, Italy, Sep. 24-26, 1998, pp. 1-4.
Sellers. Gear to Go, Mitch Mandel Photography, Mar. 2001, pp. 61-62.
Shannon P. Jackson and Harold Kirkham, "Weighing Scales Based on Low-Power Strain-Gauge Circuits", NASA Tech Briefs, Jun. 2001, p. 49 US.
Sharp, A Sense of the Real World, www.idsystems.com/reader/2000_09/sens0900.htm, Sep., 2000, 4 pages.
Skaloud et al., DGPS-Calibrated Accelerometric System for Dynamic Sports Events, Sep. 19-22, 2000, ION GPS 2000.
Smith et al., "Flexible and Survivable Non-Volatile Memory Data Recorder", AFRL Technology Horizons, Dec. 2000, p. 26.
Webster's II New Riverside University Dictionary, 1988, The Riverside Publishing Company, p. 1138. (cited by examiner).
Wysocki, Jr., Staff Reporter, "Do Devices Measuring Body Signs Appeal To the Sick or Healthy", Pittsburgh, US, Aug. 19, 2008.
No author listed, "Ever Forget to Bring Your Cell Phone or Keys?", Catalog Page, PI Manufacturing Corp, 20732 Currier Rd., Walnut, CA 91789, Home Office Accessory, Catalog Nos. TA-100N; TA-100M; TA-100F, US, Aug. 19 2008.
No author listed, "Your Next . . . ", *Newsweek*, Jun. 25, 2001, p. 52 US.
No author listed, The GPS Connection, *Popular Mechanics*, Feb. 2001, p. 65.
No author listed, WarmMark Time Temperature Indicators, Aug. 19, 2008, www.coldice.com/warmmark_temperature_indicators.html, Cold Ice., Inc.
No author listed, Wireless Temperature Monitor, www.echo-on.net/mob/, Nov. 20. 2000.
Unattributed, 3M MonitorMark Indicator Data Sheet [online], [retrieved on Aug. 9, 2004], retrieved from the Internet: URL: http://www.3m.com/us/healthcare/medicalspecialties/monitor/products.html; 4 pages.
International Search Report dated Jul. 7, 2008 in PCT Application No. PCT/US2007/012033.
Written Opinion dated Jul. 7, 2008 in PCT Application No. PCT/US2007/012033.
"Apple Announces iTunes 2," Press Release, Apple Computer, Inc., Oct. 23, 2001.
"Apple Introduces iTunes / World's Best and Easiest To Use Jukebox Software," Macworld Expo, San Francisco, Jan. 9, 2001.
"Apple's iPod Available in Stores Tomorrow," Press Release, Apple Computer, Inc., Nov. 9, 2001.
"Nomad Jukebox," User Guide, Creative Technology Ltd., Version 1, Aug. 2000.
"SoundJam MP Plus Manual, version 2.0"/ MP3 Player and Encoder for Macintosh by Jeffrey Robbin, Bill Kincaid and Dave Heller, manual by Tom Negrino, published by Casady & Greene, Inc., 2000.
"12.1 925 Candela Mobile PC", downloaded from LCDHardware.com on Dec. 19, 2002, http://www.lcdharware.com/panel/12_1_panel/default.asp.
"BL82 Series Backlit Keyboards", www.tg3electronics.com/products/backlit/backlit.htm downloaded Dec. 19, 2002.
"Bluetooth PC Headsets—Enjoy Wireless VoIP Conversations: 'Connecting' Your Bluetooth Headset With Your Computer", Bluetooth PC Headsets; downloaded on Apr. 29, 2006 from http://www.bluetoothpcheadsets.com/connect.htm.
"Creative MuVo TX 256 MB," T3 Magazine, Aug. 17, 2004, http://www.t3.co.uk/reviews/entertainment/mp3_player/creative_muvo_tx_256mb [downloaded Jun. 6, 2006].
"Digital Still Cameras—Downloading Images to a Computer," Mimi Chakarova et al., Multi/Media Reporting and Convergence, 2 pgs., Dec. 13, 2007.
"Eluminx Illuminated Keyboard", downloaded Dec. 19, 2002, http://www.elumix.com/.
"How To Pair a Bluetooth Headset & Cell Phone", About.com; downloaded on Apr. 29, 2006 from http://mobileoffice.about.com/od/usingyourphone/ht/blueheadset_p.htm.
"Peripherals for Industrial Keyboards & Pointing Devices", Stealth Computer Corporation, downloaded on Dec. 19, 2002, http://www.stealthcomputer.com/peropherals_oem.htm.
"Poly/Optical Fiber Optic Membrane Switch Backlighting", downloaded Dec. 19, 2002, http://www.poly/optical.com/membraneswitches.html.
"Public Safety Technologies Tracer 2000 Computer", downloaded Dec. 19, 2002, http://www.pst911.com/traver.html.
"QuickTime Movie Playback Programming Guide", Apple Computer, Inc., Aug. 11, 2005.
"QuickTime Overview", Apple Computer, Inc., Aug. 11, 2005.
"Rocky Matrix Backlit Keyboard", downloaded Dec. 19, 2002, http://www.amrel.com/asi_matrixkeyboard.html.
"Sony Ericsson to introduce Auto pairing to improve Bluetooth connectivity between headsets and phones", Sep. 28, 2005 Press Release, Sony Ericsson Corporate; downloaded on Apr. 29, 2006 from http://www.sonyericsson.com/spg.jsp?cc=global&1c=en&ver=4001 &template=pc3_1_1&z . . . .
"Taos, Inc., Announces Industry's First Ambient Light Sensor to Convert Light Intensity to Digital Signals", www.taosinc.com/pressrelease_090902.htm, downloaded Jan. 23, 2003.

"Toughbook 28: Powerful, Rugged and Wireless", Panasonic: Toughbook Models, downloaded Dec. 19, 2002, http:www.panasonic.com/computer/notebook/htm1/01a_13 s8.htm.

"When it Comes to Selecting a Projection TV, Toshiba Makes Everything Perfectly Clear, Previews of New Releases", www.bestbuy.com/HomeAudioVideo/Speciais/ToshibaTVFeatures.asp, downloaded Jan. 23, 2003.

"WhyBuy: Think Pad", IBM ThinkPad Web Page Ease of Use, downloaded on Dec. 19, 2002, http://www.pc.ibm.com/us/thinkpad/easeofuse.html.

512MB Waterproof MP3 Player with FM Radio & Built/in Pedometer, Oregon Scientific, downloaded on Jul. 31, 2006 from http://www2.oregonscientific.com/shop/product.asp?cid=4&scid=11&pid=581.

Adam C. Engst, "SoundJam Keeps on Jammin'," Jun. 19, 2000, http://db.tidbits.com/getbits.acgi?tbart=05988.

Alex Veiga, "AT&T Wireless Launching Music Service," Yahoo! Finance, Oct. 5, 2004, pp. 1/2.

Andrew Birrell, "Personal Jukebox (PJB)," Oct. 13, 2000, http://birrell.org/andrew/talks/pjb/overview.ppt.

Apple iPod Technical Specifications, iPod 20GB and 60GB Mac =PC, downloaded from http://www.apple.com/ipod/color/specs.html on Aug. 8, 2005.

Bociurkiw, Michael, "Product Guide: Vanessa Matz,", www.forbes.com/asap/2000/1127/vmartz_print.html, Nov. 27, 2000.

Compaq, "Personal Jukebox," Jan. 24, 2001 http://research.compaq.com/SRC/pjb/.

Creative: "Creative Nomad MuVo TX," www.creative.com, Nov. 1, 2004, http://web.archive.org/web/20041024175952/www.creative.com/products/pfriendly.asp?product=9672 [downloaded Jun. 6, 2006].

Creative: "Creative Nomad MuVo," www.creative.com, Nov. 1, 2004, http://web.archive.org/web/20041024075901/www.creative.com/products/product.asp?category=213&subcategory=215&product=110 [downloaded Jun. 7, 2006].

Creative: "MP3 Player", www.creative.com, Nov. 1, 2004, http://web.archive.org/web/20041024074823/www.creative.com/products/product.asp?category=213&subcategory=216&product=4983 [downloaded Jun. 7, 2006].

De Herrera, Chris, "Microsoft ActiveSync 3.1," Version 1.02, Oct. 13, 2000.

iAP Sports Lingo 0x09 Protocol V1.00, May 1, 2006.

IEEE 1394—Wikipedia, 1995, http://www.wikipedia.org/wiki/Firewire.

Written Opinion of the International Searching Authority dated Nov. 24, 2006 in PCT Application No. PCT/US2005/046797.

International Search Report dated Feb. 4, 2003 in corresponding application No. PCT/US2002/033330.

International Search Report dated Jul. 10, 2007 in corresponding application No. PCT/US2006/048738.

International Search Report dated Apr. 5, 2006 from corresponding International Application No. PCT/US2005/038819.

International Search Report dated Jul. 2, 2007 in related case PCT/US2006/048669.

International Search Report dated Jun. 19, 2007 in related Application PCT/US2006/048753.

International Search Report dated May 21, 2007 from corresponding PCT Application No. PCT/US2006/048670.

International Search Report in corresponding European Application No. 06256215.2 dated Feb. 20, 2007.

Invitation to Pay Additional Fees and Partial Search Report for corresponding PCT Application No. PCT/US2005/046797 dated Jul. 3, 2006.

iTunes 2, Playlist Related Help Screens, iTunes v2.0, Apple Computer, Inc., Oct. 23, 2001.

iTunes, Playlist Related Help Screens, iTunes v1.0, Apple Computer, Inc., Jan. 2001.

Jabra Bluetooth Headset User Manual; GN Netcom A/s, 2005.

Jabra Bluetooth Introduction; GN Netcom A/S, Oct. 2004.

Jabra FreeSpeak BT200 User Manual; Jabra Corporation, 2002.

Kennedy, "Digital Data Storage Using Video Disc," IBM Technical Disclosure Bulletin, vol. 24, No. 2, Jul. 1981.

Miniman, "Applian Software's Replay Radio and Player v1.02," Product review, pocketnow.com, http://www.pocketnow.com/reviews/replay/replay.htm, Jul. 31, 2001.

Musicmatch, "Musicmatch and Xing Technology Introduce Musicmatch Jukebox," May 18, 1998, http://www.musicmatch.com/info/company/press/releases/?year=1998&release=2.

Nonhoff/Arps, et al., "Straβenmusik Portable MP3/Spieler mit USB/Anschluss," CT Magazin Fuer Computer Technik, Verlag Heinz Heise GMBH, Hannover DE, No. 25, Dec. 4, 2000.

International Search Report dated Nov. 24, 2006 in PCT Application No. PCT/US2005/046797.

Personal Jukebox (PJB), "Systems Research Center and PAAD," Compaq Computer Corp., Oct. 13, 2000, http://research.compaq.com/SRC/pjb/.

Peter Lewis, "Two New Ways to Buy Your Bits," CNN Money, Dec. 31, 2003, pp. 1/4.

Sastry, Ravindra Wadali. "A Need for Speed: A New Speedometer for Runners", submitted to the Department of Electrical Engineering and Computer Science at the Massachusetts Institute of Technology, May 28, 1999.

Sinitsyn, Alexander. "A Synchronization Framework for Personal Mobile Servers," Pervasice Computing and Communications Workshops, 2004. Proceedings of the Second IEEE Annual Conference on, Piscataway, NJ, USA, IEEE, Mar. 14, 2004, pp. 208/212.

SoundJam MP Plus, Representative Screens, published by Casady & Greene, Inc., Salinas, CA, 2000.

Specification Sheet, iTunes 2, Apple Computer, Inc., Oct. 31, 2001.

Spiller, Karen. "Low/decibel earbuds keep noise at a reasonable level", The Telegraph Online, dated Aug. 13, 2006, http://www.nashuatelegraph.com/apps/pbcs.d111/article?Date=20060813&Cate . . . Downloaded Aug. 16, 2006.

Steinberg, "Sonicblue Rio Car," Product Review, Dec. 12, 2000, http://electronics.cnet.com/electronics/0/6342420/1304/4098389.html.

Travis Butler, "Archos Jukebox 6000 Challenges Nomad Jukebox," Aug. 13, 2001, http://db.tidbits.com/getbits.acgi?tbart=06521.

Travis Butler, "Portable MP3: The Nomad Jukebox," Jan. 8, 2001, http://db.tidbits.com/getbits.acgi?tbart=06261.

U.S. Appl. No. 11/621,541, "Personalized Podcasting Podmapping" filed Jan. 9, 2007.

Waterproof Music Player with FM Radio and Pedometer User Manual, Oregon Scientific, 2005.

Office Action dated Mar. 4, 2009 in U.S. Appl. No. 11/513,616.

Office Action dated Apr. 2, 2009 in U.S. Appl. No. 11/683,391.

Office Action dated May 13, 2009 in U.S. Appl. No. 11/585,721.

Office Action dated Oct. 29, 2008 in U.S. Appl. No. 11/566,072.

* cited by examiner

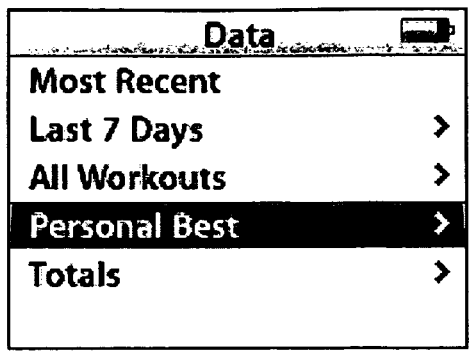
FIG. 42
| Personal Best | |
|---|---|
| 1K | 5:04 |
| 1 mi | 8:30 |
| 3K | 7:45 |
| 2 mi | 17:00 |
| 5K | 26:24 |
| 5 mi | 42:30 |
| 10K | 52:49 |
| 10 mi | 1:25:00 |
| Half Marathon | 1:51:26 |
| Marathon | 3:42:52 |
FIG. 43
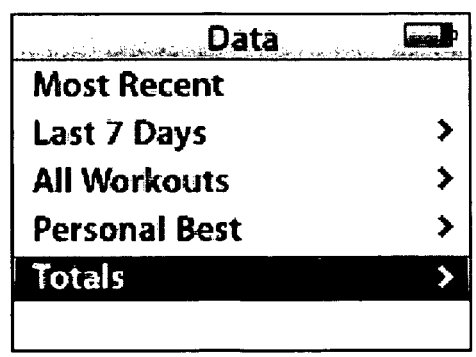
FIG. 44

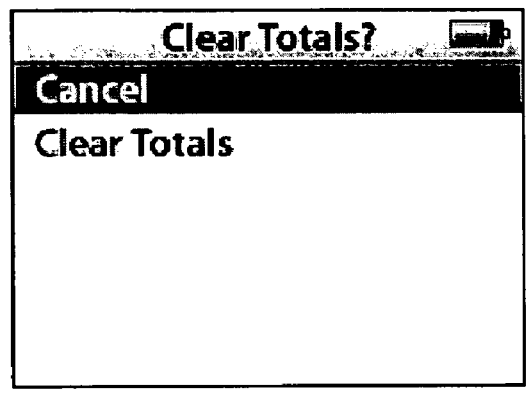
FIG. 45
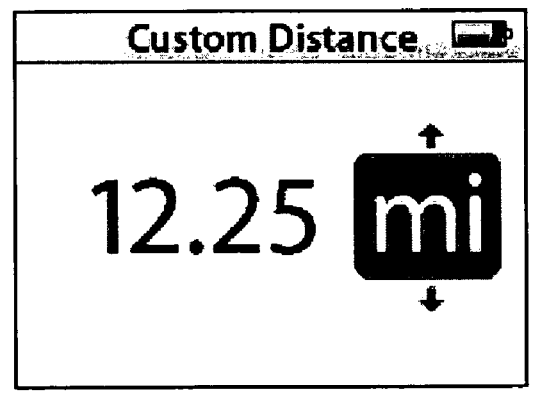
FIG. 46
FIG. 47

PORTABLE MEDIA DEVICE WITH WORKOUT SUPPORT

CROSS-REFERENCE TO RELATED APPLICATIONS

This application is related to: (i) U.S. patent application Ser. No. 11/144,541, filed Jun. 3, 2005, and entitled "TECHNIQUES FOR PRESENTING SOUND EFFECTS ON A PORTABLE MEDIA PLAYER", which is hereby incorporated by reference herein; (ii) U.S. patent application Ser. No. 11/209,367, filed Aug. 22, 2005, and entitled "AUDIO STATUS INFORMATION FOR A PORTABLE ELECTRONIC DEVICE", which is hereby incorporated by reference herein; and (iii) U.S. patent application Ser. No. 11/245,937, filed Oct. 7, 2005, and entitled "TECHNIQUES FOR PAIRING REMOTE CONTROLLERS WITH HOST DEVICES", which is hereby incorporated by reference herein.

This application is related to U.S. Patent Application No. 60/802,889, filed May 22, 2006, and entitled "ACTIVITY MONITORING SYSTEM", which is hereby incorporated by reference herein.

BACKGROUND OF THE INVENTION

1. Field of the Invention

The present invention relates to portable media devices and, more particularly, to portable media players that support user exercise routines.

2. Description of the Related Art

A media player stores media assets, such as audio tracks, that can be played or displayed on the media player. One example of a portable media player is the iPod® media player, which is available from Apple Computer, Inc. of Cupertino, Calif. Often, a media player acquires its media assets from a host computer that serves to enable a user to manage media assets. In managing media assets, a user can create playlists for audio tracks. These playlists can be created at the host computer. Media assets within the playlists can then be copied to the media player. As an example, the host computer can execute a media management application to acquire and manage media assets. One example of a media management application is iTunes® produced by Apple Computer, Inc.

Portable media players, such as MP3 players, are able to play music for users often via earphones or a headset. Typically, portable media players are dedicated to playing media. Lately, media players have been integrated into mobile telephones as well as personal information managers (or digital personal assistants). However, many users of portable media players utilize their media players in the context of exercising, such as at the gym or while running outdoors. Unfortunately, however, portable music players are not designed to assist the users in the context of their exercising. Although portable media players can play music for the users, there is traditionally no capability to provide any non-media information to the user.

Recently, a MP3 player has been enhanced to support wireless communications, through a Bluetooth module, with a wireless speed and distance sensor that is coupled to the shoelaces of the user's shoe. The wireless speed and distance sensor operates as a pedometer and can wirelessly transmit data to the MP3 player. Such a system permits interaction between a MP3 player and a pedometer, which are conventionally separate devices. Another existing approach is to use a wristwatch including GPS technology to track distance of runs, but such lack the ability to provide media playback. Regardless, there remains a need for improved interaction between portable media players and other devices so that users of portable media players can be better provided with non-media information.

SUMMARY OF THE INVENTION

The invention relates to improved techniques and systems for utilizing a portable electronic device to monitor, process, present and manage data captured by a remote sensor. The portable electronic device offers a convenient user interface that can be visual and/or audio based customized to a particular application, user-friendly and/or dynamic. The portable electronic device can pertain to a portable media player and thus also provide media playback.

The invention can be implemented in numerous ways, including as a method, system, device, apparatus (including graphical user interface), or computer readable medium. Several embodiments of the invention are discussed below.

As a workout monitoring process operable on a portable electronic device, one embodiment of the invention includes at least the acts of: determining a workout to be performed by a user of the portable electronic device; determining workout music to be utilized for the workout; receiving, processing and storing workout data acquired from a sensor; playing the workout music; and presenting at least a portion of the workout data to the user.

As a graphical user interface presented by a portable electronic device for enabling a user of the portable electronic device to configure the portable electronic device to monitor a workout undertaken by the user, where the portable electronic device has a display, one embodiment of the invention includes at least: a workout screen presented on the display of the portable electronic device, the workout screen enabling the user to select at least a workout type; and a workout characteristics screen presented on the display of the portable electronic device in response to the user selection of the workout type, the workout characteristics screen enabling the user to select at least one workout characteristic for the workout of the workout type.

As a workout template for with a portable electronic device, one embodiment of the invention includes at least an identification of what to display during a workout on a display associated with the portable electronic device.

As a workout template for with a portable electronic device, another embodiment of the invention includes at least a header and at least one interval. The header includes at least an identification of what to display following a workout on a display associated with the portable electronic device. The at least one interval includes at least: an identification of what to display during at least an interval of the workout on the display associated with the portable electronic device; an indication of what and when voice prompts are to be provided during at least the interval of the workout; and an identification of what to display during at least the interval of a workout on the display associated with the portable electronic device.

As a method for informing a user of exercise-related information, the user utilizing a portable electronic device while exercising, one embodiment of the invention includes at least the acts of: receiving exercise-related data from a data sensor during the exercising, the data sensor being operatively connected to the portable electronic device in a wired or wireless manner; determining whether audio feedback is to be provided to the user of the portable electronic device; and outputting audio data corresponding to the audio feedback to the user.

As a method for playing media items on a portable media player, one embodiment of the invention includes at least the acts of: receiving a request to play a particular predetermined song, the request being received while a set of other songs are being sequentially played; identifying the particular predetermined song to be played in response to the request, the particular predetermined song being stored on the portable media player; stopping the playing of the set of other songs; playing the particular predetermined song; and subsequently resuming playing of the set of other songs after the playing the particular predetermined song has ended.

As a system, one embodiment includes at least: a portable electronic device; a removable wireless interface device coupled to the portable electronic device; and a remote wireless sensor.

As a computer readable medium including at least computer program code for workout monitoring on a portable electronic device, one embodiment of the invention includes at least: computer program code for determining a workout to be performed by a user of the portable electronic device; computer program code for determining workout music to be utilized for the workout; computer program code for receiving, processing and storing workout data acquired from a sensor; computer program code for playing the workout music; and computer program code for presenting at least a portion of the workout data to the user.

As a computer readable medium including at least computer program code for informing a user of exercise-related information, where the user utilizes a portable electronic device while exercising, one embodiment of the invention includes at least: computer program code for receiving exercise-related data from a data sensor during the exercising, the data sensor being operatively connected to the portable electronic device in a wired or wireless manner; computer program code for determining whether audio feedback is to be provided to the user of the portable electronic device; and computer program code for outputting audio data corresponding to the audio feedback to the user.

As a method for playing media items on a portable media player, one embodiment of the invention includes at least: computer program code for receiving a request to play a particular predetermined song, the request being received while a set of other media items are being sequentially played; computer program code for identifying the particular predetermined media item to be played in response to the request, the particular predetermined media item being stored on the portable media player; computer program code for stopping the playing of the set of other songs; computer program code for playing the particular predetermined song; and computer program code for resuming playing of the set of other media items after playing of the particular predetermined media item has ended.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to improved techniques and systems for utilizing a portable electronic device to monitor, process, present and manage data captured by a remote sensor. The portable electronic device offers a convenient user interface that can be visual and/or audio based customized to a particular application, user-friendly and/or dynamic. The portable electronic device can pertain to a portable media player and thus also provide media playback.

In one embodiment, the portable electronic device can also either directly support wireless communication with the remote sensor or indirectly support wireless communications by using an attachable accessory device that provides wireless capability to the portable electronic device.

The invention is particularly well suited for use in monitoring sports-related data, such as exercise data (e.g., run data). However, it should be recognized that the invention is not limited to sports monitoring, but instead is applicable to any type of monitoring. For example, the monitoring can be any physiological monitoring of a person, who is typically the user of a portable electronic device.

One aspect of the invention is organization of data monitoring and management into workouts. Another aspect of the invention is a graphical user interface that permits user configuration or user selections, presents menus for workout selection, presents workout status information, and provides workout results. Still another aspect of the invention is use of templates to describe characteristics of workouts. Yet still another aspect of the invention is playing a designated playlist (i.e., a group of songs) during a workout. Still yet another aspect of the invention is near immediate playback a particular predetermined media item (e.g., song) on-demand (e.g., requested by a predetermined user interface action or by system based on workout monitoring) and disregarding any other media item being otherwise played. These aspects and various others discussed herein can be used separately or in any combination.

Embodiments of the invention are discussed below with reference to FIGS. 1-80. However, those skilled in the art will readily appreciate that the detailed description given herein with respect to these figures is for explanatory purposes as the invention extends beyond these limited embodiments.

Figure 1:
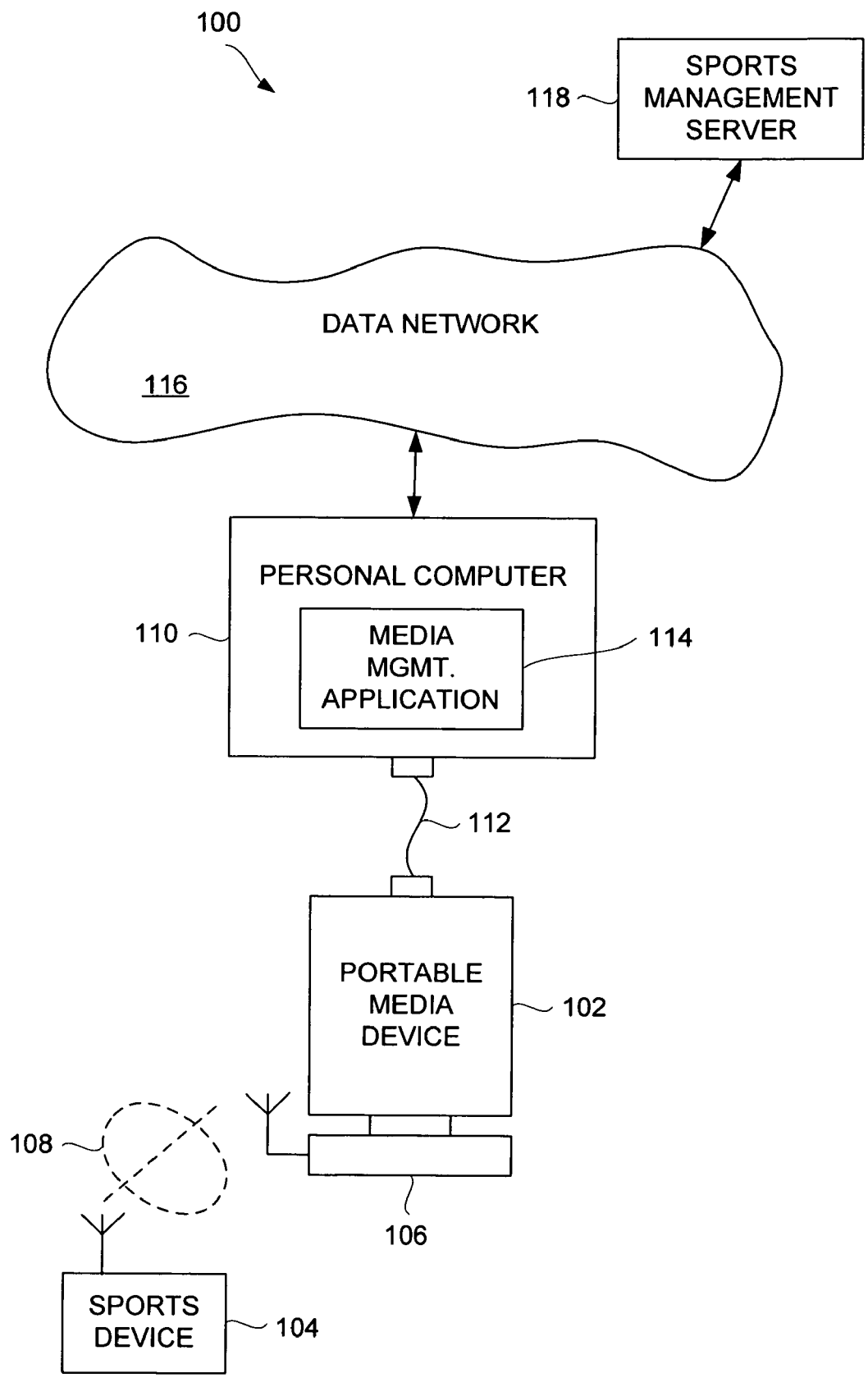
FIG. 1 is a block diagram of a sports monitoring system according to one embodiment of the invention.

FIG. 1 is a block diagram of a sports monitoring system 100 according to one embodiment of the invention. The sports monitoring system 100 is an electronic system that enables sports related information to be acquired, stored, analyzed, presented and shared.

The sports monitoring system 100 includes a portable media device 102. The portable media device 102 is capable of storing and playing media for its user. For example, the portable media device 102 can output (e.g., play) audio or video. The sports monitoring system 100 also includes a sports device 104. The sports device 104 is, for example, a pedometer, a heart rate monitor, etc. The sports device 104 includes one or more sensors that acquire sports related data.

The sports device 104 also includes wireless transmission capability so that the sports related data can be transmitted to the portable media device 102. In particular, the portable media device 102 includes a wireless interface accessory 106. The wireless interface accessory 106 includes a wireless transceiver so that the wireless interface accessory 106 can receive the sports related data being transmitted by the sports device 104 by way of a wireless connection through a personal wireless network 108. The portable media device 102 can receive the sports related data from the sports device 104 via the wireless interface accessory 106 and can then operate to process and store the sports related data at the portable media device 102.

The sports monitoring system 100 also includes a personal computer 110. The portable media device 102 can be electrically connected to the personal computer 110 by way of a cable 112. The cable 112 can, for example, be a Firewire or USB cable. Alternatively, the cable 112 can be replaced with a wireless link. Although the portable media device 102 is not normally electrically connected to the personal computer 110, the electrical connection when present facilitates information exchange between the portable media device 102 and the personal computer 110.

The personal computer 110 includes a media management application 114. The media management application 114, in one embodiment, can not only manage the media assets stored on the personal computer 110, but can also store and manage sports related data. In one embodiment, the media management application 114 can operate to cause the sports related data stored on the portable media device 102 to be copied to the personal computer 110. Thereafter, the sports related data can be analyzed at the personal computer 110 and/or made available to the user of the personal computer 110. In addition, the sports monitoring system 100 can facilitate the personal computer 110 coupling to a data network 116. The data network 116 can represent a global or Wide Area network, such as the World Wide Web (or the Internet). When the personal computer 110 is coupled to the data network 116, the sports related data present at the personal computer 110 can be transferred to a sports management server 118. At the sports management server 118, the sports related data can be further analyzed and/or processed to facilitate usefulness of the data. The sports management server 118 supports storage and analysis of sports related data from a large number of different portable media devices and/or personal computers. Hence, the sports management server 118 can also compare the sports related data from different users. The sports management server 118 can also provide a website that can be accessed by a network browser operating on the personal computer 110 or other computing device to access sports related information or other information made available via the website.

The sports monitoring system 100 can also support one or more remote controllers (not shown). A remote controller can also communicate with portable media device 102 via the wireless interface accessory 106. The remote controller may require it be paired or linked with the wireless interface accessory 106 or the portable media device 102.

The sports device 104 illustrated in FIG. 1 can take a variety of different forms. In one embodiment, the sports device is a sensor-based device. One example of a sensor-based device is a pedometer.

Figure 2:
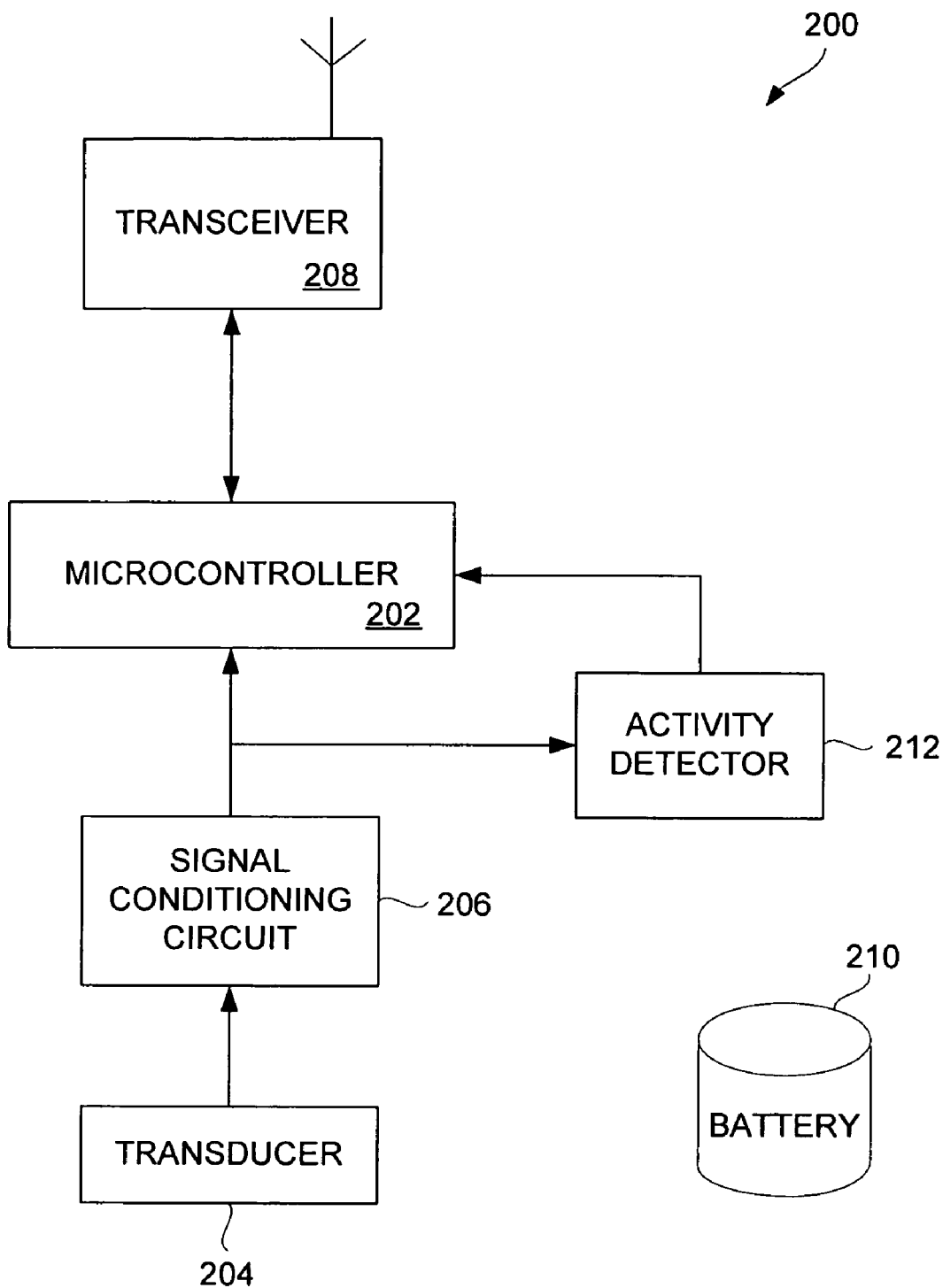
FIG. 2 illustrates a block diagram of a sports device according to one embodiment of the invention.

FIG. 2 illustrates a block diagram of a sports device 200 according to one embodiment of the invention. The sports device 200 is, for example, suitable for use as the sports device 104 illustrated in FIG. 1.

The sports device 200 includes a microcontroller 202 that controls the overall operation of the sports device 200. The sports device 200 also includes a transducer 204 that acquires raw sports data. As an example, the transducer 204 can pertain to a piezo-electric device (e.g., piezo-electric pedometer). With a piezo-electric device, electrical signals associated with pressure applied to the transducer 204 are produced as a user of the sports device walks or runs. In one embodiment, the sports device 200 can be embedded within a shoe, such as within a sole of a shoe. A signal conditioning circuit 206 filters and/or amplifies the raw sports data supplied by the transducer 204. The resulting conditioned sports data is then supplied to the microcontroller 202. The microcontroller 202 include memory that can store the conditioned sports data. The sports device 202 also includes a transceiver 208 to transmit the conditioned sports data to a portable media device, such as the portable media device 102 via the wireless interface accessory 106 illustrated in FIG. 1. Since the sports device 200 need not receive data back from the portable media device 102, the transceiver 208 can alternatively be a transmitter.

Still further, the sports device 200 is battery powered by a battery 210. In one embodiment, the battery 210 is not replaceable by the user of the sports device 200. Accordingly, the sports device 200 is designed to operate in a low power manner. In this regard, the microcontroller 202 is a low power design and can be placed in a sleep/hibernate mode when sports data is not being acquired. In one embodiment, the sports device 200 includes an activity detector 212. The activity detector 212 can monitor the transducer 204 or the signal conditioning circuit 206 to determine whether the sports data is indicating that there is some sports related activity (e.g., running, walking, etc.) being undertaken. When the activity detector 212 determines that there is no sports related activity, the activity detector 212 can cause or signal the microcontroller 202 to enter a low power mode (i.e., sleep or hibernate). When the activity detector 212 determines that there is sports related activity while the microcontroller 202 is in the low power mode, the activity detector 212 can cause or signal the microcontroller 202 to awaken to a normal mode.

Figure 3:
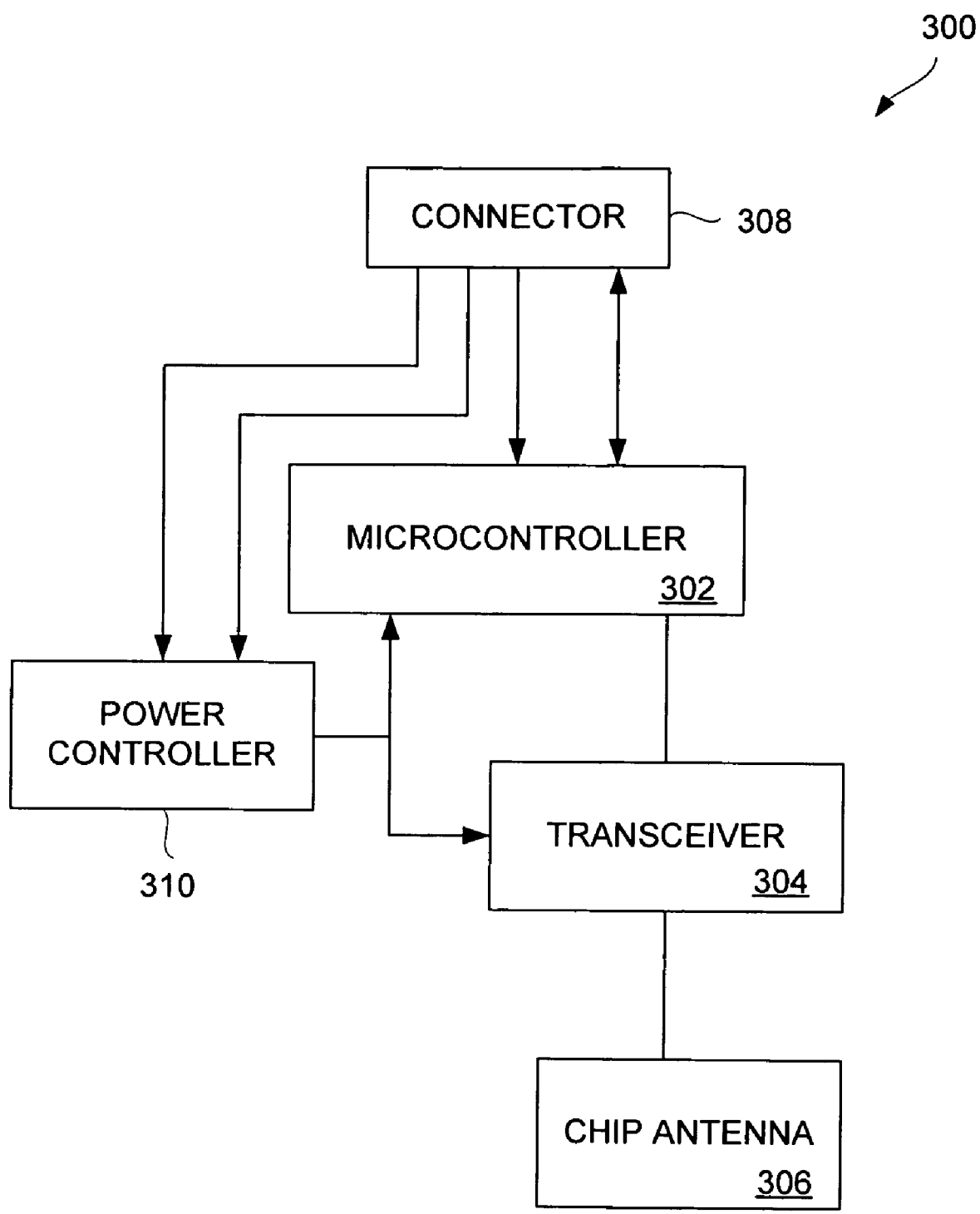
FIG. 3 is a block diagram of a wireless interface accessory according to one embodiment of the invention.

FIG. 3 is a block diagram of a wireless interface accessory 300 according to one embodiment of the invention. The wireless interface accessory 300 is, for example, suitable for use as the wireless interface accessory 106 illustrated in FIG. 1. The wireless interface accessory 300 includes a microcontroller 302 that controls the overall operation of the wireless interface accessory 300. The wireless interface accessory 300 also includes a transceiver 304 and a chip antenna 306. The transceiver 304 operates to wirelessly communicate with the counterpart device, such as a sports device, to receive sports related data. The sports related data is then temporarily stored in memory provided with the microcontroller 302 and then forwarded to a portable media device via a connector 308.

The connector 308 can couple with a counterpart connector associated with the portable media device. The microcontroller 302 can also store some user data, including calibration data, as well as sports data, including as data summaries, workout data, etc. The wireless interface accessory 300 can also includes a power controller 310. The power controller 310 couples to a power source and ground from the connector 308. The power controller 310 typically converts the incoming voltage level to a different voltage level to be utilized by the microcontroller 302 and the transceiver 304.

Figure 4A:
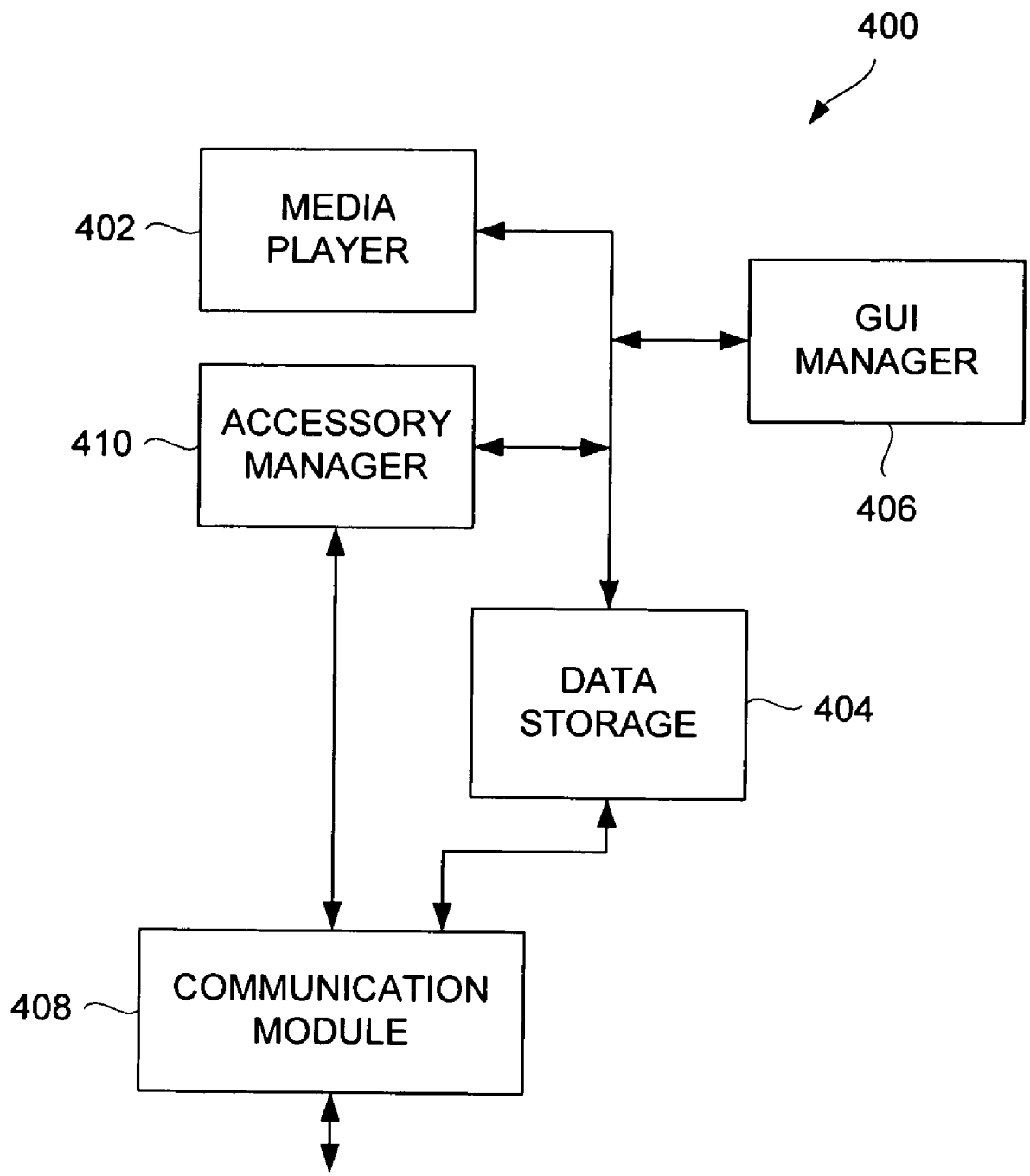
FIG. 4A is a block diagram of an arrangement of functional modules utilized by a portable media device.

FIG. 4A is a block diagram of an arrangement 400 of functional modules utilized by a portable media device. The portable media device can, for example, be the portable media device 102 illustrated in FIG. 1. The arrangement 400 includes a media player 402 that is able to output media for a user of the portable media device but also store and retrieve data with respect to a data storage 404. The arrangement 400 also includes a graphical user interface (GUI) manager 406. The GUI manager 406 operates to control information being provided to and displayed on a display device. The arrangement 400 also includes a communication module 408 that facilitates communication between the portable media device and an accessory device. Still further, the arrangement 400 includes an accessory manager 410 that operates to authenticate and acquire data from an accessory device that may be coupled to the portable media device. For example, the accessory device can be a wireless interface accessory, such as the wireless interface accessory 106 illustrated in FIG. 1 as being coupled to the portable media device 102.

Figure 4B:
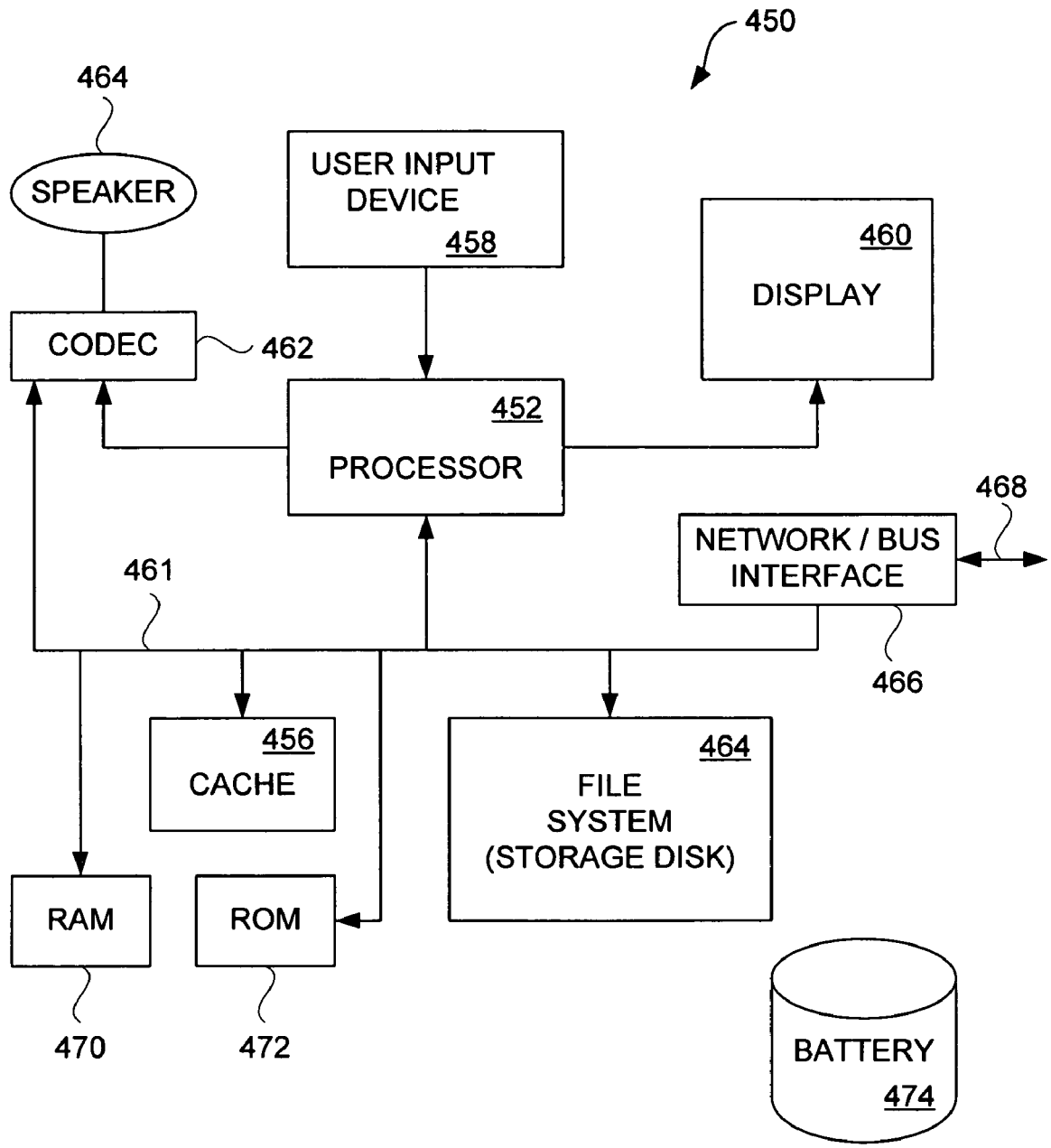
FIG. 4B is a block diagram of a media player suitable for use with the invention.

FIG. 4B is a block diagram of a media player 450 suitable for use with the invention. The media player 450 illustrates circuitry of a representative portable media device.

The media player 450 includes a processor 452 that pertains to a microprocessor or controller for controlling the overall operation of the media player 450. The media player 450 stores media data pertaining to media items in a file system 454 and a cache 456. The file system 454 is, typically, a storage disk or a plurality of disks. The file system 454 typically provides high capacity storage capability for the media player 450. However, since the access time to the file system 454 is relatively slow, the media player 450 can also include a cache 456. The cache 456 is, for example, Random-Access Memory (RAM) provided by semiconductor memory. The relative access time to the cache 456 is substantially shorter than for the file system 454. However, the cache 456 does not have the large storage capacity of the file system 454. Further, the file system 454, when active, consumes more power than does the cache 456. The power consumption is often a concern when the media player 450 is a portable media player that is powered by a battery 474. The media player 450 also includes a RAM 470 and a Read-Only Memory (ROM) 472. The ROM 472 can store programs, utilities or processes to be executed in a non-volatile manner. The RAM 470 provides volatile data storage, such as for the cache 456.

The media player 450 also includes a user input device 458 that allows a user of the media player 450 to interact with the media player 450. For example, the user input device 458 can take a variety of forms, such as a button, keypad, dial, etc. Still further, the media player 450 includes a display 460 (screen display) that can be controlled by the processor 452 to display information to the user. A data bus 461 can facilitate data transfer between at least the file system 454, the cache 456, the processor 452, and the CODEC 462.

In one embodiment, the media player 450 serves to store a plurality of media items (e.g., songs, podcasts, etc.) in the file system 454. When a user desires to have the media player play a particular media item, a list of available media items is displayed on the display 460. Then, using the user input device 458, a user can select one of the available media items. The processor 452, upon receiving a selection of a particular media item, supplies the media data (e.g., audio file) for the particular media item to a coder/decoder (CODEC) 462. The CODEC 462 then produces analog output signals for a speaker 464. The speaker 464 can be a speaker internal to the media player 450 or external to the media player 450. For example, headphones or earphones that connect to the media player 450 would be considered an external speaker.

The media player 450 also includes a bus interface 466 that couples to a data link 468. The data link 468 allows the media player 450 to couple to a host device (e.g., host computer or power source). The data link 468 can also provide power to the media player 450.

The media player 450 also includes a network/bus interface 466 that couples to a data link 468. The data link 468 allows the media player 450 to couple to a host computer or to accessory devices. The data link 468 can be provided over a wired connection or a wireless connection. In the case of a wireless connection, the network/bus interface 466 can include a wireless transceiver. The media items (media assets) can pertain to one or more different types of media content. In one embodiment, the media items are audio tracks (e.g., songs, audiobooks, podcasts). In another embodiment, the media items are images (e.g., photos). However, in other embodiments, the media items can be any combination of audio, graphical or video content.

Figure 5:
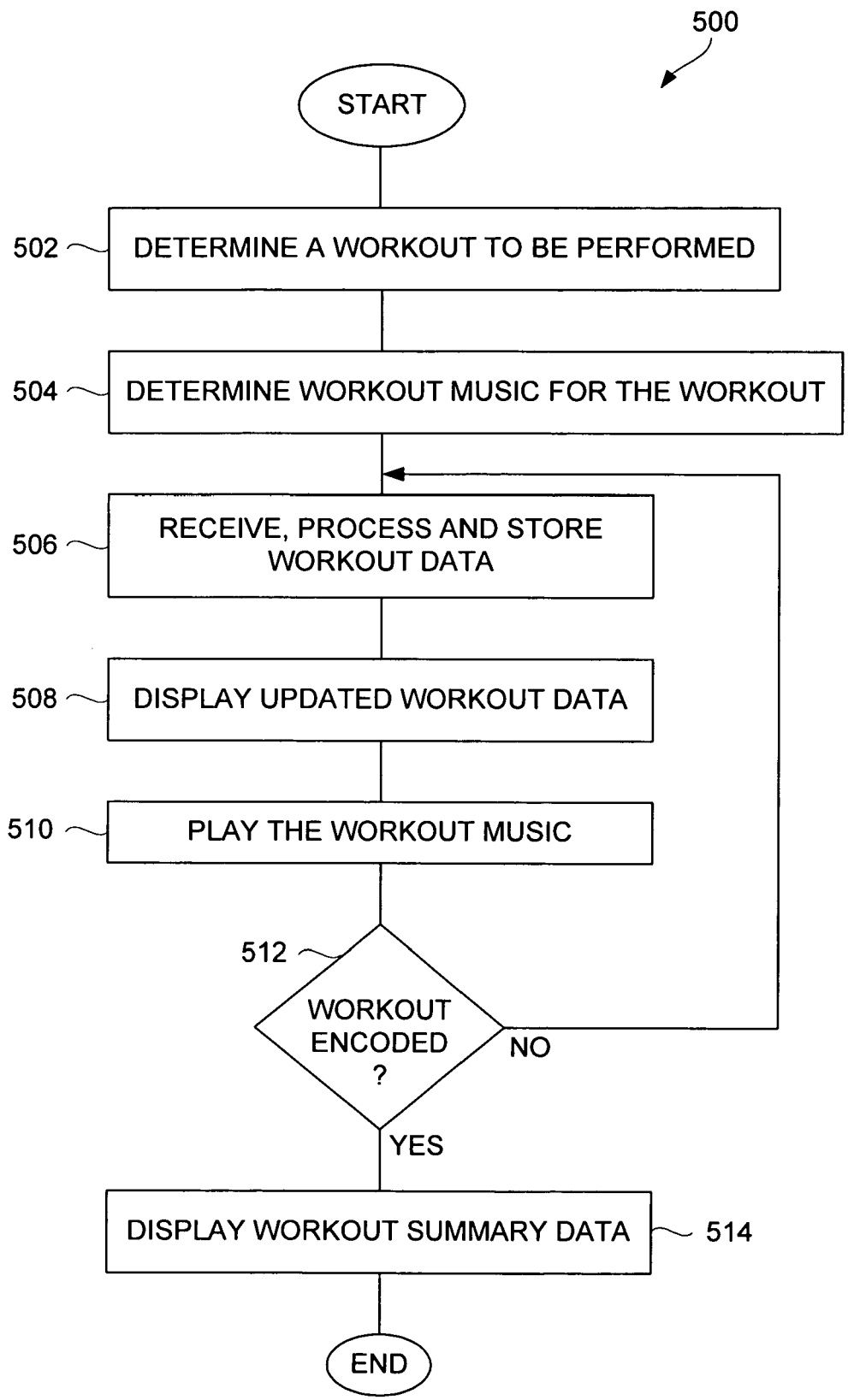
FIG. 5 is a flow diagram of a workout process according to one embodiment of the invention.

FIG. 5 is a flow diagram of a workout process 500 according to one embodiment of the invention. The workout process 500 is, for example, performed by a computing device, typically a portable computing device. For example, the computing device can be a portable media device, such as the portable media device 102 illustrated in FIG. 1.

The workout process 500 initially determines 502 a workout to be performed. Typically, this involves user interaction with the computing device to select or enter information that leads to determination of a workout. For example, the determination 502 of the workout can include receiving a workout type indication and also receiving one or more workout characteristics for the workout. Nevertheless, after a workout has been determined 502, workout music for the workout is determined 504. The workout music is music that is played by the computing device (e.g., portable media device) during the workout.

Next, as the workout is ongoing, workout data is received, processed and stored 506 at the computing device. The workout data can, for example, be received from a sports device, such as the sports device 104 illustrated in FIG. 1. In addition, updated workout data is displayed 508. Typically, the computing device includes a display device that is able to display workout data during the workout. In addition, the workout music is played 510 during the workout by the computing device. By playing the workout music, the workout can be enhanced by motivating the individual or otherwise entertaining the individual during the workout.

Next, a decision 512 determines whether the workout has ended. The workout can end in response to a user request or automatically based on a condition (e.g., time, distance, etc.). When the decision 512 determines that the workout has not ended, the workout process 500 returns to repeat the block 506 and subsequent blocks so that subsequent workout data can be received, processed and stored 506. Thereafter, the updated workout data can be displayed 508 and the workout music can continue to be played 510. Hence, the blocks 506-510 are performed during the workout such that (i) new workout data can be periodically captured, (ii) updated workout data can be periodically displayed, and (iii) the workout music can be continuously played throughout the workout. On the other hand, once the decision 512 determines that the workout has ended, the workout data no longer needs to be received, processed and stored. Instead, once the workout has ended, workout summary data is displayed 514. The workout summary data 514 displays data that summarizes the workout. The workout music may or may not automatically end at the end of the workout. Following the block 514, the workout process 500 ends.

Figure 6:
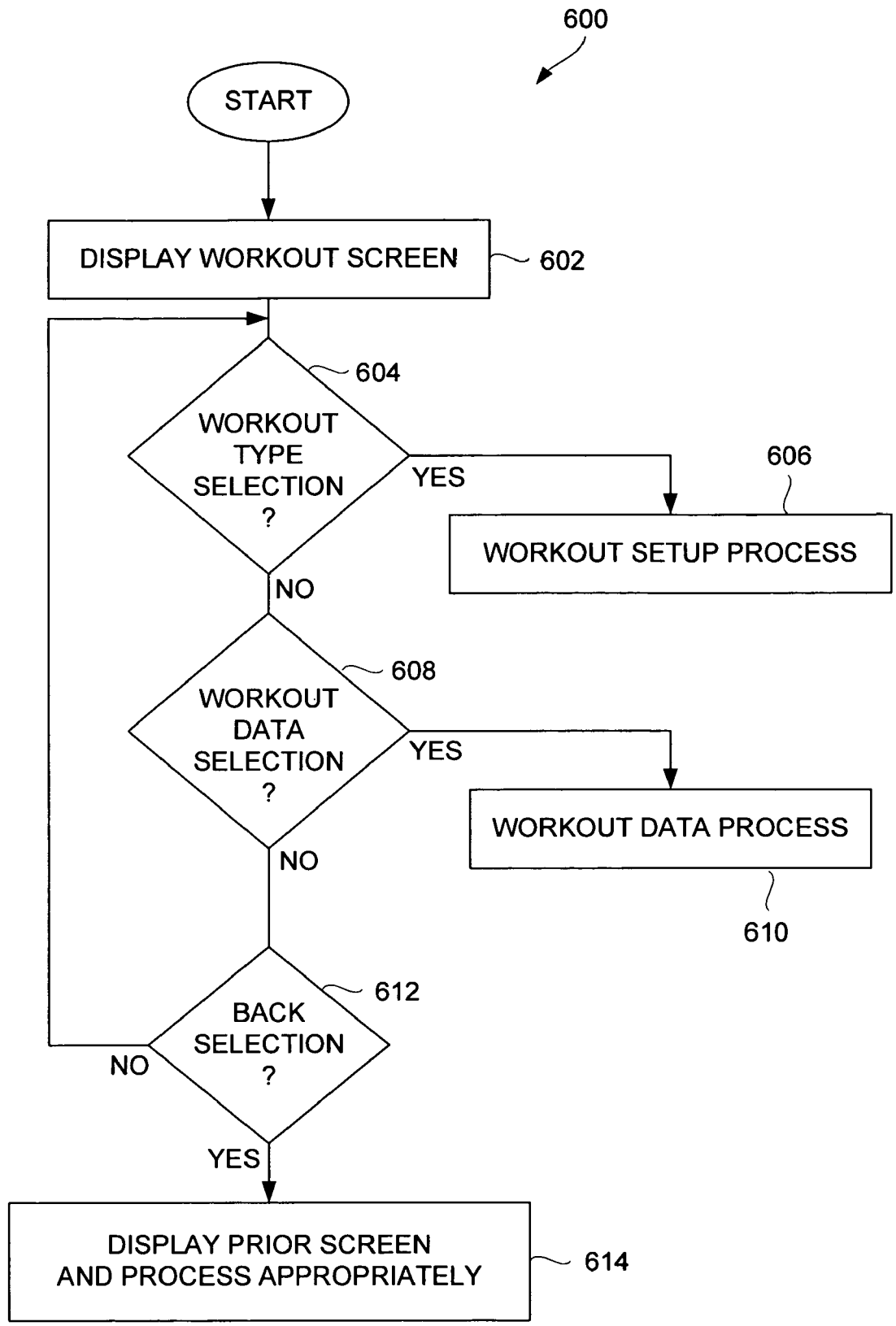
FIG. 6 is a flow diagram of a workout monitoring process according to one embodiment of the invention.

FIG. 6 is a flow diagram of a workout monitoring process 600 according to one embodiment of the invention. The workout monitoring process 600 is, for example, performed by a portable media device, such as the portable media device 102 illustrated in FIG. 1.

The workout monitoring process 600 initially displays 602 a workout screen. From the workout screen, a user can select a workout type, workout data, or back (go-back). Hence, following the block 602, a decision 604 determines whether a workout type selection has been made. When the decision 604 determines that a workout type selection has been made, a workout setup process 606 is performed. Details on exemplary processing associated with the workout setup process 606 are discussed below with respect to FIGS. 7A and 7B. Alternatively, when the decision 604 determines that a workout type selection has not been made, a decision 608 determines whether a workout data selection has been made. When the decision 608 determines that a workout data selection has been made, a workout data process 610 is performed. An example of a workout data process that can be performed at the block 610 is described below with reference to FIG. 9. On the other hand, when the decision 608 determines that a workout data selection has not been made, a decision 612 determines whether a "back" selection has been made. When the decision 612 determines that a "back" selection has not been made, the workout monitoring process 600 returns to repeat the decision 604 so that a user's selection, once provided, can be processed. Alternatively, when the decision 612 determines that a "back" selection has been made, a prior screen is displayed 614 and processed appropriately.

Figure 7A:
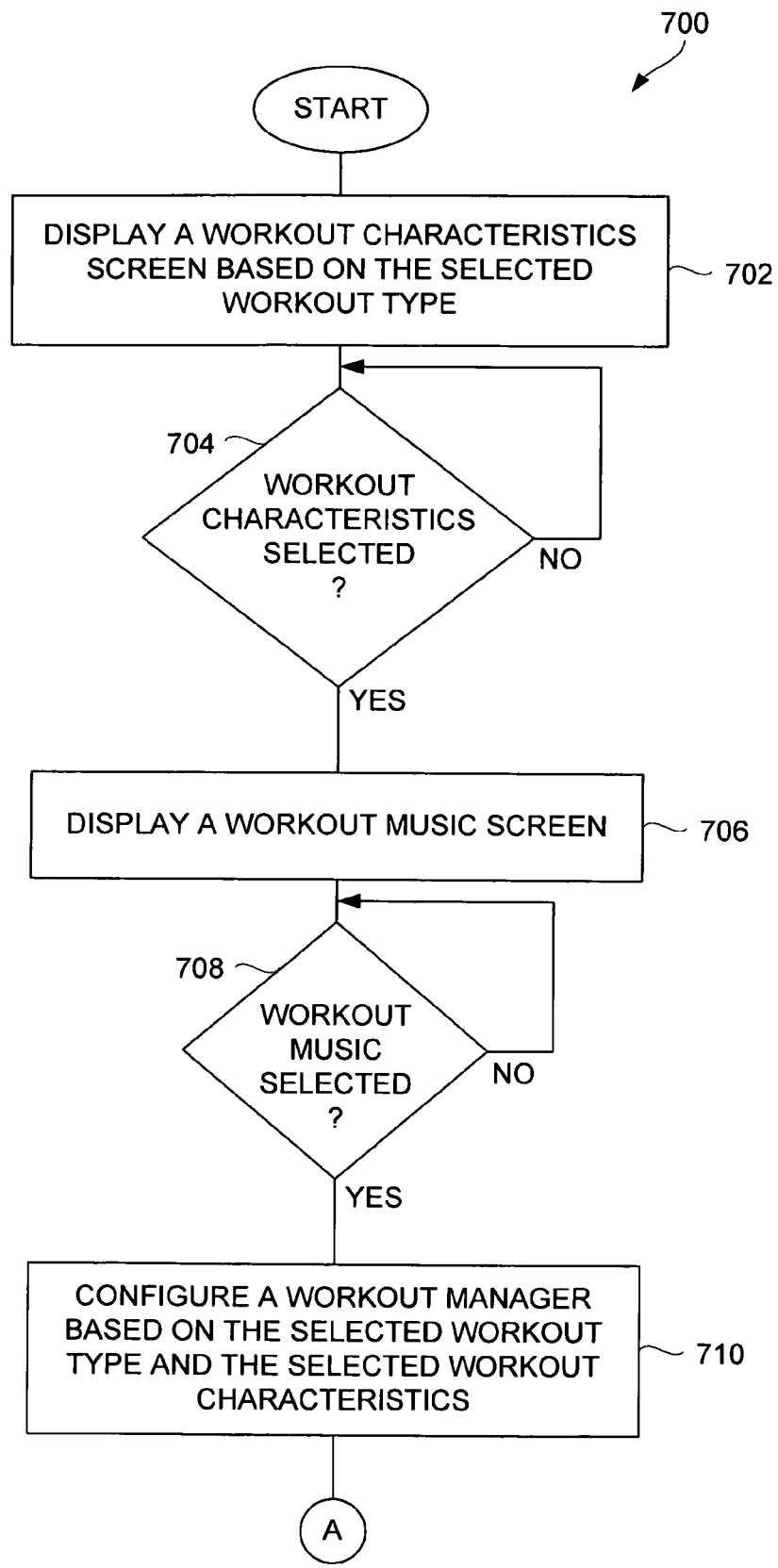
FIGS. 7A and 7B are flow diagrams of a workout setup process according to one embodiment of the invention.
Figure 7B:
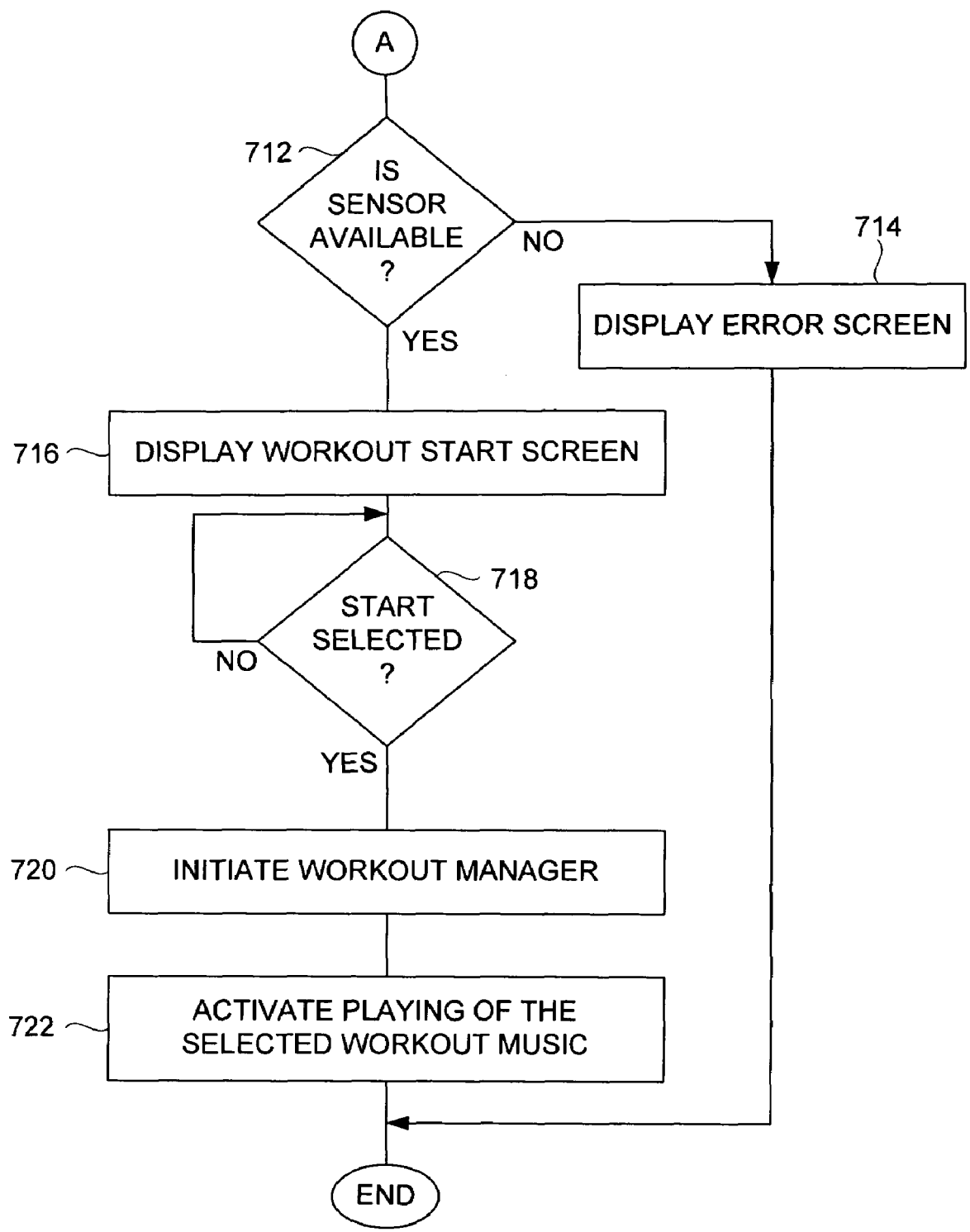

FIGS. 7A and 7B are flow diagrams of a workout setup process 700 according to one embodiment of the invention. The workout setup process 700 is, for example, suitable for use as the workout setup process 606 illustrated in FIG. 6.

The workout setup process 700 initially displays 702 a workout characteristic screen based on the selected workout type. From the workout characteristic screen, a user is able to select one or more characteristics for the workout. Hence, a decision 704 determines whether workout characteristics have been selected. When the decision 704 determines that workout characteristics have not yet been selected, the workout setup process 700 awaits such selection. On the other hand, once the decision 704 determines that workout characteristics have been selected, a workout music screen is displayed 706. The workout music screen allows a user to select music to utilize during the workout. The music being selected can be a song, an album, a group of songs, etc. After the workout music screen has been displayed 706, a decision 708 determines whether workout music has been selected. When the decision 708 determines that workout music has not yet been selected, the workout setup process 700 awaits such a selection. It should be noted, however, that a workout music selection could be predetermined or assigned by default. Nevertheless, when the decision 708 determines that workout music has been selected, a workout manager is configured 710 based on the selected workout type and the selected workout characteristics. Additional details on the operation of the workout manager are described below with reference to FIGS. 8A and 8B.

After the workout manager has been configured for the workout, a decision 712 determines whether a sensor is available. The sensor can correspond to the sports device 104 illustrated in FIG. 1. When the decision 712 determines that the sensor is not available, an error screen can be displayed 714. The error screen notifies the user of the computing device (portable media device) that the sensor (or sports device) is not available and thus there is no ability to monitor sports related data. In this case, the workout monitoring will not be performed.

On the other hand, when the decision 712 determines that the sensor is available, a workout start screen is displayed 716. The workout start screen allows a user of the computing device (portable media device) to designate when they begin their workout. Hence, a decision 718 determines whether start of the workout has been selected. When the decision 718 determines that the start of workout has not been selected, the workout setup process 700 awaits such as selection. Once the decision 718 determines that start of the workout has been selected, the workout manager is initiated 720 so that it begins the monitoring of the workout (and thus the sports related data) as discussed in more detail below. In addition, playback of the selected workout music is activated 722 so that the music is presented to the user during their workout. Following the block 722, as well as following the block 714, the workout setup process 700 ends.

Figure 8A:
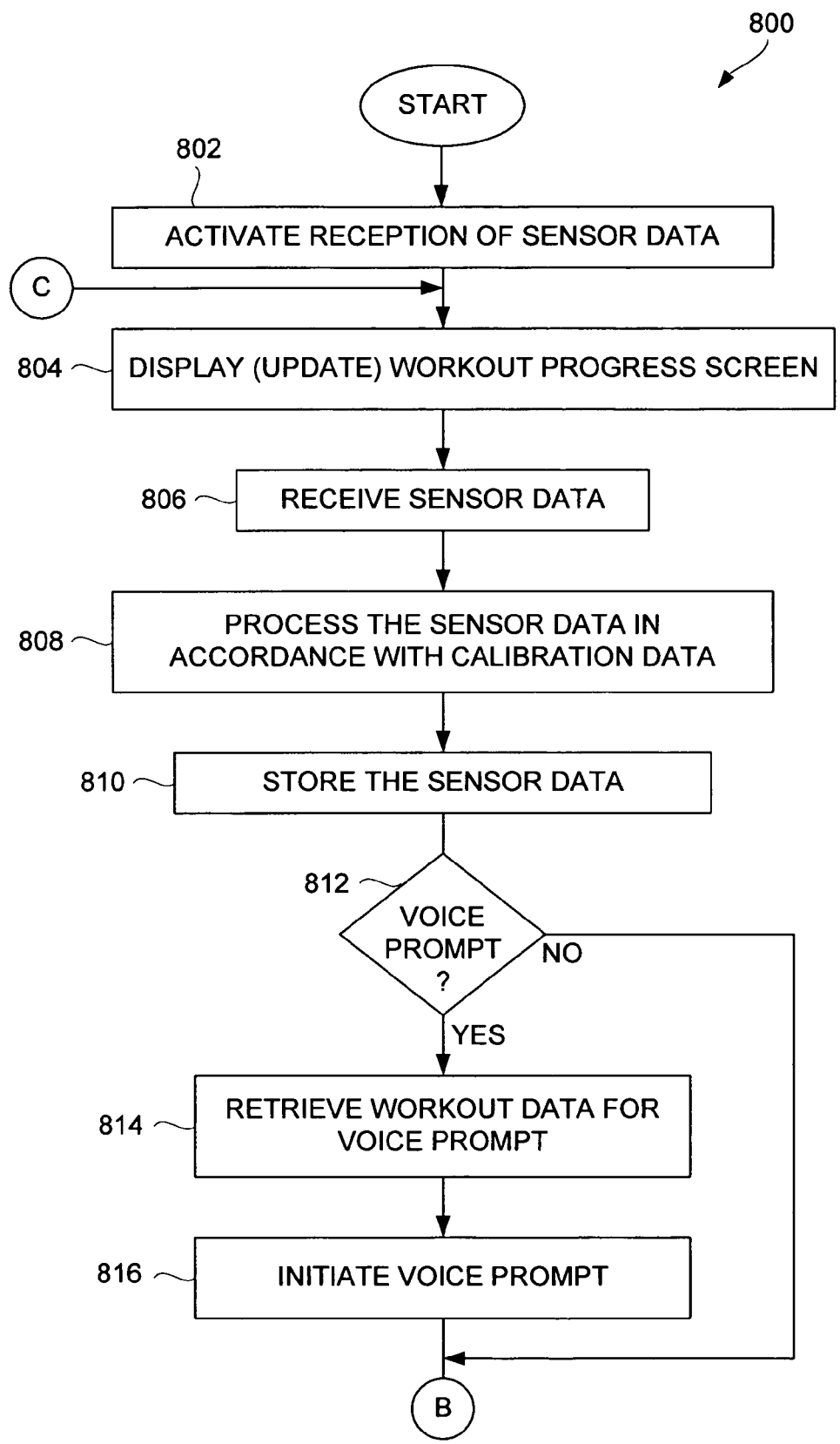
FIGS. 8A and 8B are flow diagrams of a workout manager process according to one embodiment of the invention.
Figure 8B:
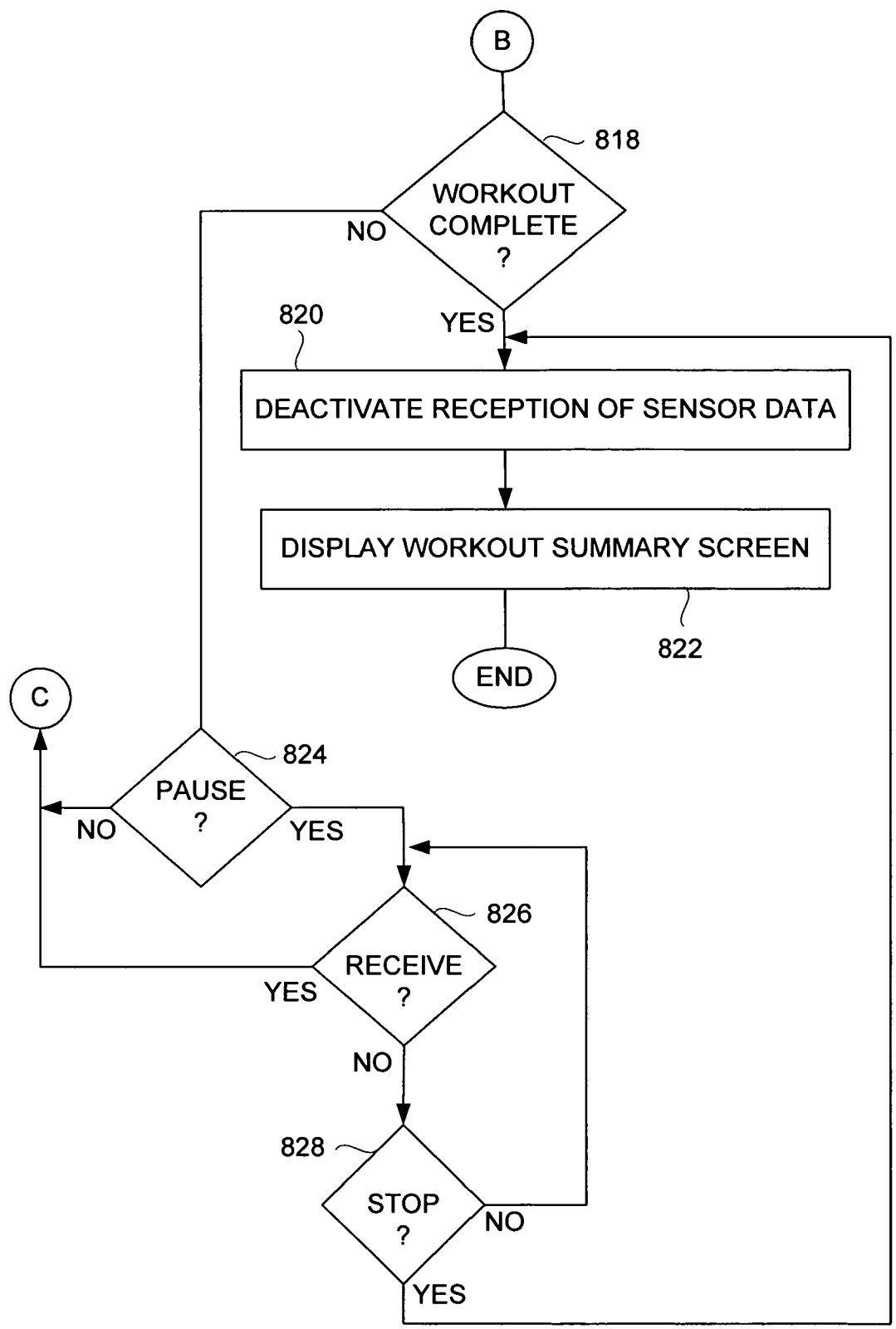

FIGS. 8A and 8B are flow diagrams of a workout manager process 800 according to one embodiment of the invention. The workout manager process 800 is associated with a workout manager that is a software module that operates to manage the capture, processing and storage of sports related data as well as displaying appropriate information and playing music to the user of the computing device (portable media device).

The workout manager process 800 activates 802 reception of sensor data. The sensor data is, for example, data provided by a sensor within a sports device. For example, the sports device can be the sports device 104 illustrated in FIG. 1. Next, a workout progress screen is displayed 804. The workout progress screen provides information to the user as to their progress through the workout. As the workout proceeds, sensor data is received 806. The sensor data is processed 808 in accordance with calibration data. The calibration data is data that is provided through a calibration process so that the sensor data can be better interpreted and thus more accurate in the determination of the user's progress with respect to the workout. The progress can be measured in a variety of different ways depending upon the application. In one exemplary application, the sensor data can be used to determine pace and distance traveled by a user during a workout. Hence, the calibration data can be used in such a case to more accurately determine the pace and distance for a workout. After the sensor data is processed 808, the sensor data is stored 810.

As the workout is ongoing, voice prompts can be provided to the user. Hence, a decision 812 determines whether a voice prompt is to be provided. When the decision 812 determines that a voice prompt is to be provided, workout data for the voice prompt is retrieved 814. Here, the voice prompt is to be associated with the workout that is ongoing. Hence, the voice prompt is associated with and provides to the user voice feedback pertaining to workout data. Next, the voice prompt is initiated 816. In one embodiment, the voice prompts are provided at predetermined points along a given type of workout. In another embodiment, the voice prompt can be provided based on performance metrics. For example, when the user runs his/her fastest mile the user can be provided with a voice prompt indicating that they have achieved a personal best. Here, the user can be congratulated for reaching a particular performance metric. Alternatively, when the decision 812 determines that a voice prompt is not to be provided, the blocks 814 and 816 can be bypassed.

Following the block 816 or its being bypassed, a decision 818 determines whether a workout is complete. When the decision 818 determines that the workout is complete, reception of sensor data is deactivated 820. Next, a workout summary screen is displayed 822. The workout summary screen provides a summary of the workout for the user. For example, in the case of a workout involving running, the workout summary can provide the user with information on total distance, total time, pace, etc. for the workout performed by the user. Following the block 822, the workout manager process 800 ends.

Alternatively, when the decision 818 determines that the workout is not complete, a decision 824 determines whether a pause has been requested. A user can pause a workout as they desire, such as through a user input action with respect to the computing device (portable media device). In any case, when the decision 824 determines that a pause has not been requested, the workout manager process 800 returns to repeat the block 804 and subsequent blocks so that the workout monitoring can continue, the workout progress screen can be updated, sensor data can be retrieved, processed and stored, and any voice prompts that are appropriate can be presented. Alternatively, when the decision 824 determines that a pause has been requested, a decision 826 determines whether the workout is to be resumed. That is, once the workout is paused, the user can resume the workout by another user interface interaction with the computing device. If the decision 826 determines that the workout has been resumed, the workout manager process 800 again returns to repeat the block 804 and subsequent blocks. On the other hand, when the decision 826 determines that the workout is not to be resumed, a decision 828 determines whether the workout is to be stopped. When the decision 828 determines that a workout is not to be stopped, the workout manager process 800 returns to repeat the decision 826 so that the workout can be resumed or stopped as requested by the user. Alternatively, when the decision 828 determines that the workout is to be stopped, the workout manager process 800 returns to repeat the block 820 and subsequent blocks so that the workout can be ended in its normal fashion.

Figure 9:
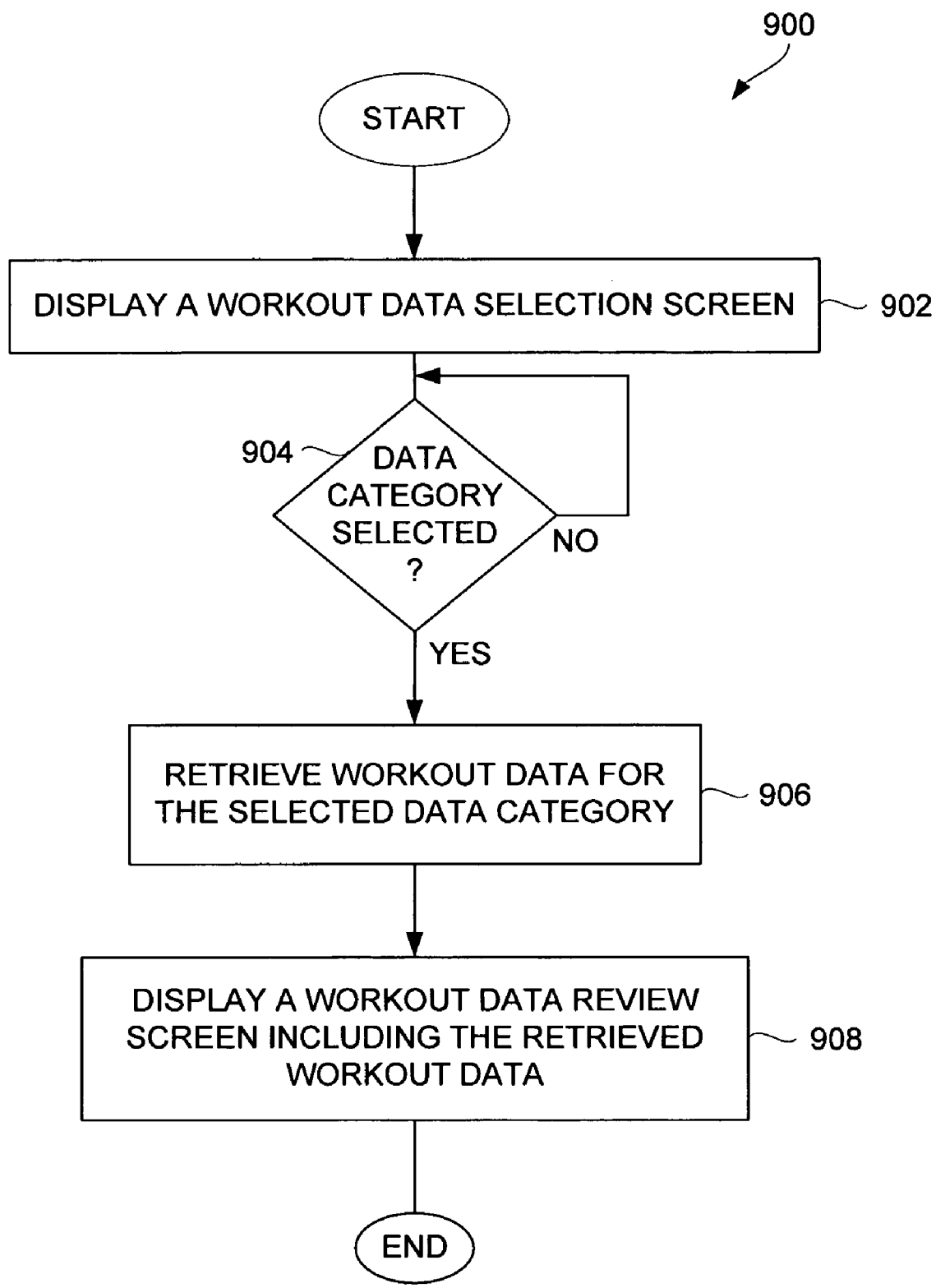
FIG. 9 is a flow diagram of a workout data process according to one embodiment of the invention.

FIG. 9 is a flow diagram of a workout data process 900 according to one embodiment of the invention. The workout data process 900 is, for example, processing associated with the workout data process 610 illustrated in FIG. 6.

The workout data process 900 displays 902 a workout data selection screen. The workout data selection screen is a screen that allows a user to select workout data to be viewed. In this regard, the workout data can be divided into categories, and possibly further divided into subcategories. In any case, a decision 904 determines whether a data category has been selected. Here, it is assumed that the workout data selection screen offers a plurality of different data categories that can be selected. When the decision 904 determines that a data category has not been selected, the decision 904 awaits such a selection. Once the decision 904 determines that a data category has been selected, workout data for the selected data category is retrieved 906. Here, the workout data for the selected data category is retrieved 906 by the computing device through access of the stored workout data. The workout data may or may not be further processed or analyzed once the appropriate workout data is retrieved. In any case, a workout data review screen is then displayed 908. The workout data review screen includes the retrieved workout data, either as retrieved or as further processed. Following the block 908, the workout data process 900 ends.

In an alternative embodiment of the workout data process 900, the workout data review screen might permit the user to further select subcategories or request additional details on certain workout data. A user can also transition back to the workout data selection screen so that they are able to select a different data category and thus be presented with the associated workout data. A user might also be permitted to select one or more subcategories at the workout data selection screen.

Figure 10A:
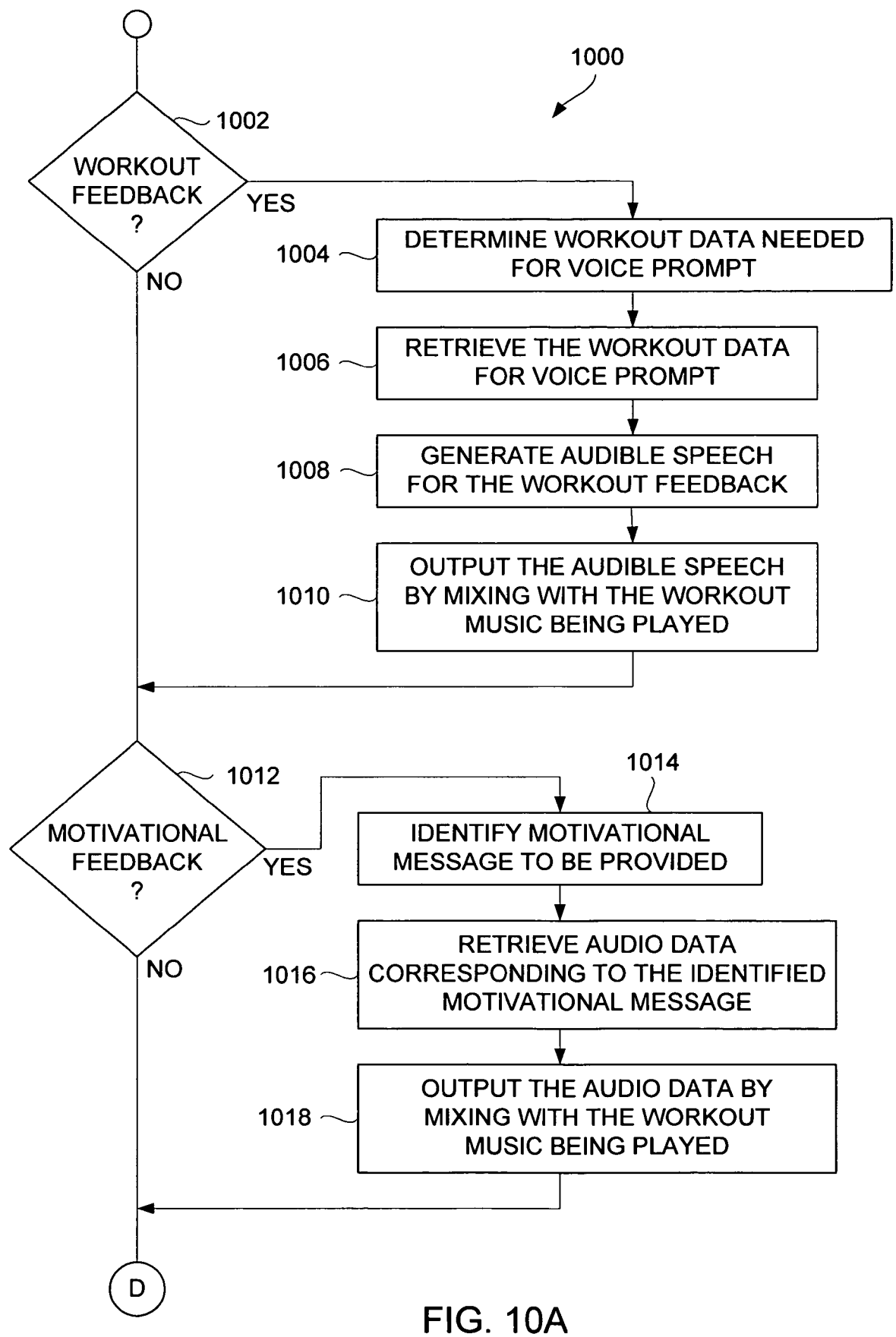
FIGS. 10A and 10B are flow diagrams of an audio feedback process according to one embodiment of the invention.
Figure 10B:
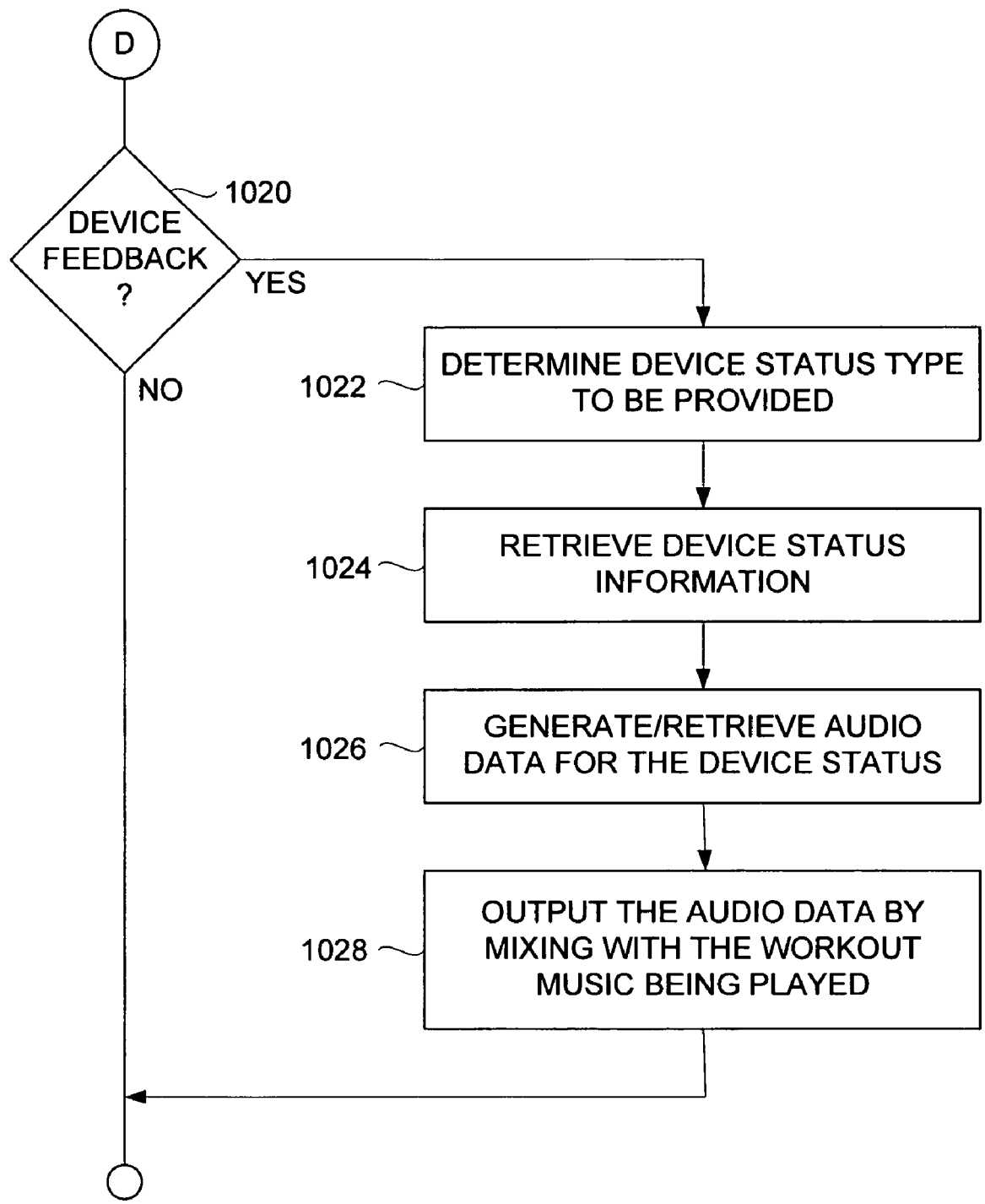

FIGS. 10A and 10B are flow diagrams of an audio feedback process 1000 according to one embodiment of the invention. The audio feedback process 1000 concerns generation of audio feedback for a user of a portable electronic device. The audio feedback can yield an audio prompt, such as a voice prompt. Hence, in accordance with one embodiment, the audio feedback process 1000 can be considered a replacement for blocks 812-816 of the workout manager process 800 illustrated in FIG. 8A.

The audio feedback process 1000 includes a decision 1002 that determines whether workout feedback is to be provided in an audio manner. When the decision 1002 determines that workout feedback is to be provided, workout data needed for a voice prompt is determined 1004. Here, the audio feedback is provided in the nature of a voice prompt. The workout data for the voice prompt is then retrieved 1006. Next, audible speech for the workout feedback is generated 1008. Here, the audible speech could be resident on the computing device (e.g., portable computing device) or could be generated as needed by the computing device. For example, the audible speech can use speech synthesis or a combination of predetermined audio snippets and speech synthesis. Thereafter, the audible speech is output 1010 by mixing the audible speech with the workout music also being played. In one embodiment, the mixing can operate to fade out the workout music while fading in the audible speech for the workout feedback, and then at the end of the audible speech, fading out the end of the audible speech and fading in the workout music.

Following the block 1010, as well as following the decision 1002 when workout feedback is not to be provided, a decision 1012 determines whether motivational feedback is to be provided. When the decision 1012 determines that motivational feedback is to be provided, a motivational message to be provided is identified 1014. Next, audio data corresponding to the identified motivational message is retrieved 1016. Typically, the computing device (portable electronic device) will store in data memory predetermined motivational messages that can be used to provide motivational feedback for the user. Hence, the audio data corresponding to the identified motivational message can be retrieved 1016 from data memory provided in the computing device. Thereafter, the audio data is output 1018 by mixing the audio data with the workout music being played. In one embodiment, the mixing can operate to fade out the workout music while fading in the audio data corresponding to the identified motivational message, and then at the end of the audio data, fading out the end of the audio data and fading in the workout music.

Following the block 1018, as well as following the decision 1012 when motivational feedback is not to be provided, a decision 1020 determines whether device feedback is to be provided. When the decision 1020 determines that device feedback is to be provided, a device status type to be provided is determined 1022. Device status information can then be retrieved 1024. Here, the device status information that is retrieved 1024 can pertain to or include the device status type to be provided. Next, audio data for the device status can be generated or retrieved 1026. Thereafter, the audio data can be output 1028 by mixing the audio data with the workout music being played. Following the block 1028, as well as following the decision 1020 when device feedback is not to be provided, the audio feedback process 1000 ends. Additional details on device feedback, such as device status information, are described in U.S. patent application Ser. No. 11/209,367, filed Aug. 22, 2005, and entitled "AUDIO STATUS INFORMATION FOR A PORTABLE ELECTRONIC DEVICE".

According to another aspect of the invention, a power song can be played by the computing device (e.g., portable computing device). The power song can be provided on a priority basis, so as to replace or override any other song that might be playing. In one embodiment, the power song is a particular predetermined song that was previously selected by the user to motivate the user with regards to a workout.

Figure 11:
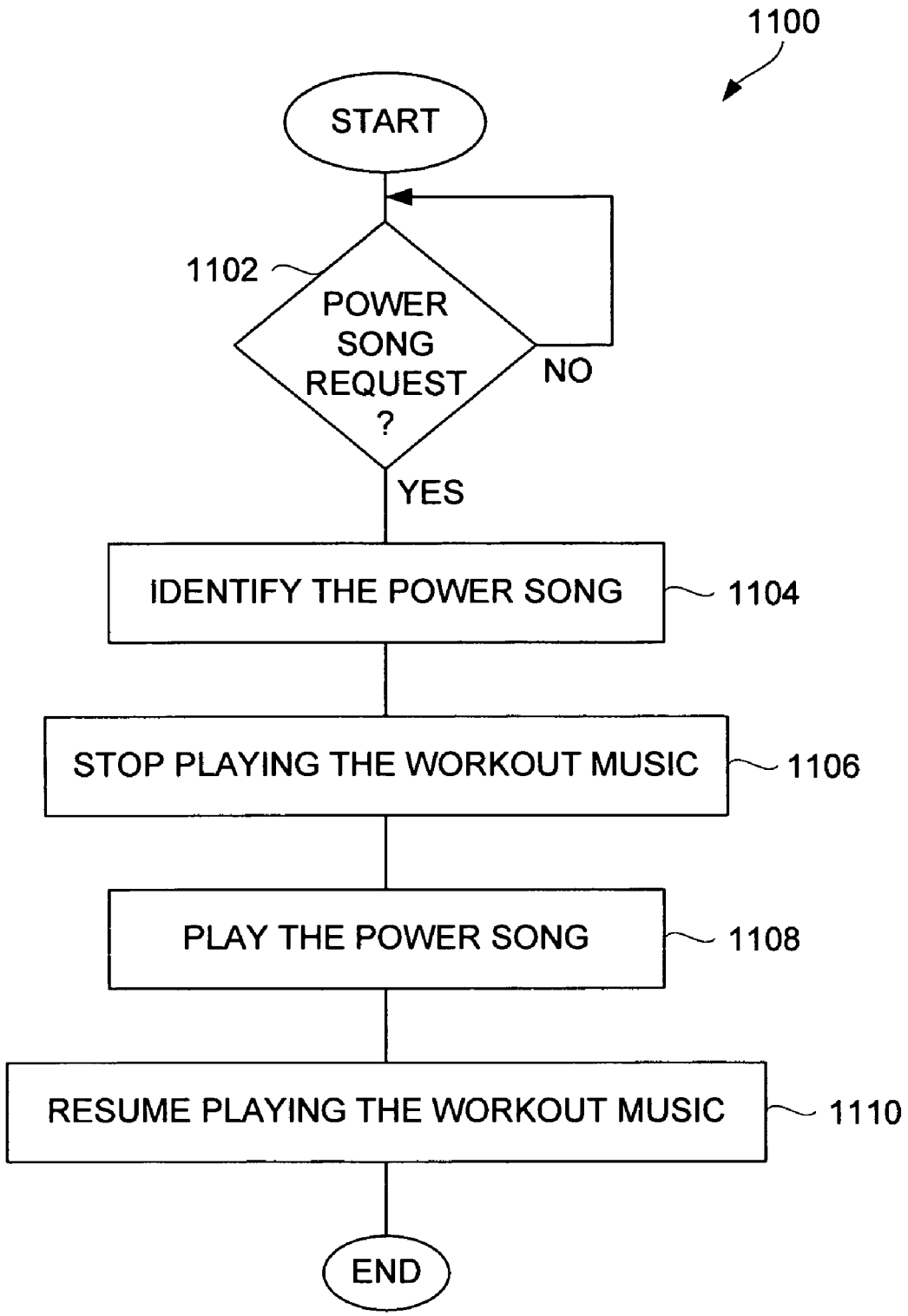
FIG. 11 is a flow diagram of a power song process according to one embodiment of the invention.

FIG. 11 is a flow diagram of a power song process 1100 according to one embodiment of the invention. A computing device (e.g., portable computing device) can support a power song that is played for the user upon request. Hence, the power song process 1100 begins with a decision 1102. The decision 1102 determines whether a power song request has been issued. The power song request can be issued manually by a user of the portable electronic device, or automatically by the computing device itself. In the case in which the user manually causes the power song request, the user might use a user interface action, such as selection of a predetermined button or other action with respect to the computing device.

In any case, when the decision 1002 determines that a power song request has been issued, the power song to be played is identified 1104. Typically, a user of a portable electronic device can configure the computing device so as to provide a particular power song that the user desires. Hence, in one embodiment, the power song to be identified 1104 can pertain to a power song that the user has previously configured the computing device to specify. After the power song has been identified 1104, the workout music that is otherwise being played during the workout can be stopped 1106. The power song is then played 1108. The power song is thus played on a priority basis over any workout music that might be playing. After the power song has played to completion or stopped, the workout music can resume 1110 playing. Following the block 1110, the power song process 1100 is complete and ends.

When resuming 1110 playing of the workout music, in one embodiment, the resume playback position in the workout music can be offset by the duration of the power song. The workout music can pertains to a single audio track or a group of audio tracks. When the workout music is a group (or set) of tracks (songs), if the resume playback position would extend into the next track (song), then the resume playback position can, for example, be placed at the start of the next song.

Figure 12:
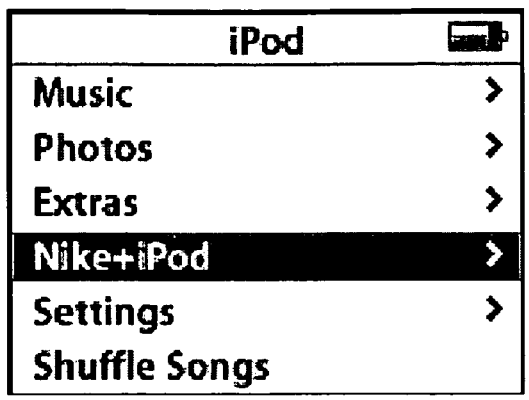
FIGS. 12-79 are exemplary screens that can be provided by a portable electronic device associated with an application directed to monitoring run-based workouts while also permitting workout music to be presented.
Figure 79:
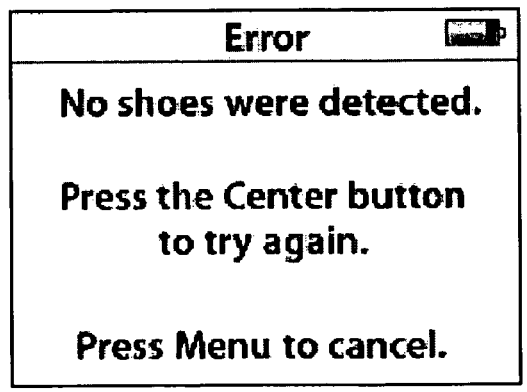

One aspect of the invention pertains to a user interface for an electronic device, such as a portable computing device. One example of a portable computing device is a portable media device. FIGS. 12-79 are exemplary screens that can be provided by a portable electronic device associated with an application directed to monitoring run-based workouts while also permitting workout music to be presented.

Figure 13:
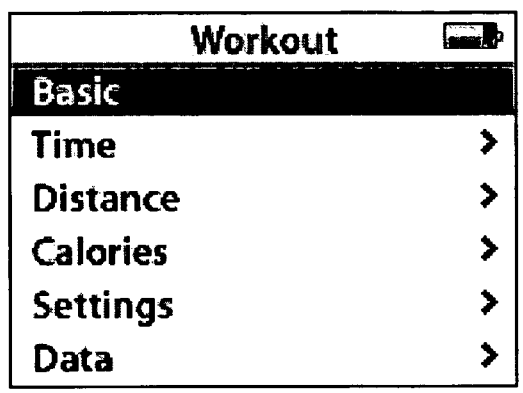
Figure 14:
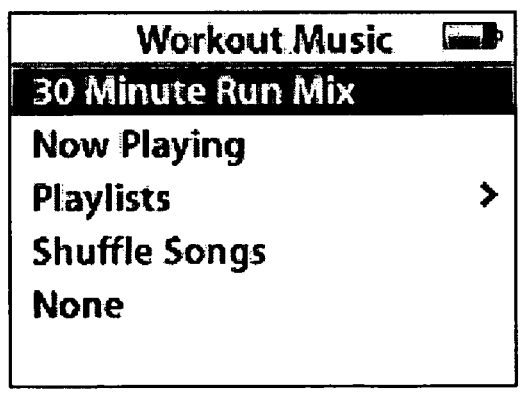
Figure 15:
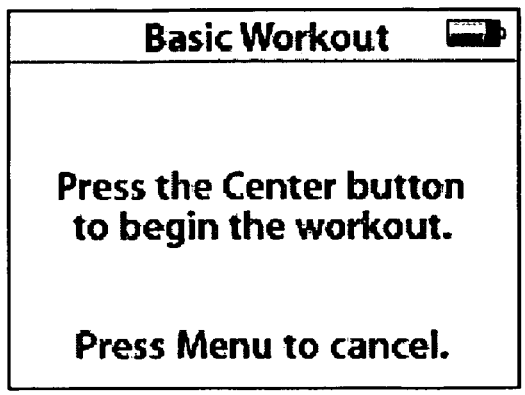

FIG. 12 is a main screen that provides a main menu having a plurality of menu items. The menu item highlighted in FIG. 12 is available in the main menu when a sports monitoring device is available to the portable electronic device. In such case, the portable electronic device provides workout monitoring. When workout monitoring is selected from the main menu, a workout screen can be presented. FIG. 13 illustrates an exemplary workout screen. When a "Basic" workout type is selected, a workout music screen such as shown in FIG. 14 can be displayed. A user can then interact with the workout music screen to select music to be played during a workout. In this example, a user can select a workout related mix of music, e.g., "30 Minute Run Mix" as illustrated in FIG. 14. Alternatively, the user can select from other playlists available to the portable electronic device. After workout music has been selected, a workout start screen such as illustrated in FIG. 15 can be displayed. The workout start screen enables a user to initiate a workout monitoring session.

Figure 16:
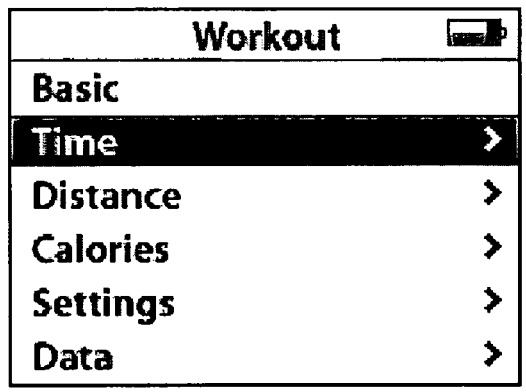
Figure 17:
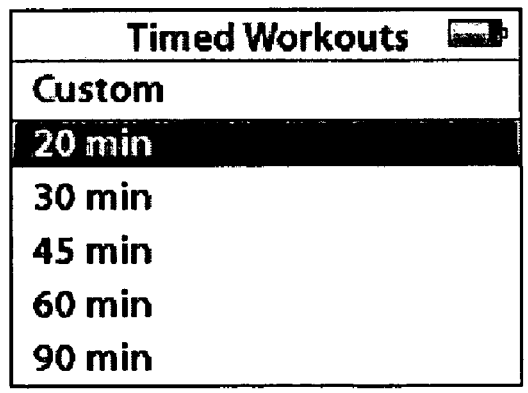
Figure 18:
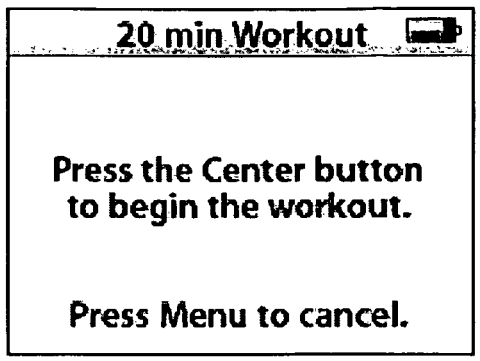
Figure 19:
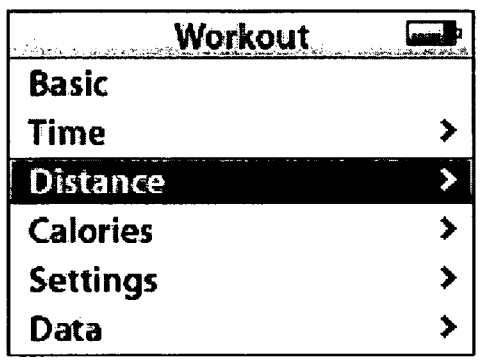
Figure 20:
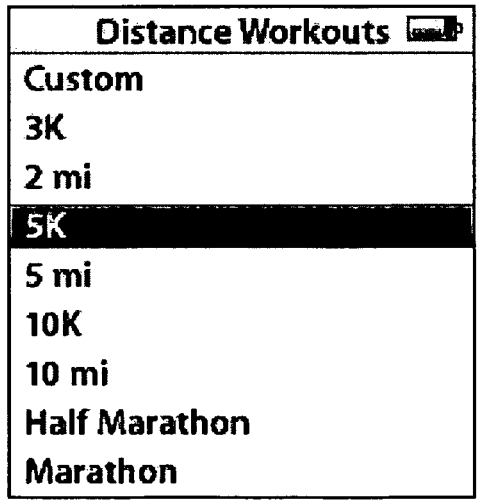
Figure 21:
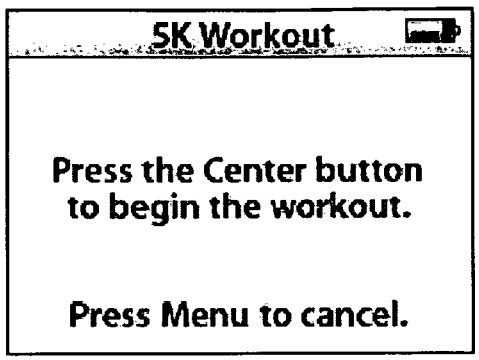
Figure 22:
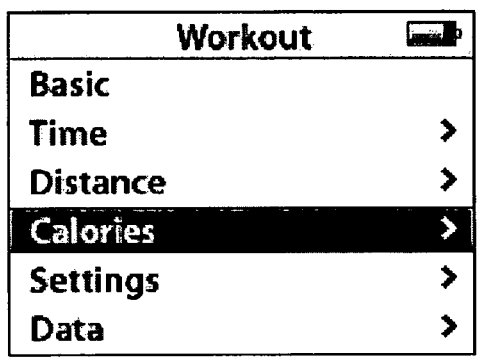
Figure 23:
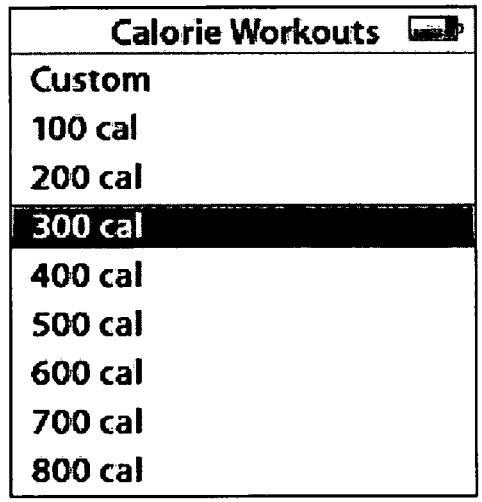
Figure 24:
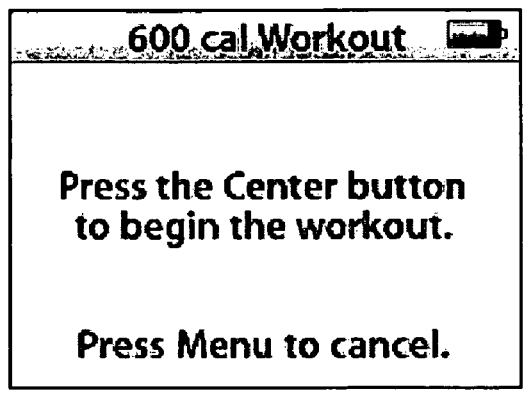

The workout screen can also be used to initiate other types of workouts. These other types of workouts can be based on time, distance or calories. FIG. 16 illustrates a workout screen in which a time-based workout is being requested. When a time-based workout is requested, a workout characteristic screen such as shown in FIG. 17 can be displayed so that a user can select from various different timed workouts. Assuming that the user selects "20 Min" for a 20 minute timed workout as shown in FIG. 17, a workout start screen such as shown in FIG. 18 can be displayed to enable the user to start the workout monitoring session for a 20 minute workout. Alternatively, a user can select a distance type workout as shown in FIG. 19. When a distance-type workout is selected, a workout characteristic screen such as shown in FIG. 20 is displayed. The workout characteristic screen shown in FIG. 20 allows the user to select from various different distance workouts. Assuming that the user has selected "5K" for a 5 k distance workout as shown in FIG. 20, a workout start screen such as shown in FIG. 21 is displayed that enables the user to start the workout monitoring session for a 5 k workout. As another alternative, a user can select a calorie-type workout from the workout screen such as shown in FIG. 22. When the calories-based workout has been selected, a workout characteristic screen such as shown in FIG. 23 can be displayed so that a user can select from different levels of calorie workouts. After the user has selected one of the different calorie workouts, a workout start screen such as shown in FIG. 24 can be displayed so that the user can start a workout monitoring session for the determined calorie workout.

Figure 25:
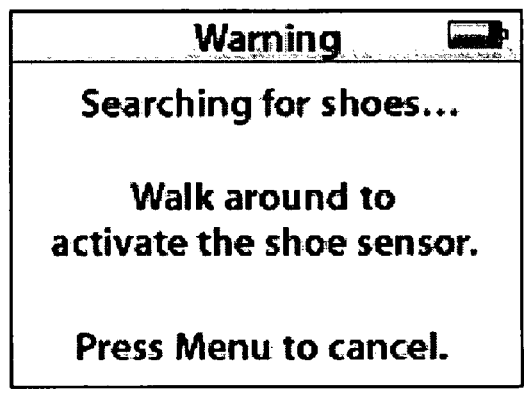

In the embodiment discussed above with respect to FIG. 1, the sports device 104 needs to be in wireless communication with the portable media device 102 for workout monitoring to be performed. When the sports device 104 cannot be located by the portable media device 102, a sensor availability warning screen such as shown in FIG. 25 can be displayed. Here, the sensor availability warning screen informs the user that the sports device 104, which in this example is located within a shoe of the user, has not been located. Hence, it is recommended that the user walk around to activate the sports device 104 (or sensor) residing in the shoe. It should be noted that the sports device 104 can utilize a low power mode in which it conserves energy when there is a lack of movement. Hence, by walking around, the user can cause the sports device 104 to awaken from any low-power state it may be in.

Figure 26:
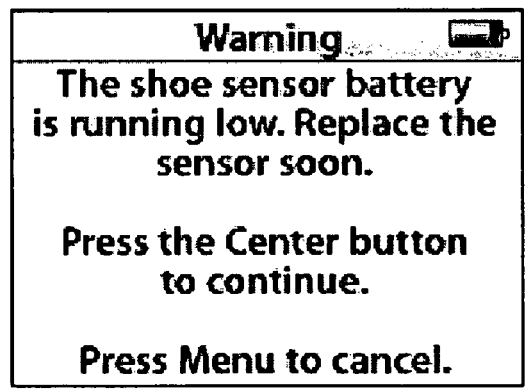

In addition, a battery status notification screen such as shown in FIG. 26 can be presented to a user. The battery status notification screen is provided to inform the user that the battery residing in the sports device 104 is low and will soon need to be replaced. Similar status screens could also be provided to inform the user of other status conditions of the sports device 104 or of the portable media device 102. In one embodiment, the battery status notification screen can be presented to the user prior to presenting a workout start screen to the user.

Figure 27:
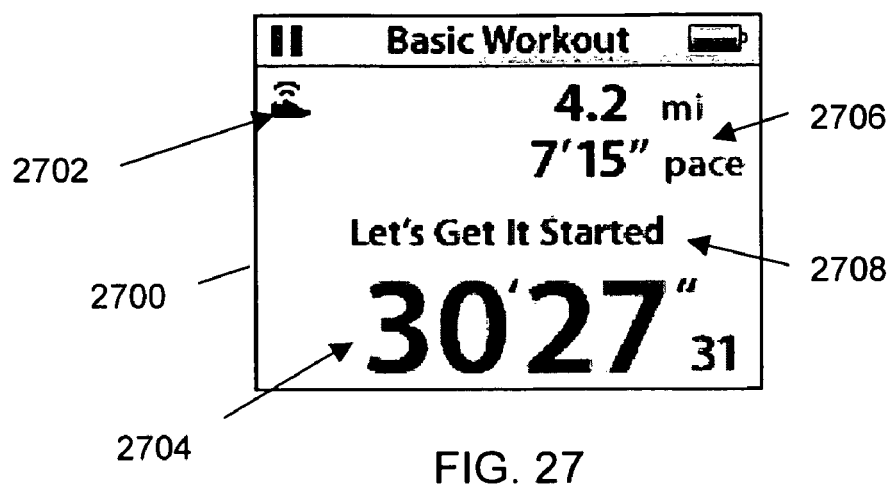

FIG. 27 illustrates a workout status screen according to one embodiment of the invention. The workout status screen can also be referred to as a workout progress screen. In any case, the workout status screen 2700 includes a shoe icon 2702 that can visually indicate (e.g., flash) when the associated sports device is in communication with the portable electronic device (portable media device). The workout status screen 2700 also includes display of a main metric 2704 and two minor metrics 2706. These metrics are typically associated with the workout monitoring being performed. In this case, the application is for run monitoring, hence, the main metric 2704 displays time and the minor metrics 2706 display pace and distance (miles). The workout status screen 2700 also displays music information 2708, such as song name, artist or album for a song being played. The display format can operate to scroll between song name, artist and album. The workout status screen can be displayed to the user once the user begins a workout, such as following a workout start screen. The workout status screen 2700 can be presented to the user during the workout. In addition, once the workout begins, such as by a user interacting with a workout start screen, an audio indication can also be output to the user, such as the audio indication "Beginning Workout".

Figure 28:
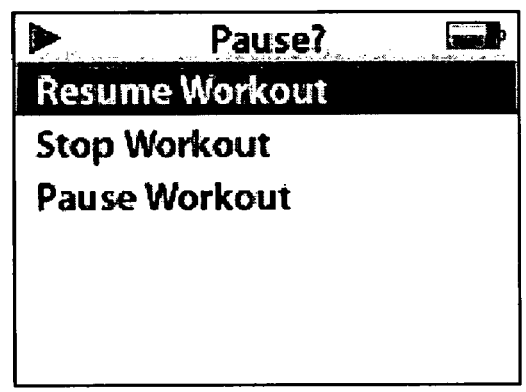
Figure 29:
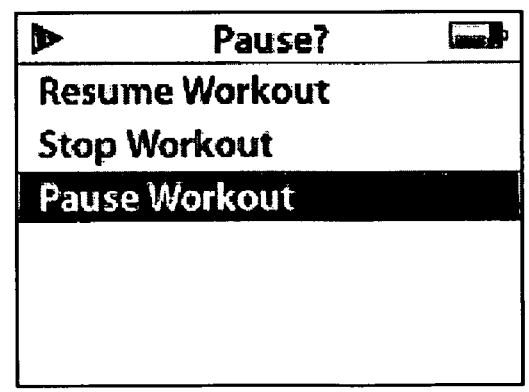
Figure 30:
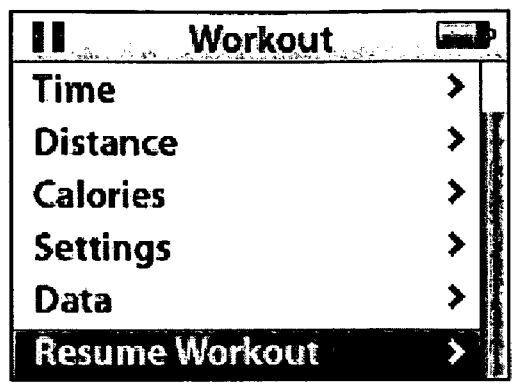

During a workout, a user may wish to pause the workout or stop the workout. In one embodiment, pressing a predetermined button associated with the portable electronic device can cause a workout to be paused. When paused, the workout can suspend data collection for workout monitoring and may also pause the workout music being played. Still further, an audio indication can be output to the user that the workout has been paused, such as the audio indication "Workout Paused". When the predetermined button is pressed, a pause screen such as illustrated in FIG. 28 can be displayed. From the pause screen, a user can resume a workout and thus return to the workout status screen. Alternatively, as illustrated in FIG. 29, a user can request to pause the workout in which case a workout screen such as illustrated in FIG. 30 can be displayed. In the workout screen illustrated in FIG. 30, when the "Resume Workout" item is selected as illustrated in FIG. 30, workout monitoring can restart and the workout status screen displayed.

Figure 31:
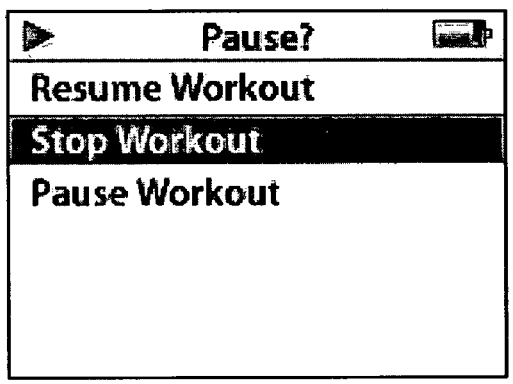
Figure 32:
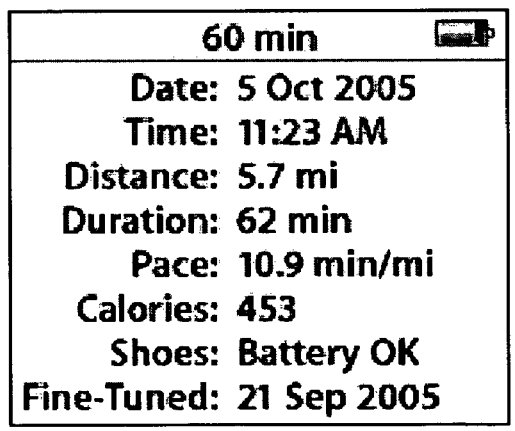

On the other hand, when a stop workout selection is made with respect to a pause screen such as illustrated in FIG. 31, the workout is stopped. Once the workout is stopped, a workout summary screen can be displayed as illustrated in FIG. 32. In this example, the workout summary screen pertains to a 60 minute workout. The workout summary screen indicates the date, time, distance, duration, pace, calories, battery condition, and date fine-tuned (calibrated).

Figure 33:
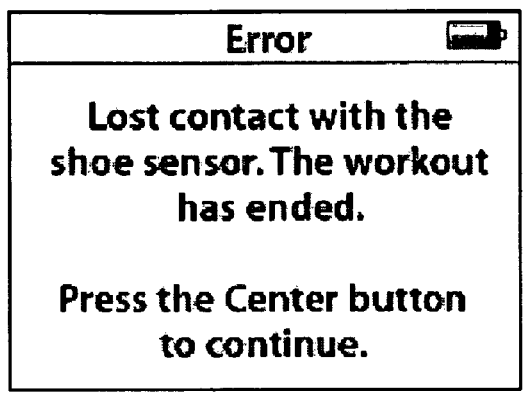

FIG. 33 illustrates an exemplary screen that can be presented to the user when the sports device has lost wireless communication with respect to the portable electronic device. In this case, the workout ends when the sports device has lost communication with the portable electronic device. Additionally, in one embodiment, audio feedback can be provided to the user that the portable electronic device has "Lost Contact With Shoe Sensor" and subsequently that "Workout Completed".

Figure 34:
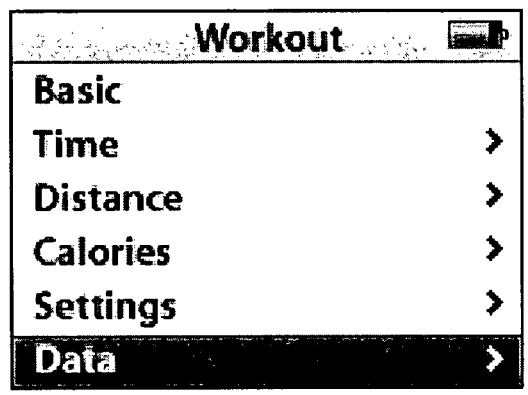
Figure 35:
Figure 36:
Figure 37:
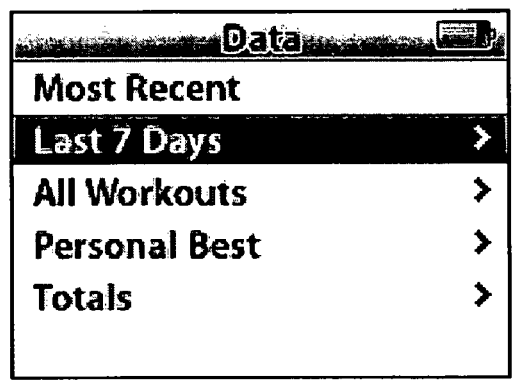
Figure 38:
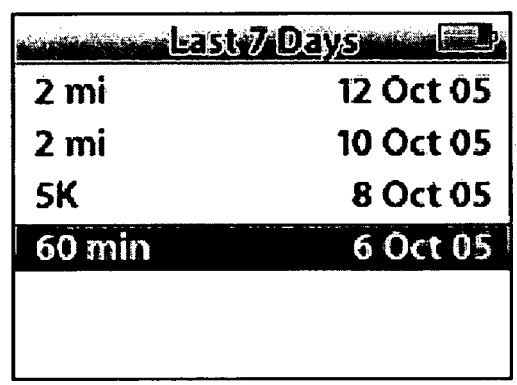
Figure 39:
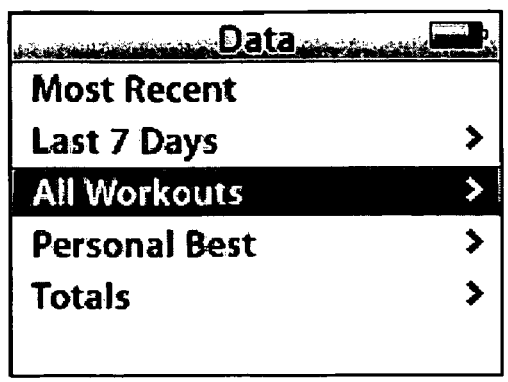
Figure 40:

From the workout screen, such as illustrated in FIG. 34, a user can also select a "Data" item so that workout data can be reviewed. When the data item from the workout screen is selected, a workout data selection screen such as illustrated in FIG. 35 is displayed. The workout data selection screen allows the user to review data from past workouts. The data can pertain to an individual workout, all workouts, recent workouts, or summaries or totals from various workouts. When the user selects to review "Most Recent" data such as illustrated in FIG. 35, a workout data review screen such as illustrated in FIG. 36 can be displayed so that the user can review the data associated with the user's most recent workout. Alternatively, when the user selects the "Last 7 Days" item from the workout data selection screen such as illustrated in FIG. 37, a second workout data selection screen such as illustrated in FIG. 38 can be displayed. The second workout data selection screen provides different groupings of workouts that have been performed within the last 7 days. In one embodiment, the workout data selection screen can correspond to categories of workout data, whereas the second workout data selection screen can refer to subcategories of workout data. In any case, when the user selects one of the items from the second workout data selection screen, such as "60 Min" as illustrated in FIG. 38, a workout data review screen, such as the workout data review screen illustrated in FIG. 36 can be displayed. Similarly, when the user selects the "All Workouts" item from the workout data selection screen such as illustrated in FIG. 39, a second workout data selection screen such as illustrated in FIG. 40 can be displayed. Then, if the user selects the "60 Min" grouping for all of the user's prior workouts, the appropriate data can then be displayed to the user, such as using a workout data review screen.

Figure 41:
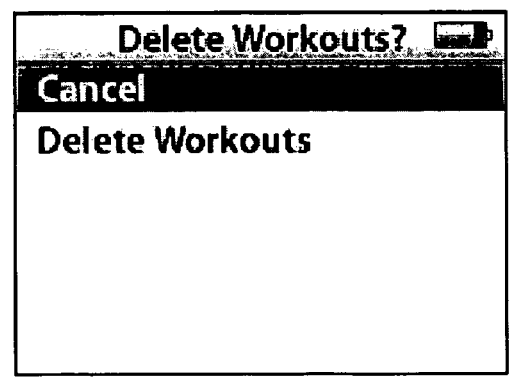

Once a workout data review screen is displayed, a user can press a predetermined button to cause deletion of data corresponding to an individual workout. As an example, when the predetermined button is pressed, a delete workout screen such as illustrated in FIG. 41 can be displayed. From the delete workout screen, the delete request can be cancelled or the delete can be processed depending upon a subsequent user selection.

The portable electronic device can also maintain data pertaining to personal best across the various workouts that the user has in the past performed. From the workout data selection screen a "Personal Best" item can be selected such as illustrated in FIG. 42. When the "Personal Best" item is selected from the workout data selection screen, a personal best screen can be displayed such as illustrated in FIG. 43. In this example, the personal best information provided in the personal best screen is categorized for different distances that the user has in the past run. If the user has not performed any runs or workouts for any of the available predetermined distances, such distances or categories would not have any corresponding data. Hence, in one embodiment, those categories or distances for which there is no data, are not displayed in the personal best screen.

Still further, from the workout data selection screen, a user can also select to review data corresponding to their totals across the various workouts that the user has in the past performed. As shown in FIG. 44, when the "Total" items from the workout data selection screen is selected, a totals screen such as illustrated in FIG. 45 can be displayed. The totals screen provides data corresponding to all of the workouts previously performed by the user with respect to the portable electronic device. In this example, the total screen indicates number of workouts, farthest distance run, total distance run, total time run, and total calories consumed. In addition, by pressing a predetermined button, the user can cause display of a clear totals screen such as illustrated in FIG. 46. Using the clear totals screen the user can cause the totals to be cleared if so desired.

Besides the predetermined distance workouts that are made available in the workout characteristics screen illustrated in FIG. 20, a custom distance workout can also be performed. For example, when the "Custom" item is selected from the workout characteristics screen, a custom distance screen such as illustrated in FIG. 47 can be displayed. The custom distance screen enables the user to set the distance (e.g., in miles) for a distance workout to be performed. Similarly, in the case of a caloric workout, the workout characteristic screen can include a "Custom" item such as illustrated in FIG. 23. Upon selection of the "Custom" item, the user can be presented with a custom calorie screen (not shown) that enables the user to enter a number of calories to be associated with the workout. Yet still further, when a timed workout is to be performed, the workout characteristic screen can include a "Custom" item such as illustrated in FIG. 17. When the "Custom" item is selected from the workout characteristic screen, the user can be presented with a time entry screen that allows a user to enter a duration of time for the workout.

Figure 48:
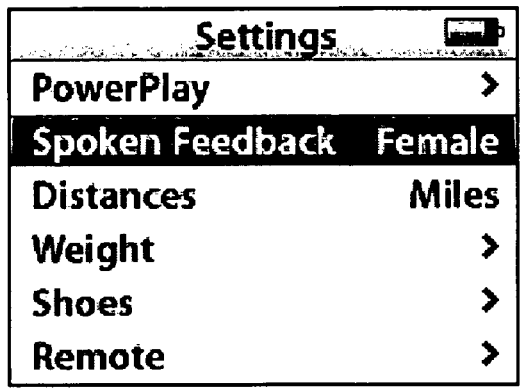
Figure 49:
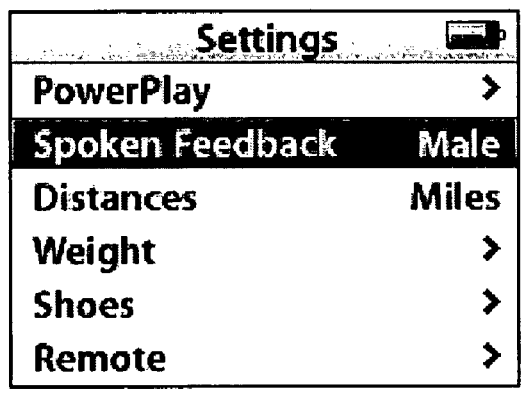
Figure 50:
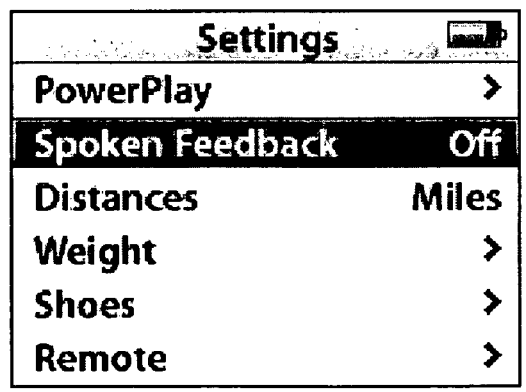

As noted above, the portable electronic device can provide voice feedback (more generally, audio feedback) to its user. In this regard, a settings screen, such as shown in FIGS. 48-50 can be used to configure the voice feedback (spoken feedback). The three options for voice feedback include a female voice, as shown in FIG. 48, a male voice as shown in FIG. 49, and no voice feedback as shown in FIG. 50.

Figure 51:
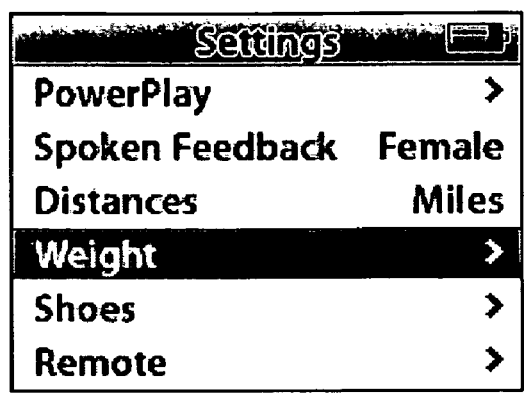
Figure 52:
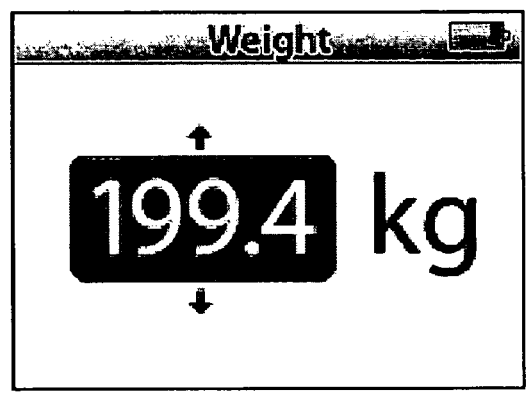

The settings screen can also be used to set the user's weight. In FIG. 51, the settings screen is indicated with a "Weight" item highlighted. When the "Weight" item is selected, a weight entry screen such as illustrated in FIG. 52 can be displayed so that the user can enter his/her weight. Weight entry is important for calorie workouts so that the portable electronic device is able to compute the number of calories being burned during the workout. The weight can be entered in kilograms or pounds.

Figure 53:
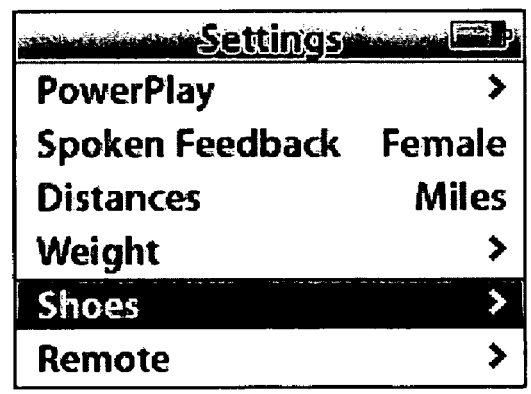
Figure 54:
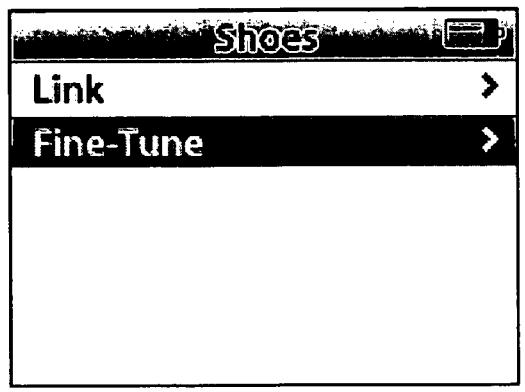
Figure 55:
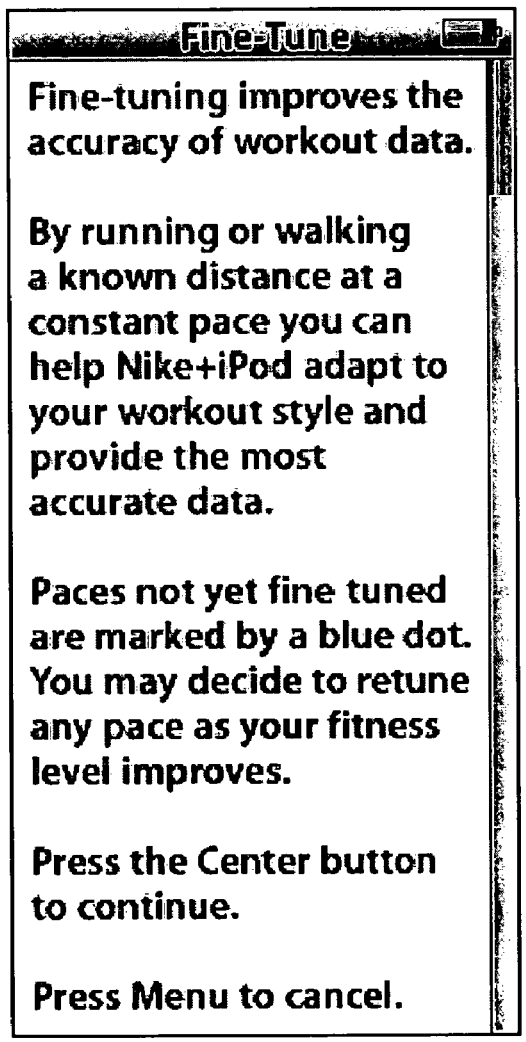
Figure 56:
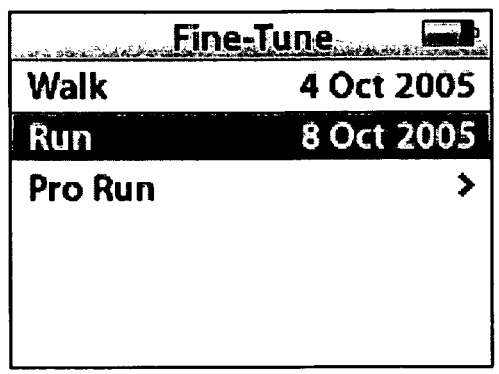
Figure 57:
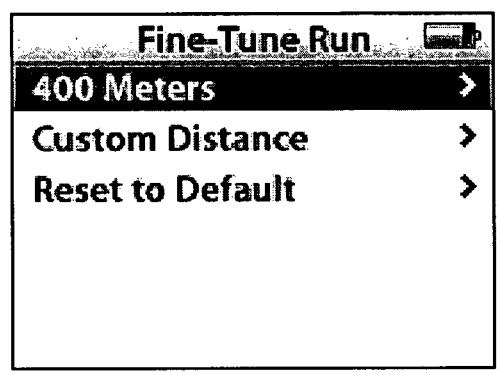
Figure 58:
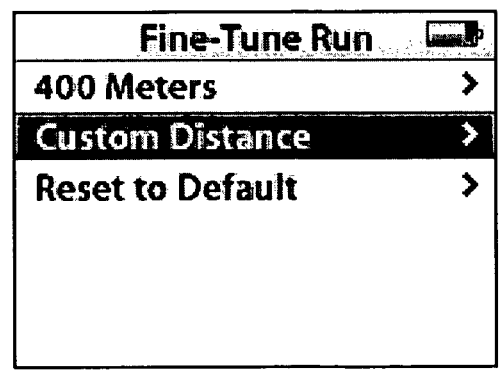
Figure 59:
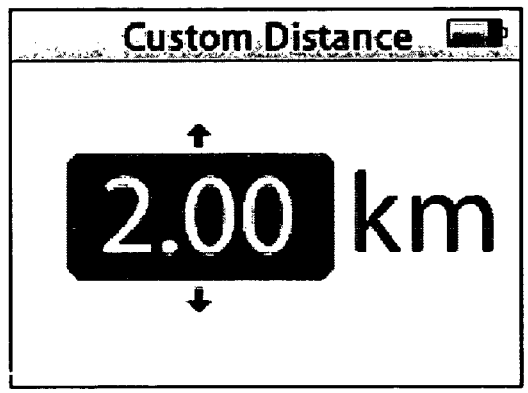

The setting screen can also be utilized to fine-tune the accuracy of the portable electronic device. FIGS. 53-66 pertain to fine-tuning of the accuracy, which is also known as calibration. In FIG. 53, a settings screen is illustrated with the "Shoes" item highlighted. Upon selection of the "Shoes" item, a shoes screen such as illustrated in FIG. 54 can be displayed. As shown in FIG. 54, the "Fine-Tune" item is highlighted. When the "Fine-Tune" item is selected, a fine-tune screen is displayed such as illustrated in FIG. 55. In the fine-tune screen, an explanatory message can be provided to the user regarding how the fine-tuning (i.e., calibration) process is to be performed. From the fine-tune screen, a fine-tune status screen can be displayed such as illustrated in FIG. 56. In this example, the fine-tune status screen indicates that a walk-type fine-tune was performed on Oct. 4, 2005 and that a run-type fine-tune was performed on Oct. 8, 2005. The "Pro Run" item is shown in the fine-tune screen as not having yet been performed. When the "Run" item is selected from the fine-tune screen such as illustrated in FIG. 56, a fine-tune run screen such as illustrated in FIG. 57 can be displayed. From the fine-tune run screen, a user can select either a 400 meter run or a custom distance to be utilize for a fine-tune operation. Alternatively, the user could reset the fine-tune run data to its default data. When the fine-tune run screen is used to select the "Custom Distance" item as shown in FIG. 58, a custom distance screen such as illustrated in FIG. 59 can be displayed so that a user can enter a custom distance to be utilized with respect to the fine-tune run.

Figure 60:
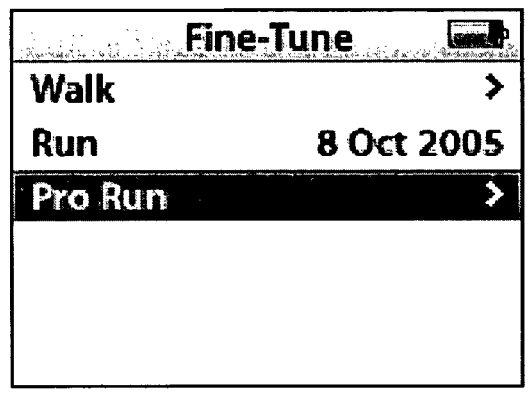
Figure 61:
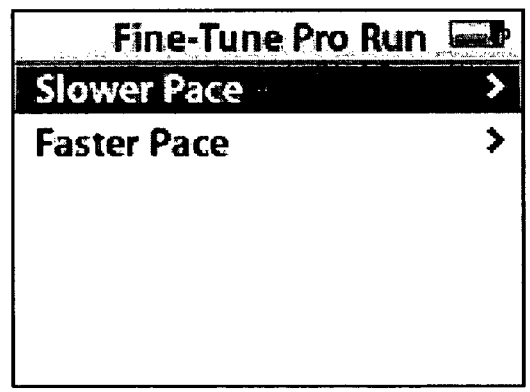
Figure 62:
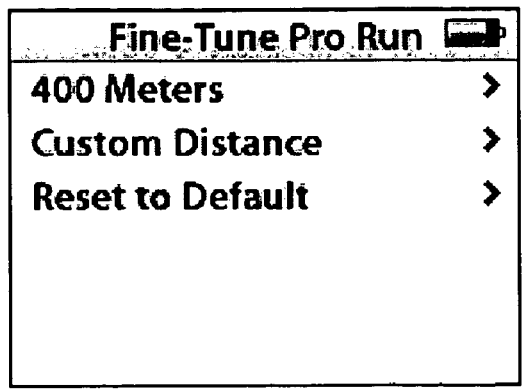

The fine-tune screen illustrated in FIG. 60 shows the "Pro Run" item being highlighted. When the "Pro Run" item is selected, a fine-tune pro run screen such as illustrated in FIG. 61 is displayed. The fine tune pro run screen allows the user to elect to run at a slower pace or a faster pace for the fine-tune operation. Regardless of which pace is selected, a fine-tune pro run screen such as illustrated in FIG. 62 is displayed. The fine-tune pro run screen illustrated in FIG. 62 allows the user to select a predetermined distance, a custom distance or a reset operation.

Figure 63:
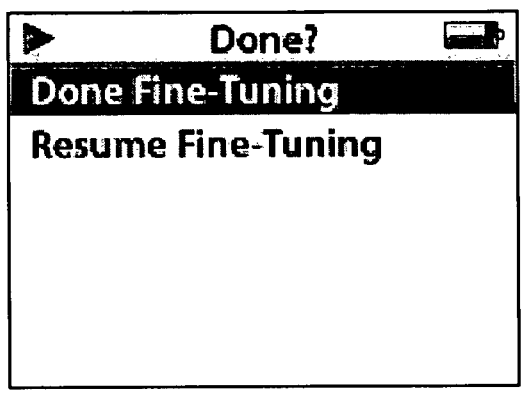
Figure 64:
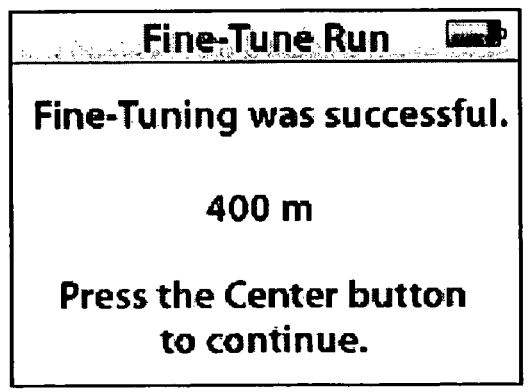
Figure 65:
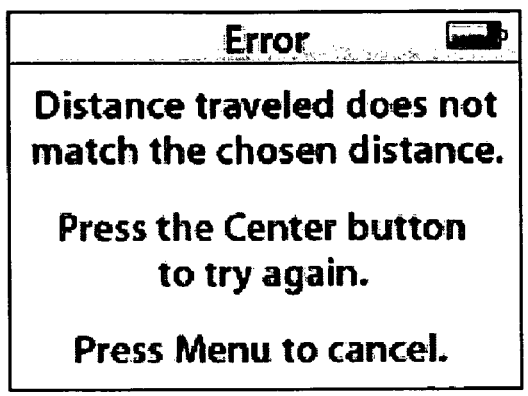
Figure 66:
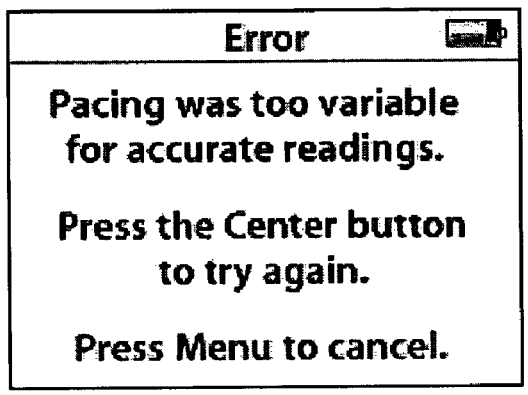

Once the fine-tune run has been specified, the user can be presented with a music selection screen and then a start screen. Once the user has indicated that they have started the fine tune run, a workout status screen can be displayed as discussed above. When a pause request has been activated, such as by pressing a predetermined button, a fine-tune pause screen such as illustrated in FIG. 63 can be displayed. The fine-tune pause screen enables a user to end the fine-tuning or resume the fine-tuning. Regardless, when the fine-tune run has completed in a successful manner, a fine-tune run screen such as illustrated in FIG. 64 can be displayed. Alternatively, when the fine-tune run does not complete successfully, error screens such as illustrated in FIG. 65 or FIG. 66 can be displayed. The error screen shown in FIG. 65 indicates that the distance run by the user was not the chosen distance for the fine-tuning. FIG. 66 indicates that the user varied their pace too much during the fine-tuning run, which caused inaccuracies.

Figure 67:
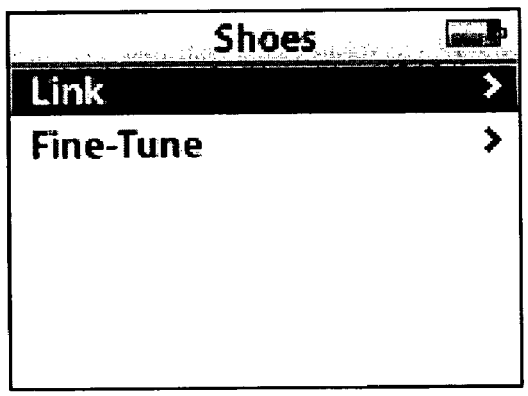
Figure 68:
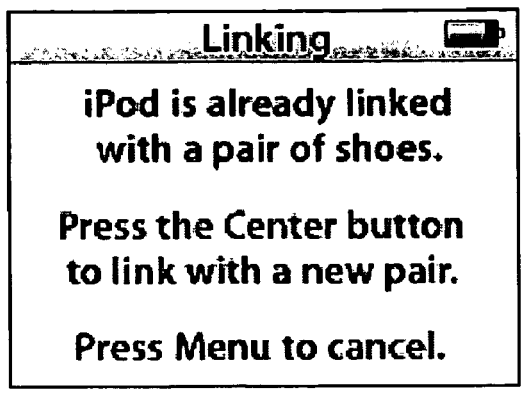
Figure 69:
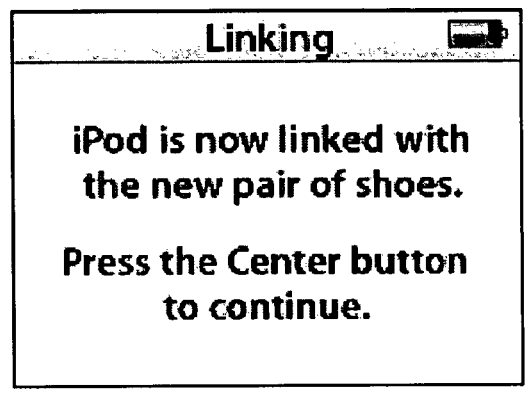
Figure 70:
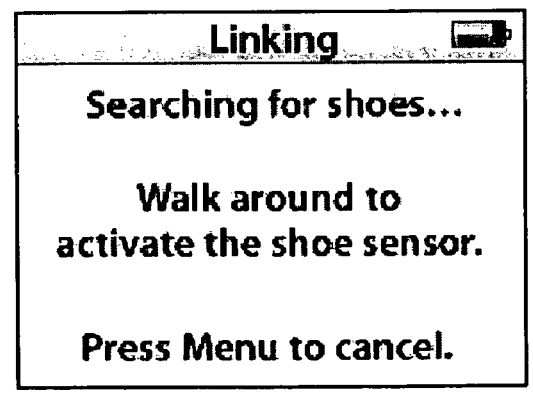
Figure 71:
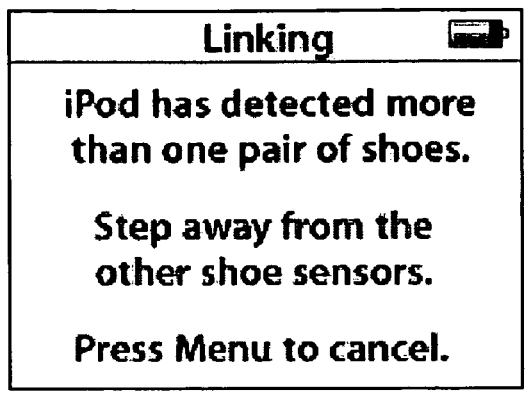

FIGS. 67-72 are representative screens pertaining to linking of a sports device (e.g., within a shoe) with a portable electronic device. From a settings screen, a user can select a "Shoes" item. When the "Shoes" item of a settings screen is selected, a shoes screen such as illustrated in FIG. 67 can be displayed. When the "Link" item from the shoes screen is highlighted as shown in FIG. 67, the user can select the "Link" item to link the portable electronic device to the sports device within a shoe. FIG. 68 is a linking screen that indicates to the user that has requested linking that the portable electronic device is already linked. If desired, the user can continue to link the portable electronic device with a different pair of shoes (i.e., different sports device). Upon successful linking, a linking screen such as shown in FIG. 69 can be displayed to the user. Further, during the linking operation, if the portable electronic device is having difficulty locating the shoes (i.e., sports sensor) to be linked with, a linking screen such as shown in FIG. 70 can be displayed to the user requesting that the user walk around with the shoe so that the sports device is activated. Here, the sports device may be inactive or in a low power state when the shoe has not been used for walking or running in the immediate past. The sports device can be awakened by the user walking around with the shoe. Also, during the linking operation, if the portable electronic device detects more than one shoe having a sports device, a linking screen such as shown in FIG. 71 can be displayed to inform the user and request that they isolate all but one shoe from the portable electronic device.

Figure 72:
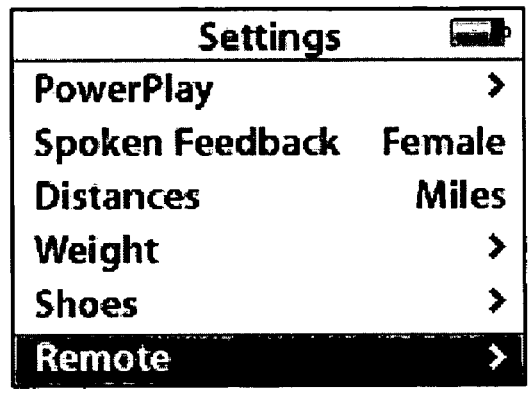
Figure 73:
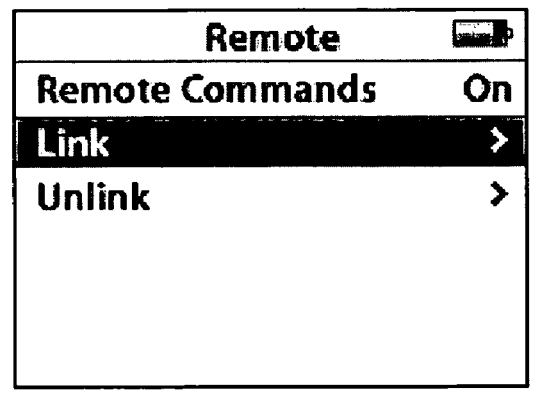
Figure 74:
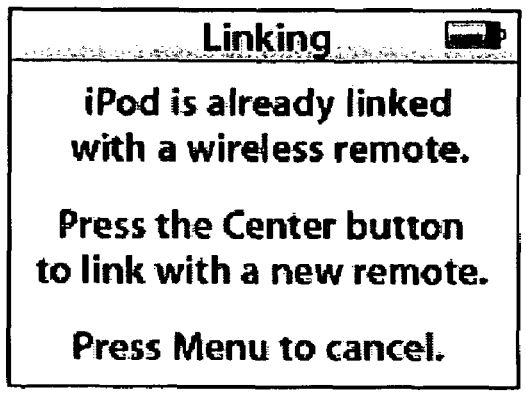
Figure 75:
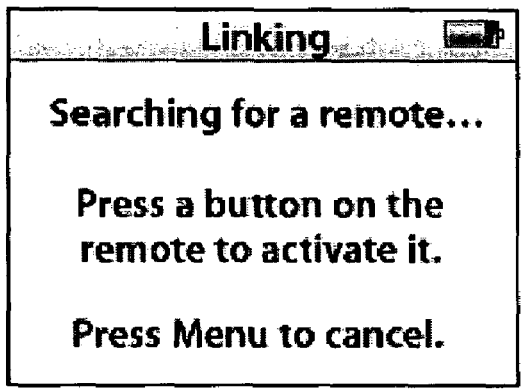
Figure 76:
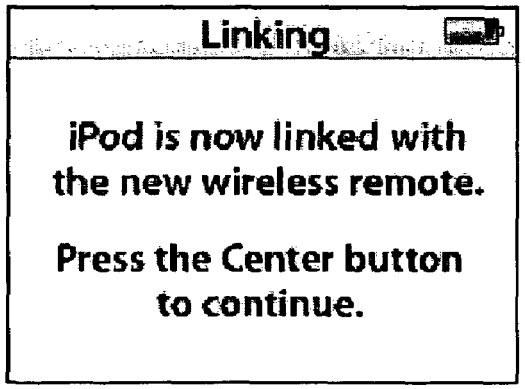
Figure 77:
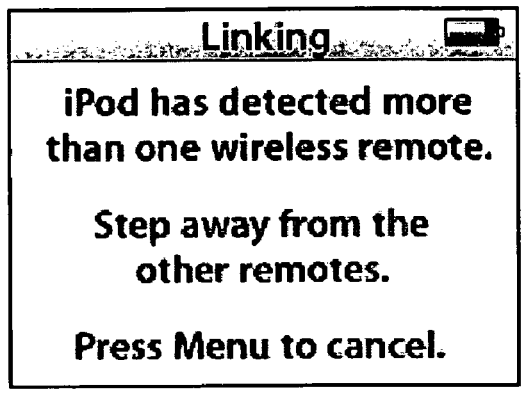

FIGS. 72-79 pertain to linking of a remote controller with the portable electronic device. In FIG. 72, a settings screen is illustrated having the "Remote" item highlighted. When the "Remote" item is selected, a remote screen such as illustrated in FIG. 73 can be displayed. The remote screen can be used to enable or disable remote commands, and can also link or unlink a remote controller to the portable electronic device. When the "Link" item is selected from the remote screen illustrated in FIG. 73, a linking screen such as shown in FIG. 74 can be displayed informing the user that the portable electronic device is already linked with a wireless remote (remote controller). Alternatively, during the linking operation, a linking screen such as shown in FIG. 75 can be displayed to inform the user that a portable electronic device is searching for the wireless remote and that the user should press a button on the wireless remote so that it is activated. Once the linking with the wireless remote has been successfully performed, the portable electronic device can display a linking screen such as shown in FIG. 76. During the linking operation, if the portable electronic device detects more than one wireless remote in the vicinity, a linking screen such as shown in FIG. 77 can be displayed to advise the user to remove all but one wireless remote from the vicinity of the portable electronic device.

Figure 78:
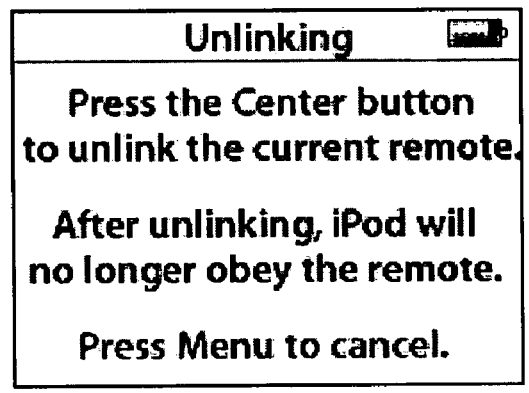

The remote screen such as shown in FIG. 73 can also be used to unlink a wireless remote from being linked with the portable electronic device. When the "Unlink" item in the remote screen is selected, an unlinking screen such as illustrated in FIG. 78 is displayed. The unlinking screen can advise the user on pressing a button to unlink the current wireless remote.

During the linking operation, with respect to a shoe or a wireless remote, in the event that the shoe or wireless remote is unable to be detected, an error screen can be presented to the user. For example, FIG. 79 illustrates an error screen informing the user that no shoes were detected during a linking operation with respect to a shoe and the portable electronic device. A similar error screen could be displayed when no wireless remote is detected during a linking operation with respect to a wireless remote and the portable electronic device.

Another aspect of the invention pertains to the use of templates to affect operation of a portable electronic device. Templates can be used to define workouts. A template can characterize or describe a workout. A template can, for example, be provided as a XML file. The templates can be included in firmware of the portable electronic device, such as the portable media device 102, or downloaded to the portable electronic device. For example, with respect to FIG. 1, templates can be downloaded from the media management application 114 operating on the personal computer 110 to the portable media device 102. The portable electronic device can present on a display those templates available on the portable electronic device.

In one embodiment, the templates are run templates. A run template characterizes or describes a run workout. When utilized by the portable electronic device, the run templates can affect one or more aspects of the run workout. The one or more aspects of the run workout can include a workout status screen, workout goal (e.g., distance), data monitoring, voice feedback, media output (e.g., music), etc.

Figure 80:
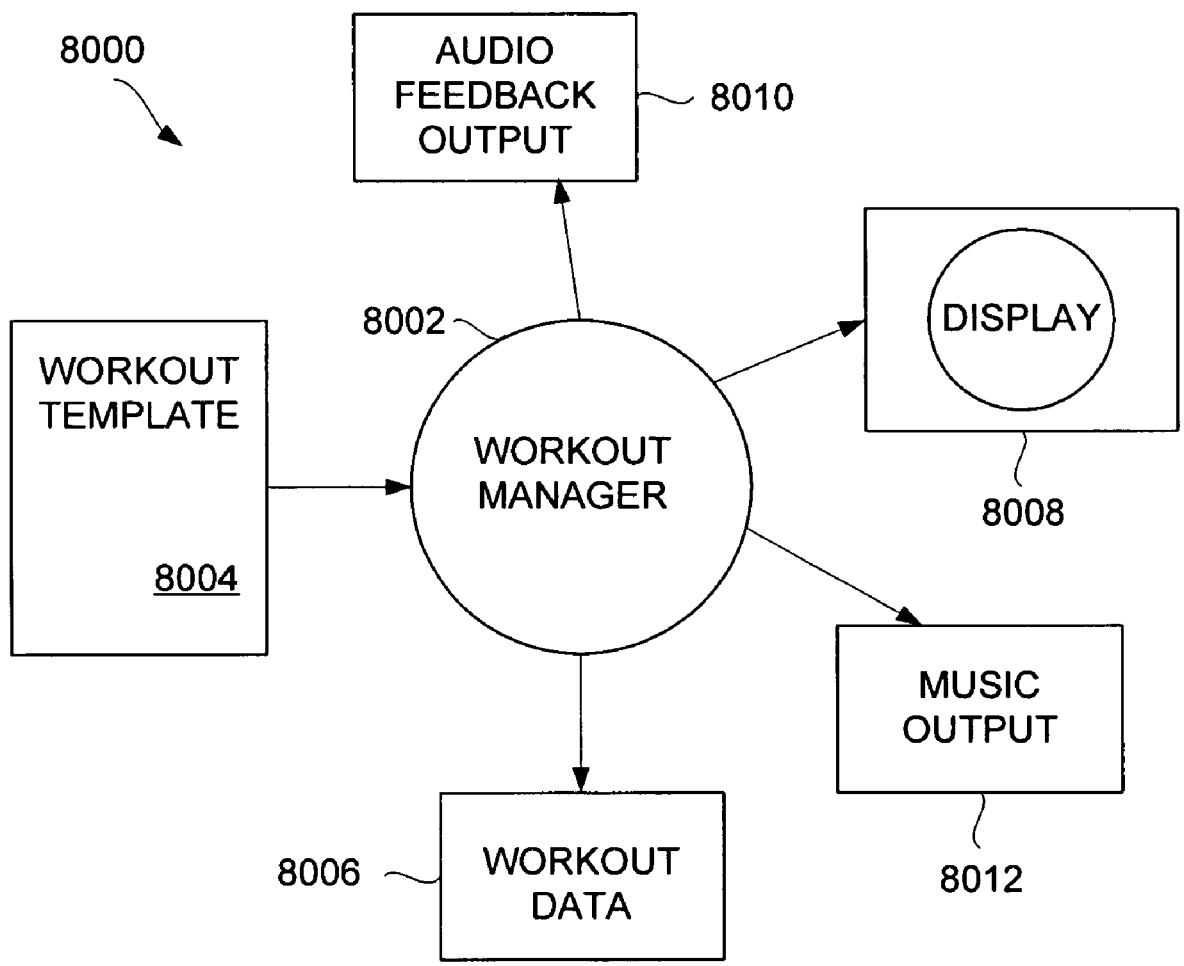
FIG. 80 is a diagram of a template control system according to one embodiment of the invention.

FIG. 80 is a diagram of a template control system 8000 according to one embodiment of the invention. The template control system 8000 is managed by a workout manager 8002 provided within a computing device, such as a portable computing device. The template control system 8000 utilizes one or more workout templates 8004. The workout templates 8004 are provided to a workout manager 8002. The workout manager 8002 can control operation of the computing device during a workout in accordance with the workout templates 8004. In this regard, using information from the workout templates 8004, the workout manager 8002 can control whether or not workout data 8006, such as workout data provided by a sports device, is recorded. In addition, the workout manager 8002 can control or influence what is presented on a display 8008 based on the workout templates 8004. For example, the information being presented on a workout screen can be controlled by information within the workout templates 8004. As a particular example, the workout status screen illustrated in FIG. 27 can have the information being displayed in the major metric area 2704 and the minor metric areas 2706 be determined by information within the workout template. Also, the workout template 8004 can control when and what audio feedback 8010 is provided to the user of the computing device (portable electronic device). Still further, the workout template 8004 can be used to determine what music 8012 is output during the workout.

In one embodiment, each template is provided with a template identifier that is unique or pseudo unique. The template identifier can be referred to when selecting a desired template, when downloading templates, etc.

According to one embodiment, a run template can include a header section and one or more interval sections. The header section can include: a title for the run, instructions for the run, a workout category, a template version, a template format version, and/or description of what to display in a data summary screen. Each interval section can include: a goal base for the run (e.g., a time, a distance, a number of calories, a number of strides, etc.), whether data for the interval should be recorded, what music (e.g., playlist) to use for the interval, what to display in a workout status screen, and/or what voice prompts are to be used and at what points during the workout.

The title for the run can vary. For example, the title can be "5 k Workout". The instruction for the run, if provided, can be displayed for the user prior to beginning the run workout. The template version can be used to determine whether a new version of the template needs to be downloaded. The template format version can be used for compatibility purposes. Templates with a higher format version than the firmware in the portable electronic device can allow the system to ignore unknown tags. Unknown tags in a template claiming an equal or lower template format version will cause the template to be rejected.

The contents for the data summary screen can be specified by at least one field identifier that identifies information, namely, run history, to be displayed. The information can be displayed in the order listed in the template. Some possible examples of information that can be specified for inclusion in the data summary screen include: weekly average pace, weekly average distance, overall averages of various types, total weekly distance, total distance for this run, total number of steps for this run, total time for this run, total calories burned during this run, and every recorded interval time.

The interval section includes one or more intervals. Each interval can provide the following information: interval goal base (e.g., a time, distance, number of calories, number of strides), or if not specified then the run is an open-ended run; decimal values; whether data is recorded or not; a playlist; one or more on-demand voice prompts; and/or what to display in a workout status screen.

Totals for the run can be calculated only using the recorded intervals. An interval may specify a time extension increment. The intervals may be of mixed type (not all interval goals have to be a distance (or a time, etc). The current calibration data could be used to calculate and verify intervals.

Intervals can be used for a variety of things, like laps, interval training, or just an entire run. One use for an unrecorded interval would be warm-up or cool-down periods. During such a period, the user probably does not care so much about performance.

As noted above, the intervals can also specify what to display in the workout status screen (e.g., Now Running screen) during the given interval. The interval can specify what to display in the large metric area as well as in the smaller metric areas of the workout status screen, such as the workout status screen illustrated in FIG. 27. This can be done using a display format ID which will be used to identify both the numerical format and units to be used. Some examples of metrics that can be specified include: total distance, total time, last interval time, current elapsed interval time, current interval time remaining, time remaining, distance remaining, number of steps, kilometer or mile pace, number of steps per minute, calories burned, etc. In FIG. 27, the large metric displayed is total time, and the smaller metrics are total distance in miles and total number of steps run.

A playlist to be used during an interval can be specified. The playlist can be identified by its title. Alternatively, the playlist could be identified by an identifier. In any event, the portable electronic device needs to have access to the playlist.

As noted above, the interval can be one or more voice prompts, which can be held in a voice prompt list. Each voice prompt includes a format list and a trigger. The format list includes one or more voice prompt format identifiers. The voice prompts will be played in the order in which they appear in the format list. A trigger can specify a type: regular distance (play this prompt every N distance), regular time (play this prompt every N amount of time), regular calories (play this prompt every N calories burned), regular strides (play this prompt every N strides taken), a particular distance, time, calorie value or number of strides, or on-demand (play this prompt whenever the user presses a predetermined button). The trigger values can be set relative to the current interval.

For localization, the title and the instructions for the different languages would need to be provided. English is used as the default language. The localization for the voice prompts can be handled separately from the template. When the user changes languages at the portable electronic device, any strings that have been localized will automatically be updated, and if there are corresponding entries in the voice prompt dictionary, they will be used.

Validation and range checking can be performed on loading each individual template. The template format version will also be used to determine validity of the template. If a template fails the validation and range checking, the template is not utilized (e.g., not made available to the user).

An exemplary template in an XML format for a 5 k run is provided below:

```
<template tmplID="9223372036854775808" formatVer="1.0"
tmplVer="1.0" category="dist">
<!-- tmplID must be unique -->
    <title lang=en-US>5K Workout</title>
    <shortTitle lang=en-US>5K</shortTitle>
    <sumFmt>
        <field fieldID="distT">
        <field fieldID="timeT">
        <field fieldID="calrT">
    </sumFmt>
    <goal units="km">5.00</goal>
    <vpList>
        <vpLI triggerValue="0.00" triggerType="atNsecs">
            <vpFmtList>
                <vpID promptID="vpStart"/>
            </vpFmtList>
        </vpLI>
        <vpLI triggerValue="0" triggerType="onDem">
            <vpFmtList>
                <vpID promptID="vpDist"/>
                <vpID promptID="vpTime"/>
                <vpID promptID="vpPace"/>
                <vpID promptID="vpDistContext"/>
            </vpFmtList>
        </vpLI>
        <vpLI triggerValue="1.00" triggerType="everyNdist">
            <vpFmtList>
                <vpID promptID="vpDistContext"/>
            </vpFmtList>
        </vpLI>
        <vpLI triggerValue="2.50" triggerType="atNdist">
            <vpFmtList>
                <vpID promptID="vpHalf"/>
                <vpID promptID="vpDistRem"/>
            </vpFmtList>
        </vpLI>
```

-continued

```
        <vpLI triggerValue="4600" triggerType="atNdist" units="m">
            <vpFmtList>
                <vpID promptID="vpDistRem"/>
            </vpFmtList>
        </vpLI>
        <vpLI triggerValue="4700" triggerType="atNdist" units="m">
            <vpFmtList>
                <vpID promptID="vpDistRem"/>
            </vpFmtList>
        </vpLI>
        <vpLI triggerValue="4800" triggerType="atNdist" units="m">
            <vpFmtList>
                <vpID promptID="vpDistRem"/>
            </vpFmtList>
        </vpLI>
        <vpLI triggerValue="4900" triggerType="atNdist" units="m">
            <vpFmtList>
                <vpID promptID="vpDistRem"/>
            </vpFmtList>
        </vpLI>
        <vpLI triggerValue="5.00" triggerType="atNdist" units="m">
            <vpFmtList>
                <vpID promptID="vpGoal"/>
            </vpFmtList>
        </vpLI>
        <vpLI triggerValue="0" triggerType="onStop">
            <vpFmtList>
                <vpID promptID="vpEnd"/>
                <vpID promptID="vpDist"/>
                <vpID promptID="vpTime"/>
                <vpID promptID="vpPace"/>
                <vpID promptID="vpCal"/>
            </vpFmtList>
        </vpLI>
    </vpList>
</template>
```

The various aspects, embodiments, implementations or features of the invention can be used separately or in any combination.

The invention is preferably implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for using a portable media player, comprising:
   (a) selecting a workout template that characterizes a workout to be performed by a user of the portable media player;
   (b) using the workout template to select workout music to be utilized for the workout; and
   (b1) modifying the operation of the portable media player using the workout template, the modifying comprising:

(c) receiving, processing and storing workout data acquired from a sensor;

(d) playing the workout music;

(e) presenting at least a portion of the workout data to the user; and (e1) modifying the workout template based at least on the presented workout data.

2. The method as recited in claim 1, wherein said modifying (e1) is based upon the workout template.

3. The method as recited in claim 1, wherein said method further comprises:

(f) repeating the acts of (c)-(e1) until the workout has ended.

4. The method as recited in claim 3, wherein the acts of (c) and (d) are concurrently performed.

5. The method as recited in claim 3, wherein said method further comprises:

(g) displaying workout summary data once the workout has ended.

6. The method as recited in claim 1, wherein the workout data pertains to at least distance traveled.

7. The method as recited in claim 1, wherein the workout music is a plurality of songs.

8. The method as recited in claim 1, wherein said determining (b) includes receiving a user selection of a list of available playlists that can be used as the workout music.

9. The method as recited in claim 1, wherein at least one of the workout music being played and the workout data being presented are determined by the workout template that is downloaded to the portable media player.

10. The method as recited in claim 1 wherein the portable media player includes a display for presenting at least a graphical user interface that enables the user of the portable media player to configure the portable media player and to monitor the workout undertaken by the user, comprising:

using a workout screen presented on the display by the user to select at least a workout type; and presenting a workout characteristics screen on the display in response to the user selection of the workout type, said workout characteristics screen enabling the user to select at least one workout characteristic for the workout of the workout type.

11. The method as recited in claim 10, wherein said graphical user interface comprises:

a workout music screen presented on the display of the portable media player said workout music screen enabling the user to select the plurality of songs to be played during the workout.

12. The method as recited in claim 11, wherein the plurality of songs is a predetermined playlist.

13. The method as recited in claim 11, wherein said workout music screen is presented on the display of the portable media player in response to the user selection of the at least one workout characteristic.

14. The method as recited in claim 10, wherein said graphical user interface comprises:

a workout start screen presented on the display of the portable media player said workout start screen enabling the user to signal the portable media player when the workout begins.

15. The method as recited in claim 14, wherein said graphical user interface comprises:

a workout progress screen presented on the display of the portable media player during at least a portion of the workout, said workout progress screen presenting substantially real-time workout data to the user.

16. The method as recited in claim 15, wherein said workout progress screen is presented on the display of the portable media player in response to the user signaling with respect to said workout start screen that the workout has begun.

17. The method as recited in claim 15, wherein at least a portion of the invention displayed in said workout progress screen is determined by a template associated with the workout.

18. The method as recited in claim 15, wherein said graphical user interface comprises:

a workout data selection screen presented on the display of the portable media player, said workout data selection screen enabling the user to provide a workout data selection so as to facilitate presentation of workout data from one or more prior workouts.

19. The method as recited in claim 18, wherein said graphical user interface comprises:

a workout data review screen presented on the display of the portable media player in response to the workout data selection, said workout data review screen presenting the workout data pertaining to one or more prior workouts.

20. The method as recited in claim 19, wherein the workout data selection is associated with one or more data categories.

21. The method as recited in claim 20, wherein at least one of the data categories pertains to recent workouts, personal bests or total.

22. The method as recited in claim 10, wherein said graphical user interface comprises:

a workout summary screen presented on the display of the portable media player when the workout ends, said workout summary screen presenting a summary of the workout data from the workout to the user.

23. A portable electronic device, comprising:

a display;

a user interface adapted to receive user inputs;

a memory device for storing at least digital media items including at least one song item; and a processor coupled to the memory device and display arranged to respond to a user input received at the user interface by at least selecting a workout template that characterizes a workout selected by the user of the portable electronic device, using the workout template to select workout music to be utilized for the workout, modifying the operation of the portable electronic device using the workout template, and modifying the workout template in accordance user performance data.

24. The portable electronic device as recited in claim 23, further comprising:

a removable wireless interface device coupled to said portable electronic device; and a remote wireless sensor.

25. The portable electronic device as recited in claim 24, wherein said remote wireless sensor is a wireless pedometer.

26. The portable electronic device as recited in claim 24, wherein said removable wireless interface device is an accessory for said portable electronic device.

27. The portable electronic device as recited in claim 24 wherein the memory device also stores at least a workout template for with a portable electronic device.

28. The portable electronic device as recited in claim 27, wherein, said template comprises:

a header including at least
an identification of what to display following a workout on a display associated with the portable electronic device; and at least one interval including at least an identification of what to display during at least an interval of the workout on the display associated with the portable electronic device;

an indication of what and when voice prompts are to be provided during at least the interval of the workout; and an identification of what to display during at least the interval of a workout on the display associated with the portable electronic device.

29. The portable electronic device as recited in claim 28, wherein said at least one interval further comprises one or more of: (i) a title for the workout, (ii) instructions for the workout, (iii) a workout category, and (iv) a goal for the workout.

30. The portable electronic device as recited in claim 29, wherein said at least one interval further including an indication of whether data recording using data from a remote should be performed.

31. The portable electronic device as recited in claim 23, wherein the modifying comprises:

receiving, processing and storing workout data acquired from a sensor, playing the workout music, presenting at least a portion of the workout data to the user on the display, and modifying the workout template based at least on the presented workout data.

32. Computer readable medium for storing computer code for using portable media player, the computer readable medium comprising:

computer code for selecting a workout template that characterizes a workout to be performed by a user of the portable media player;

computer code for using the workout template to select workout music to be utilized for the workout; and computer code for modifying the operation of the portable media player using the workout template, the modifying comprising:

computer code for receiving, processing and storing workout data acquired from a sensor;

computer code for playing the workout music;

computer code for presenting at least a portion of the workout data to the user; and computer code for modifying the workout template based at least on the presented workout data.

33. The computer readable medium as recited in claim 32, wherein the computer code for modifying comprises:

computer code for receiving, processing and storing workout data acquired from a sensor;

computer code for playing the workout music;

computer code for presenting at least a portion of the workout data to the user on the display; and computer code for modifying the workout template based at least on the presented workout data.

* * * * *

UNITED STATES PATENT AND TRADEMARK OFFICE
CERTIFICATE OF CORRECTION

PATENT NO. : 7,643,895 B2  Page 1 of 1
APPLICATION NO. : 11/439523
DATED : January 5, 2010
INVENTOR(S) : Gupta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 785 days.

Signed and Sealed this

Sixteenth Day of November, 2010

David J. Kappos
*Director of the United States Patent and Trademark Office*